(12) United States Patent
Hajmousa et al.

(10) Patent No.: US 11,435,182 B2
(45) Date of Patent: Sep. 6, 2022

(54) LASER RECEIVER AND TARGET WITH LIGHTED INDICATORS

(71) Applicant: Trimble, Inc., Sunnyvale, CA (US)

(72) Inventors: Ayman Zuhdi Hajmousa, Dayton, OH (US); Chris William Snyder, Union City, OH (US); Eric Keith Unger, Tipp City, OH (US)

(73) Assignee: Trimble, Inc., Sunnyvale, CA (US)

( * ) Notice: Subject to any disclaimer, the term of this patent is extended or adjusted under 35 U.S.C. 154(b) by 453 days.

(21) Appl. No.: 16/723,512

(22) Filed: Dec. 20, 2019

(65) Prior Publication Data

US 2021/0190492 A1   Jun. 24, 2021

(51) Int. Cl.
| | | |
|---|---|---|
| G01C 15/02 | (2006.01) | |
| G01C 15/00 | (2006.01) | |
| G01C 9/24 | (2006.01) | |
| G01S 17/08 | (2006.01) | |

(52) U.S. Cl.
CPC ............ *G01C 15/006* (2013.01); *G01C 9/24* (2013.01); *G01S 17/08* (2013.01)

(58) Field of Classification Search
CPC .......................... G01C 15/006; G01S 17/008
USPC ........................................ 33/282, 290, 298
See application file for complete search history.

(56) References Cited

U.S. PATENT DOCUMENTS

| | | |
|---|---|---|
| 4,029,415 A | 6/1977 | Johnson |
| 4,035,084 A | 7/1977 | Ramsay |
| 4,598,481 A | 7/1986 | Donahue |
| 4,820,041 A | 4/1989 | Davidson |
| 4,836,671 A | 6/1989 | Bautista |
| 5,076,690 A | 12/1991 | deVos |
| 5,100,202 A | 3/1992 | Hughes |

(Continued)

FOREIGN PATENT DOCUMENTS

| | | |
|---|---|---|
| DE | 69122965 T2 | 3/1992 |
| DE | 69224671 T2 | 3/1994 |

(Continued)

OTHER PUBLICATIONS

Spectra Precision QML800 / QML800G QuickMark Layout User Guide; Published by Trimble Navigation Ltd, Apr. 2016. (45 pages).

(Continued)

*Primary Examiner* — George B Bennett
(74) *Attorney, Agent, or Firm* — Frederick H. Gribbell; Russell F. Gribbell; Aaron S. Brodsky

(57) ABSTRACT

A movable accessory for an automatic point layout system includes a laser receiver, target screen, and an array of LEDs. A laser controller aims a vertical laser light plane toward any desired point on the jobsite. The user moves the accessory into the laser light plane, thereby impacting a photosensor on the laser receiver. The accessory's electronic controller translates that laser light impact and illuminates a corresponding LED. The illuminated LED indicates the desired point of interest on the jobsite floor for the user to mark. An electronic distance measuring instrument (an LDM) aims along the same laser plane, and the target screen reflects the LDM signal to provide a distance reading, which is sent to a remote controller operated by the user. Alternatively, the LED array indicates where the laser plane strikes the photosensor, allowing the user to quickly move the accessory to the null position of the photosensor.

34 Claims, 35 Drawing Sheets

(56) References Cited

U.S. PATENT DOCUMENTS

| | | |
|---|---|---|
| 5,100,229 A | 3/1992 | Lundberg |
| 5,110,202 A | 5/1992 | Dornbusch |
| 5,137,354 A | 8/1992 | deVos |
| 5,243,398 A | 9/1993 | Nielsen |
| 5,272,814 A | 12/1993 | Key |
| 5,294,970 A | 3/1994 | Dornbusch |
| 5,539,990 A | 7/1996 | Le |
| 5,579,102 A | 11/1996 | Pratt |
| 5,588,216 A | 12/1996 | Rank et al. |
| 5,598,269 A | 1/1997 | Kitaevich |
| 5,864,956 A | 2/1999 | Dong |
| 5,983,510 A | 11/1999 | Wu et al. |
| 6,035,540 A | 3/2000 | Wu et al. |
| 6,140,957 A | 10/2000 | Wilson |
| 6,501,543 B2 | 12/2002 | Hedges |
| 6,545,751 B2 | 4/2003 | Beliveau |
| 6,763,595 B1 | 7/2004 | Hersey |
| 7,110,092 B2 | 9/2006 | Kasper |
| 7,148,958 B2 | 12/2006 | Ohtomo |
| 7,373,725 B1 * | 5/2008 | Vanneman ........... G01C 15/002 33/294 |
| 7,644,505 B2 | 1/2010 | Zeng |
| 7,679,727 B2 | 3/2010 | Benz et al. |
| 7,992,310 B2 | 8/2011 | Litvin |
| 8,087,176 B1 | 1/2012 | Hayes |
| 8,269,984 B2 | 9/2012 | Hinderling |
| 8,281,495 B2 | 10/2012 | Hayes |
| 8,307,562 B2 | 11/2012 | Bascom |
| 8,553,212 B2 | 10/2013 | Jaeger |
| 8,595,946 B2 | 12/2013 | Hayes |
| 8,881,413 B2 * | 11/2014 | Nagao .................... G01C 5/00 33/293 |
| 9,228,837 B2 * | 1/2016 | Dumoulin ................ G01J 1/46 |
| 9,372,265 B2 * | 6/2016 | Zweigle ............... G09B 29/004 |
| 9,541,391 B2 * | 1/2017 | Berg .................. G01C 15/002 |
| 9,658,335 B2 * | 5/2017 | Siercks ............... G01C 15/002 |
| 10,488,519 B2 * | 11/2019 | Nishita .................. G01S 17/48 |
| 10,670,398 B2 * | 6/2020 | Essling ............... G01C 15/006 |
| 10,690,498 B2 * | 6/2020 | Turner .................. G01S 19/13 |
| 2004/0177523 A1 | 9/2004 | Chang et al. |
| 2005/0102063 A1 | 5/2005 | Bierre |
| 2006/0179672 A1 | 8/2006 | Tacklind |
| 2006/0280212 A1 | 12/2006 | Lu et al. |
| 2012/0186088 A1 | 7/2012 | Amor |
| 2012/0198711 A1 | 8/2012 | Hayes |
| 2015/0316374 A1 * | 11/2015 | Winter ................ G01C 15/006 33/293 |
| 2020/0173777 A1 * | 6/2020 | Pivac ..................... G01C 1/04 |
| 2020/0348133 A1 * | 11/2020 | Eisenreich ........... G01C 15/004 |
| 2021/0302162 A1 * | 9/2021 | Nishita ............... G01C 15/004 |
| 2022/0011107 A1 * | 1/2022 | Kikuchi .............. G01C 15/006 |

FOREIGN PATENT DOCUMENTS

| | | |
|---|---|---|
| DE | 19527829 A1 | 1/1997 |
| DE | 19648626 A1 | 5/1998 |
| DE | 102011077080 | 12/2011 |
| EP | 2226610 A1 | 9/2010 |
| JP | 10239057 | 9/1998 |
| WO | WO 2009053085 | 4/2009 |

OTHER PUBLICATIONS

Spectra Precision QuickMark Layout White Paper; Published by Trimble Navigation Ltd, Apr. 2016. (9 pages).

* cited by examiner

LASER RECEIVER AND TARGET WITH LIGHTED INDICATORS

CROSS-REFERENCE TO RELATED APPLICATIONS

None.

TECHNICAL FIELD

The technology disclosed herein relates generally to layout "surveying" equipment and is particularly directed to a laser receiver and movable target accessory for a two-dimension layout system of the type which identifies points and their coordinates, and transfers identified points on a surface to other surfaces in a vertical direction. This point layout system uses a laser controller that emits a laser plane of visible light to point or aim at a particular point of interest. The typical action of a user will be to view a laser light line on the jobsite floor (produced by the laser plane) and to follow that laser light line with the movable target, while monitoring the distance between the laser controller and the movable target. However, in bright lighting conditions, or if there is an object on the floor that blocks the laser light line, then the laser light line may not be clearly visible all the way to the point of interest.

An alternative arrangement is available to overcome those situations. In one embodiment, a laser light receiver is mounted on the movable target accessory, but the laser receiver is not mounted at the bottom portion of the movable target, and therefore, will be in a position to intercept laser light that is above the floor level. By use of a laser receiver, it is not necessary for the user to follow the laser light line on the floor, all the way to the point of interest.

This first embodiment is specifically disclosed using a laser receiver mounted to a movable target in a manner so that its photosensor is arranged non-vertically (rather than vertically, as in a laser receiver used as an elevation sensor). When the laser plane impacts the photosensor, the electronic controller will translate that impact to an array of LEDs mounted horizontally near the base of the movable target, thus providing a clear visual indication of the correct location of the "ON AZIMUTH" position by illuminating at least one of the LEDs. When the user moves the target into the laser plane, which then impacts a photosensor on the laser receiver, the electronic controller will translate the position of that impact to one of the LED locations. A user could then move the target within the laser plane and see the LEDs light up sequentially, matching the movement of the target, and providing a clear visual indication of an "ON AZIMUTH" position.

As the target is moved through the laser plane, the electronic controller could illuminate a single LED at a time (in sequence), or if desired by the human user, the controller could be configured to illuminate several LEDs in a row— while clearly indicating the correct azimuth position at only one of the LED positions—to create a brighter display of LEDs to more readily get the user's attention on a "brightly-lit" jobsite. The user then moves the target to a "correct" position that shows the desired distance from the laser controller, using a laser distance meter as an indicator, for example.

Another alternative embodiment is to provide a laser receiver non-vertically mounted to a movable target along with a bank of LEDs that are continuously illuminated in one color and mounted horizontally near the base of the movable target; or, those LEDs could all become illuminated only when the laser receiver detects the laser plane at any position of the photosensor. In either case, when the user moves the target into the laser plane, thereby impacting a photosensor on the laser receiver, the electronic controller will translate the position of that impact to one of the LEDs, which would then display a second, different color. This secondary LED color then provides a clear visual indication of an "ON AZIMUTH" position to the user.

Yet another alternative embodiment is to provide a laser receiver mounted to a movable target that includes a tilt angle sensor, and an array of LEDs mounted near the base of the movable target. When the user moves the target into the laser plane, thereby impacting a photosensor on the laser receiver, the electronic controller will automatically calculate the current tilt angle and light the appropriate LED to compensate for the tilt angle of the movable target. All of the variations discussed above regarding which single LED, or multiples LEDs, will then be illuminated, and their color or colors, can be used with this tilt angle compensation feature.

Still another alternative embodiment is to provide a laser receiver mounted to a pole. The laser receiver may be mounted near the top of the pole, and an array of LEDs may be mounted near the base of the pole. A target surface or screen (for an LDM) may be mounted next to or near the laser receiver. When the user moves the pole into the laser plane, the laser impacts a photosensor on the laser receiver. The electronic controller will translate that impact and light an appropriate LED.

A yet further alternative embodiment is to provide a laser receiver mounted to a pole in which the laser receiver is mounted next to or near a target surface or screen (for an LDM), but an array of LEDs may be mounted near the top of the pole—the opposite location as compared to the above-described embodiments. When the user moves the pole into the laser plane, the laser light impacts a photosensor on the laser receiver. The electronic controller will translate that impact and light an appropriate LED. The user can then move in and out of the laser plane to find the desired point of interest on the jobsite. In this embodiment, the user would use level vials, or an equivalent, to plumb the pole, and would move the "null position" of the laser receiver directly into the laser plane; then the user would move the pole to the correct distance from the laser transmitter, using an electronic distance sensor (such as an LDM), to find the correct location for the point of interest (while staying centered in the laser plane).

STATEMENT REGARDING FEDERALLY SPONSORED RESEARCH OR DEVELOPMENT

None.

BACKGROUND

A common method in the conventional art for locating a point of interest on a jobsite is through the use of a "total station" or a "robotic total station." A total station is an electronic/optical instrument with the ability to precisely orient itself in rotation and provide distance measurements. Once the instrument is set up and oriented to a jobsite work area, through the use of several known coordinates on the jobsite, any point of interest can be located.

A user sets up points of interest by programming their coordinates into the total station. Then the user selects a point, and the total station broadcasts a laser beam in the direction of that point. Next, the user must visually track the laser beam and also follow a controller to find that specific point of interest at the jobsite. This can be a difficult process, due to objects in the way, an uneven job surface, or, in the case of an outdoor site, bright lights interfering with the visibility of the laser beam.

Once the user finds the location on the jobsite, the total station requires exact positioning when marking the point of interest. This is not easy or quick to achieve.

SUMMARY

Accordingly, it is an advantage to provide a movable target having a laser receiver and horizontal visual indicators, so that a user can place the target anywhere in the path of a vertical laser plane so that when the laser plane impacts a photosensor of the laser receiver, an electronic controller translates that laser light impact to at least one of the visual indicators, clearly displaying the direction of a point of interest on a jobsite.

It is another advantage to provide a laser receiver non-vertically mounted to a movable target having an array of LEDs mounted horizontally at its base, so that a user can place the target in the path of a vertical laser plane, thereby impacting a photosensor of the laser receiver, and then an electronic controller translates that laser light impact to at least one LED which illuminates and clearly displays the direction of a point of interest on a jobsite.

It is yet another advantage to provide a laser receiver non-vertically mounted to a movable target having a horizontal array of LEDs that are constantly lighted in one color at the base of the target, so that when a user places the target in the path of a vertical laser plane, thereby impacting a photosensor of the laser receiver, then an electronic controller translates that laser light impact to at least one LED which then illuminates in a second, different color, clearly displaying the direction of the point of interest on a jobsite.

It is still another advantage to provide a laser receiver non-vertically mounted to a movable target having a tilt angle sensor and an array of LEDs horizontally mounted at the base of the target. A user places the target in the path of a laser light plane, thereby impacting a photosensor on the laser receiver. An electronic controller then translates the laser light impact to the tilt compensator algorithm, which calculates the correct angle of the laser light line as compared to the angle of the target. This calculation is used to select an LED, so as to correctly and clearly indicate a point of interest on the jobsite, based on the angle of the target.

It is a further advantage to provide a laser receiver having a target screen mounted near the top of a pole, and an array of LEDs mounted at the base of the pole. A user places the pole in the path of a laser light plane, which impacts the target screen and a photosensor on the laser receiver. An electronic controller then translates the laser light impact to select an LED, so as to clearly indicate a point of interest on the jobsite.

It is yet a further advantage to provide a laser receiver, target screen, and an array of LEDs mounted near the top of a pole. A user places the pole in the path of at least one laser light plane, thereby impacting at least one photosensor on the laser receiver. An electronic controller then translates the at least one laser light impact to select at least one LED, so as to clearly indicate the laser light plane impact. A user can then move within the laser light plane to find a point of interest on the jobsite, using an electronic distance sensor and while keeping the pole plumb.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a movable accessory for a layout and point transfer system, is provided, which accessory comprises: (a) a target screen having a surface that is at least partially reflective to emissions from an electronic distance measuring instrument, said surface having a longitudinal axis; (b) a laser light receiver comprising: a processing circuit, a memory circuit including instructions executable by said processing circuit, a communications circuit, an input/output interface circuit, and at least one photosensor that detects a wavelength emitted by a laser light transmitter; (c) a plurality of photoemitters that are controlled by at least one output signal that is generated by said input/output interface circuit; wherein: (d) said plurality of photoemitters is mounted proximal to a bottom portion of said movable accessory, at least two of the individual photoemitters of said plurality being mounted at different horizontal positions; (e) said laser light receiver is mounted above said plurality of photoemitters, said at least one photosensor of the laser light receiver being oriented in a non-vertical orientation; (f) said processing circuit is configured: (i) to monitor an angular position of where a vertical plane of laser light strikes at least one photosensor of the laser light receiver, as said accessory is moved by a user; and (ii) to provide a predetermined visual indication produced by said plurality of photoemitters to indicate a position of where said laser light receiver has received the vertical plane of laser light.

In accordance with another aspect, a movable accessory for a layout and point transfer system, is provided, which accessory comprises: (a) a target screen having a surface that is at least partially reflective to emissions from an electronic distance measuring instrument, said surface having a longitudinal axis; (b) a laser light receiver comprising: a processing circuit, a memory circuit including instructions executable by said processing circuit, a communications circuit, an input/output interface circuit, and at least one photosensor that detects a wavelength emitted by a laser light transmitter; (c) a plurality of photoemitters that are controlled by at least one output signal that is generated by said input/output interface circuit; wherein: (d) said plurality of photoemitters is mounted proximal to a top portion of said movable accessory, at least two of the individual photoemitters of said plurality being mounted at different horizontal positions; (e) said laser light receiver is mounted below said plurality of photoemitters, said at least one photosensor of the laser light receiver being oriented in a non-vertical orientation; (f) said processing circuit is configured: (i) to monitor an angular position of where a vertical plane of laser light strikes said at least one photosensor of the laser light receiver, as said accessory is moved by a user; and (ii) to provide a predetermined visual indication produced by said plurality of photoemitters to indicate a position of where said laser light receiver has received the vertical plane of laser light.

In accordance with yet another aspect, a layout and point transfer system is provided, which comprises: (a) a laser controller, including: (i) a laser light transmitter that emits a substantially vertical plane of visible wavelength laser light, said laser light transmitter being rotatable about a substantially vertical axis; (ii) an electronic distance measuring instrument that is rotatable about said substantially vertical axis; (iii) an electronic angle measuring instrument; and (iv) a first processing circuit, a first memory circuit including instructions executable by said first processing circuit, a first communications circuit, and a first input/output interface circuit; (b) a movable accessory, comprising: (i) a target screen having a surface that is at least partially reflective to emissions from an electronic distance measuring instrument, said surface having a longitudinal axis; (ii) a laser light receiver comprising: a second processing circuit, a second memory circuit including instructions executable by said second processing circuit, a second communications circuit, a second input/output interface circuit, and at least one photosensor that detects a wavelength emitted by a laser light transmitter, said at least one photosensor of the laser light receiver being mounted in a non-vertical orientation; and (iii) a plurality of photoemitters that are controlled by at least one output signal that is generated by said input/output interface circuit, at least two of the individual photoemitters of said plurality of photoemitters being mounted at different horizontal positions; and (c) a remote controller, including: a third processing circuit, a third memory circuit including instructions executable by said third processing circuit, a third communications circuit, a display monitor, a user-operated input circuit, and a third input/output interface circuit, wherein said laser controller and said remote controller communicate with one another by use of said first and third communications circuits; wherein: (d) said first processing circuit is configured: (i) using said laser light transmitter, to emit said substantially vertical plane of visible wavelength laser light; (ii) using said electronic distance measuring instrument, to monitor a physical distance between said electronic distance measuring instrument and said movable target screen, as said movable target screen is moved along said substantially vertical plane of visible wavelength laser light; and (iii) if said movable target screen is moved to a predetermined distance along said substantially vertical plane of visible wavelength laser light, then for at least one of (A) said laser controller and (B) said remote controller to provide a predetermined indication to show an ON POINT status, which corresponds to a physical location of said predetermined point of interest on the jobsite surface; and (e) said second processing circuit is configured: (i) to monitor an angular position of where a vertical plane of laser light strikes said at least one photosensor of the laser light receiver, as said accessory is moved by a user; and (ii) to provide a predetermined visual indication produced by said plurality of photoemitters to indicate a position of where said laser light receiver has received the vertical plane of laser light.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
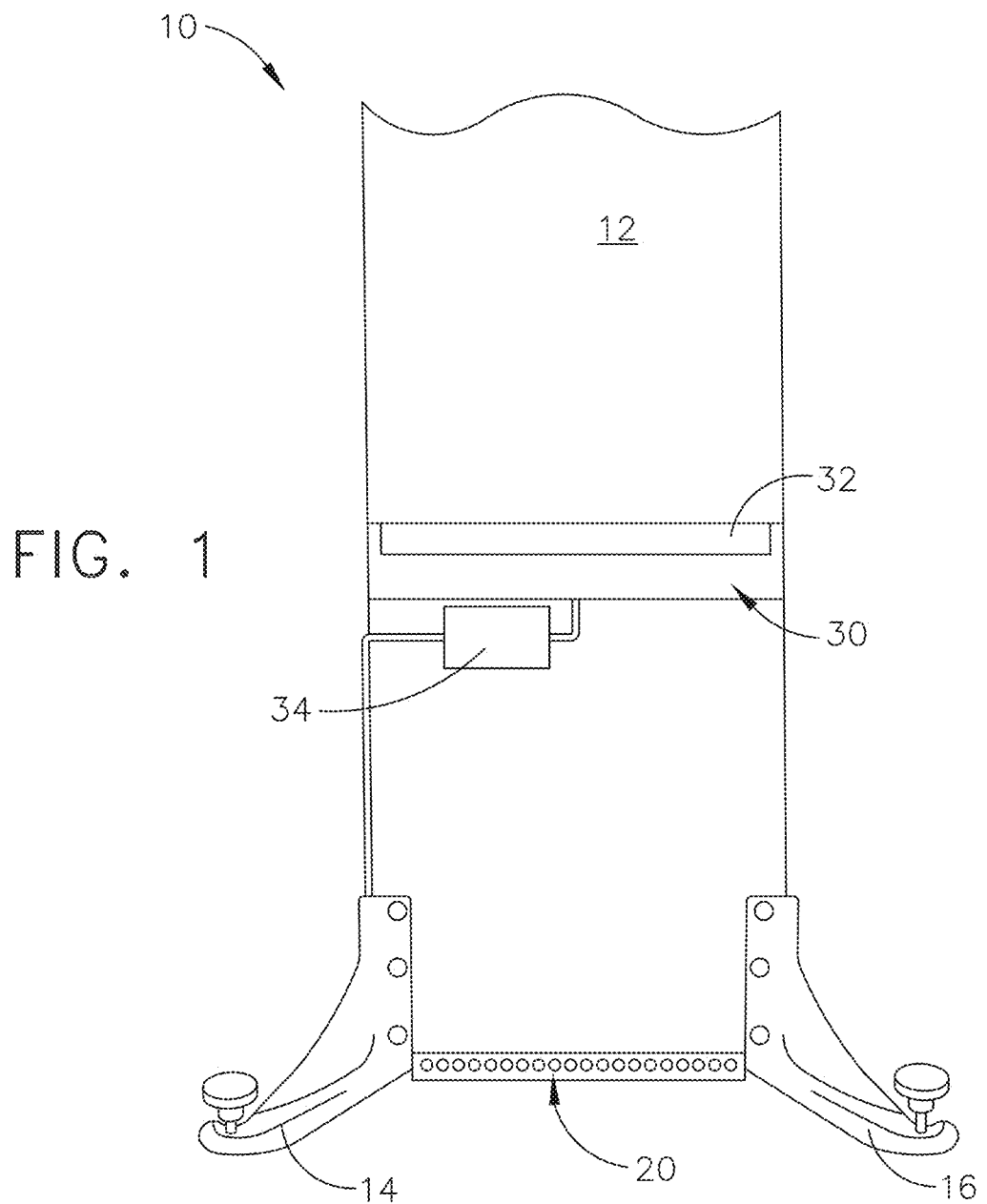
FIG. 1 is a front view of the laser receiver and movable target accessory for use with a layout and point transfer system, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a laser receiver movable target accessory is generally designated by the reference numeral 10. The accessory 10 includes a reflecting panel having a front surface 12. A laser receiver 30 is mounted on the reflecting panel 12 in a generally horizontal orientation (in this view), and the receiver includes a photosensor subassembly 32. Note that the panel 12 extends along a longitudinal axis. A high current LED driver circuit 34 is mounted below (in this view) and the laser receiver 30. At the base of the accessory 10 is a left front leg 14 and a right front leg 16, which are used to stabilize the accessory upright. Between the legs is a bank of LEDs 20.

Figure 15:
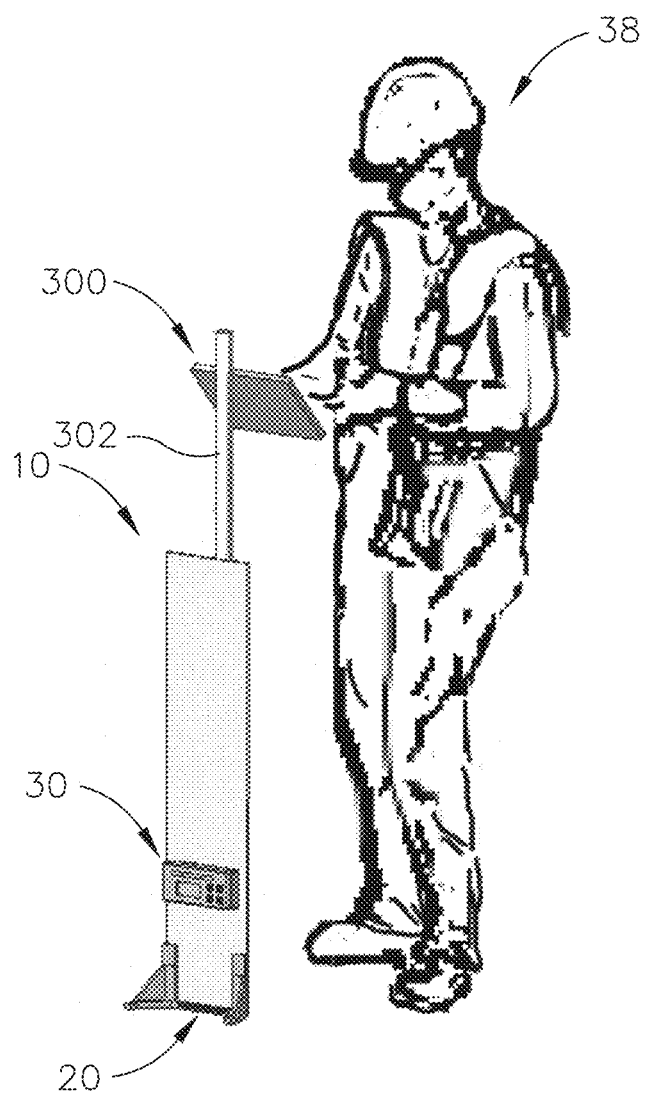
FIG. 15 is a diagrammatic view of the movable target accessory of FIG. 1 next to a human user.

The movable accessory 10 is shown more to scale as compared to a human user 38 in FIG. 15. As can be seen in that view, the movable accessory 10 has the bank of LEDs 20 at its base, and above those LEDs 20 is the laser receiver (shown horizontally mounted in this view). A remote controller 300 is mounted to the top of a handle 302. The handle 302 is attached to the rear of the movable accessory 10 for ease of access to the remote controller as the user is moving the accessory on a jobsite.

Laser Receiver Hardware Description

Figure 2:
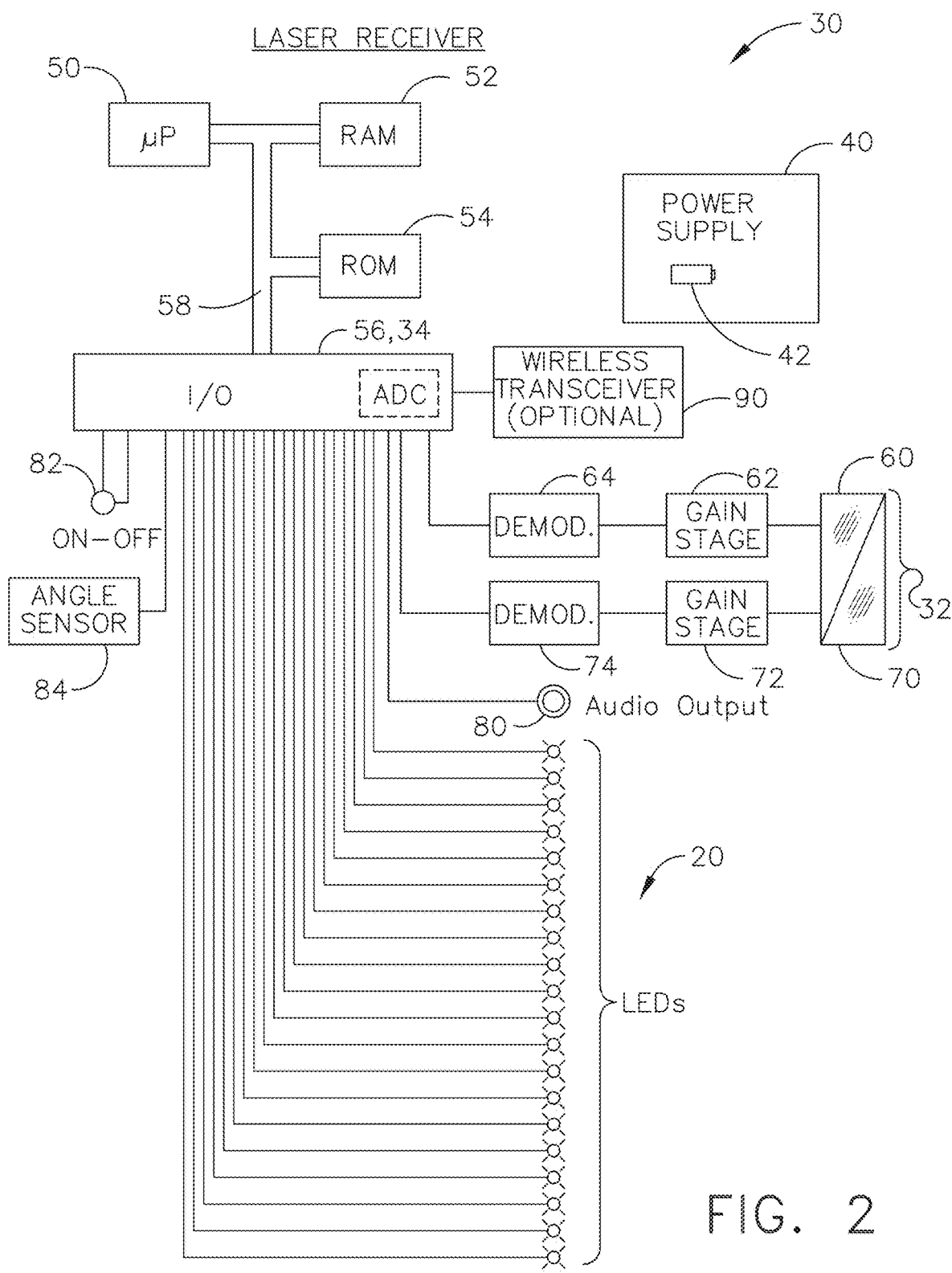
FIG. 2 is a block diagram of the major components of a laser receiver that is used in the exemplary movable target accessory of FIG. 1.
Figure 3:
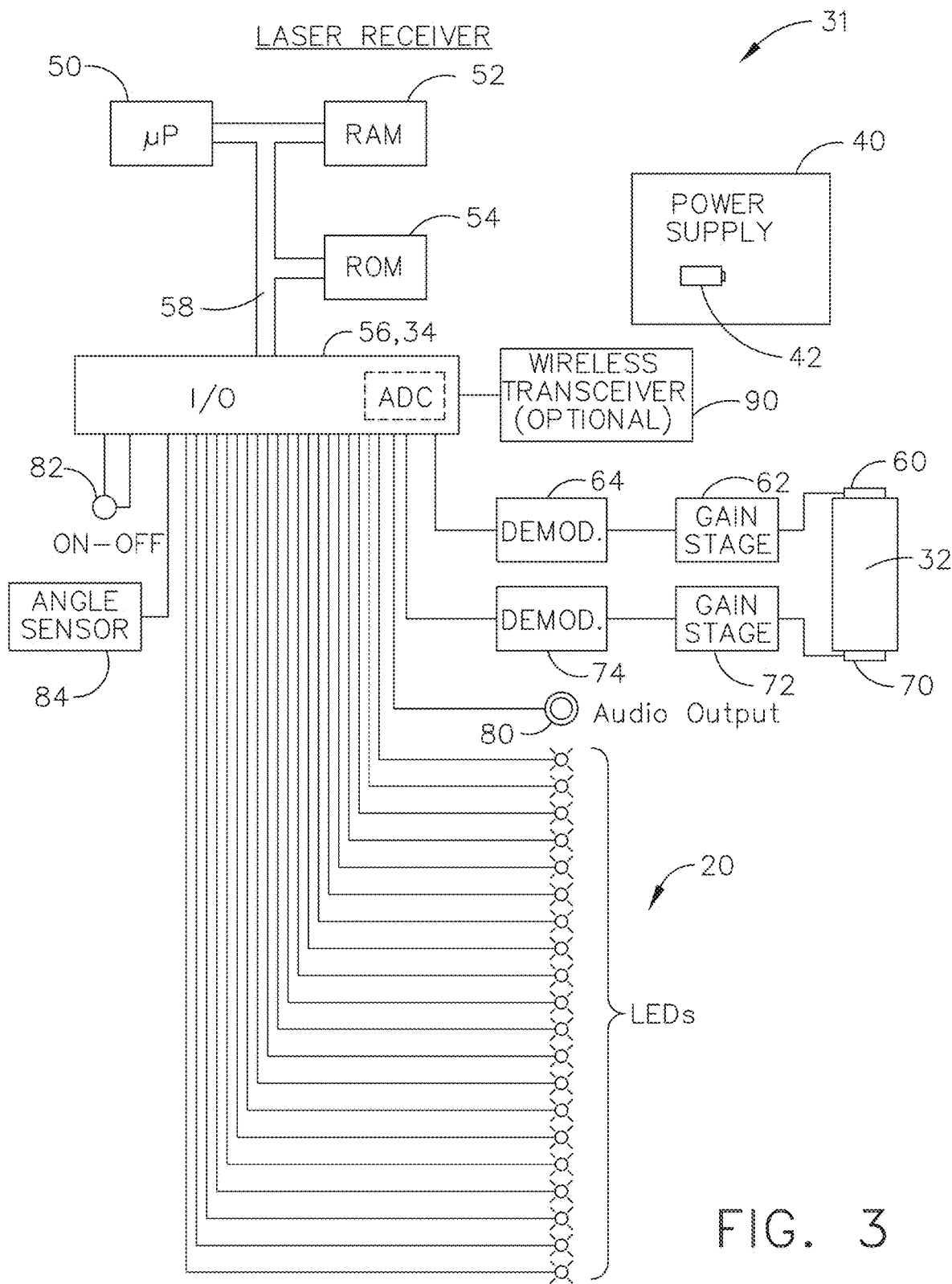
FIG. 3 is a block diagram of the major components of a laser receiver that is used in the alternative exemplary movable target accessory of FIG. 1.

Referring now to FIGS. 2 and 3, the accessory 10 includes one of the laser receivers 30, 31 which includes several important hardware components, such as a processing circuit 50, with associated RAM 52, ROM 54, an input/output ("I/O") circuit 56, and a high current LED driver circuit 34. These circuits are all in communication with the processing circuit 50 via a signal bus 58, which normally would carry data signals and address signals, and other types of microprocessor signals, such as interrupts. Since the laser receiver will be handling analog signals, there likely will be an analog-to-digital converter ("ADC") somewhere in this hardware circuitry, and a typical place for such ADC circuit could be with the signal conditioning I/O circuit 56. The ADC circuit could be multiplexed, or there could be more than one ADC circuit for the plurality of analog signals coming from the photosensor 32. An optional wireless transceiver 90 could be used that is in communication with the I/O circuit 56.

An angle sensor 84 is provided to calculate the tilt angle of the accessory 10. This angle sensor 84 communicates with the processing circuit 50, and together calculates which LED 20 to illuminate when a laser light line 712 crosses the photosensor 32 of the laser receiver 30, 31.

It should be noted that a single microcontroller circuit could potentially contain all the hardware circuits described in the previous paragraph. Moreover, an ASIC could potentially contain all those hardware circuits, as well as additional memory elements for a computer program that is used to execute commands on the processing circuit. In addition to the above hardware components, some type of communications port could be included in the laser receiver 30, 31, such as a wireless transmitter and/or wireless receiver (not shown). Also, a hardware communications port, such as a USB port, could be included (not shown).

The heart of the laser receiver 30, 31 is the photosensor device which, on FIGS. 2 and 3, is depicted as a pair of photocells that are mounted back-to-back at reference numerals 60 and 70. This is a somewhat typical arrangement (with two "butt cells" on FIG. 2), although it probably represents the minimum level of sophistication for such photocells that are to be used to detect the position of a laser beam that is striking the laser receiver. Any desired arrangement of photocells can be used to make up the photosensor 32, whether as a simple pair of diagonal split cells (see FIG. 2), a pair of photocells on the ends of a "rod sensor" (see FIG. 3), or a much more complex set of multiple individual photocells that are multiplexed and amplified at different gains to achieve a desired effect for quickly and accurately detecting the position of a laser light strike. Several different exemplary schemes have been disclosed in patents owned by Trimble, including U.S. Pat. Nos. 5,486,690, 6,133,991, and 7,012,237.

On FIGS. 2 and 3, it is assumed that there are two photocells 60 and 70 that make up the photosensor 32 for the laser receiver 30, 31. Each photocell has an analog output that is directed to a gain amplifier stage 62 or 72, respectively. The outputs from the gain stages are then directed to a pair of demodulation stages 64 and 74, respectively. It should be noted that the demodulation stages are optional; for example, if the laser light source 472 is not modulated, then a demodulation stage is not necessary. On FIGS. 2 and 3, the final analog signals from the demodulation stages are directed to the I/O circuit 56, where they can be digitized by an A/D converter (the ADC). Please note that some microcontrollers contain an internal ADC, and in that situation, the analog signals can pass through the I/O circuit 56 unprocessed, and then be directed to the microcontroller or microprocessor 50.

The laser receiver 30, 31 has several outputs, including an audible output device 80 (such as a piezoelectric audio emitter), and a set of LEDs at 20. Several versions of how the LEDs may be illuminated (see FIGS. 18-23) are described in further detail below.

Finally, FIGS. 2 and 3 depict a user-controlled power (ON-OFF) switch at 82. An electrical power supply is depicted at 40, which uses a set of batteries 42. Most standard laser receivers include a timing circuit, and if it detects no user activity for a predetermined time interval (such as 30 minutes), then a "battery saver" circuit will turn off the electronics automatically.

The use of an IR (infrared) laser light source can be beneficial under certain jobsite conditions. The alternative versions depicted in FIGS. 2 and 3 provides a solution for such conditions and, while an IR laser light line that impacts the target screen 12 may not be visible to the human eye, the ease of use of the accessory 10 nevertheless makes it easy for the user to "find" the correct azimuth angle that leads to the point of interest that is being "aimed at" by the laser controller 820. If the jobsite floor has some small obstructions, the laser receiver will still be able to detect the non-visible laser light, so long as the floor obstructions are not too large in vertical size. Moreover, the electronic distance sensor would continue to operate in the same manner as described above, in reference to FIGS. 8 and 17.

It will be understood that the versions of FIGS. 2 and 3 could be used with any wavelength of laser light, including invisible wavelengths, if desired. The addition of the laser receiver 30, 31 allows the layout system and methodologies disclosed herein to be performed regardless of the jobsite lighting conditions, and regardless of the exact wavelength of the laser light plane being emitted by the laser controller.

Remote Controller Hardware Description

Figure 4:
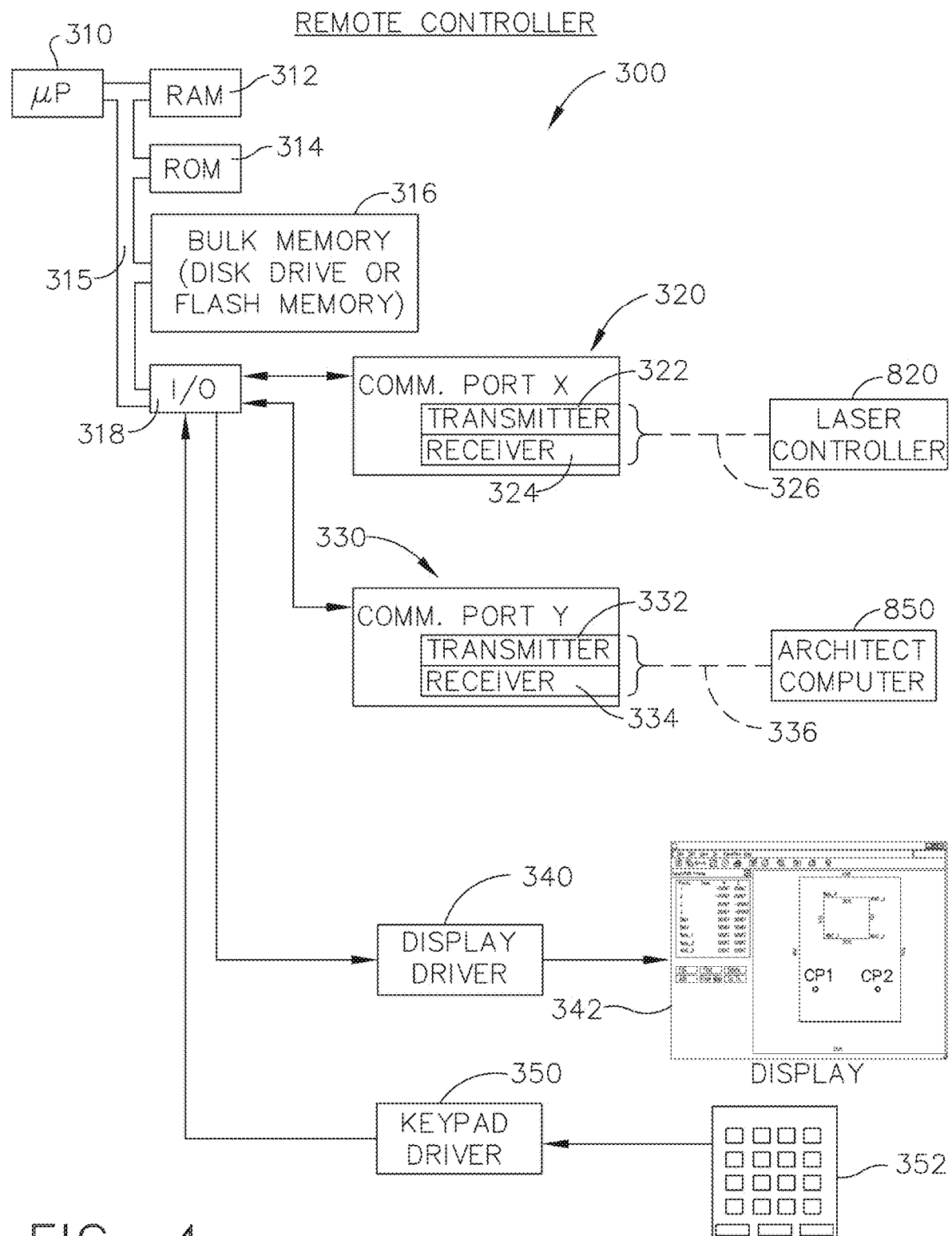
FIG. 4 is a block diagram of the major components of a remote controller that is used in the system of FIG. 1.

Referring now to FIG. 4, a block diagram is provided for a remote controller, which is generally designated by the reference numeral 300. Remote controller 300 includes a processing circuit 310, with associated RAM 312, ROM 314, some type of bulk memory or external memory 316, and an input/output circuit 318. These circuits are all in communication with the processing circuit 310 via a bus 315, which normally would carry data signals and address signals, and other types of microprocessor signals, such as interrupts.

The bulk memory 316 could be a disk drive, or perhaps some type of flash memory. If in the form of flash memory, it could be an external memory device (such as a "portable memory device") that can plug into the remote controller, via a USB port, for example. In that situation, there would be a USB interface port between the bulk memory device 316 and the bus 315.

The I/O circuit 318 will be in communication with a first communications port 320, which is designated as communications port "X" on FIG. 4. Communications port 320 includes a transmitter circuit 322, and a receiver circuit 324. Communications port 320 is designed to communicate with the laser controller 820, typically using a wireless signal via a wireless pathway 326 (as noted on FIG. 4). As described in greater detail below, in this point layout system, the laser controller 820 will communicate distance information and azimuth angle information with the remote controller 300, and that information arrives via the wireless path 326 to and from communications port 320.

An optional second communications port 330 can be included in remote controller 300, and this is designated as communications port "Y" on FIG. 4. The communications port 330 includes a transmitter circuit 332 and receiver circuit 334. If installed, communications port 330 can be used to exchange information with an architect computer 850, via a communication link 336. On FIG. 4, the communication link 336 is depicted as a wireless link, although it certainly could be constructed by use of an electrical cable or an optical cable, if desired. If used, communications port 330 will be able to exchange floor layout data with the architect computer 850; more specifically, it can receive a virtual jobsite floor plan and store it in the bulk memory circuit 316. In addition, if the remote controller 300 receives information about a new or "unknown" point of interest in the jobsite floor plan, then that information not only can be saved in the bulk memory circuit 316, but could also be communicated back to the architect computer 850 (via the communications port 330) to be placed in the original floor plan. Or, a revised virtual jobsite floor plan (which includes the new point of interest) can be saved as a file in bulk memory circuit 316, and that entire file could be transferred to the architect computer 850.

It will be understood that the architect computer 850 could comprise a "fixed" unit that essentially remains in the architect's office, and passes data to the remote controller 300 while the remote controller is physically at the office, or perhaps they may remotely communicate with one another via a wide area network, such as the Internet. Alternatively, the architect computer 850 could comprise a "portable" unit that is transported to the jobsite, and communicates with portable unit 300 while on site. Finally, as portable computers become even smaller in physical size, it is possible that a portable remote controller and the architect computer will eventually become merged into a single device. On the other hand, a tablet computer is much more durable than many other forms of portable computers, and for the rigors that the remote controller 300 will be subjected to, it does not seem highly probably that it would merge functions with the architect's computer 850. That being said, a portable architect computer 850 could be in the form of a high-capability tablet computer.

A display driver circuit 340 is in communication with the I/O circuit 318. Display driver circuit 340 provides the correct interface and data signals for a display 342 that is part of remote controller 300. If remote controller 300 is a laptop computer, for example, then this would be the standard display seen in most laptop computers. Or, perhaps the remote controller 300 is a calculator-sized computing device, such as a tablet portable computer or a smart phone, in which case the display would be a much smaller physical device. Display 342 could be a touch screen display, if desired, such as found on many tablet computers.

One example of a type of remote controller that could work in this system (with some modification) is the portable "layout manager," which is an existing hand-held computer sold by Trimble, Inc. (formerly, Trimble Navigation Limited), Model Number LM80. It should be noted that one cannot simply take the LM80 and immediately use it as a remote controller in the present system; the software must be modified to perform the necessary calculations. In addition, the input/output circuits must be modified to be able to communicate commands and data both to and from the laser controller 820.

A keypad driver circuit 350 is in communication with I/O circuit 318. Keypad driver circuit 350 controls the signals that interface to an input sensing device 352, such as a keypad, as depicted on FIG. 4. Again, if the display 342 is of a touch screen type, then there may not be a separate keypad on remote controller 300, because most of the command or data input functions will be available by touching the display itself. There may be some type of power on/off switch, but that would not necessarily be considered a true keypad (and typically would not be used for entering data).

Laser Controller Hardware Description

Figure 5:
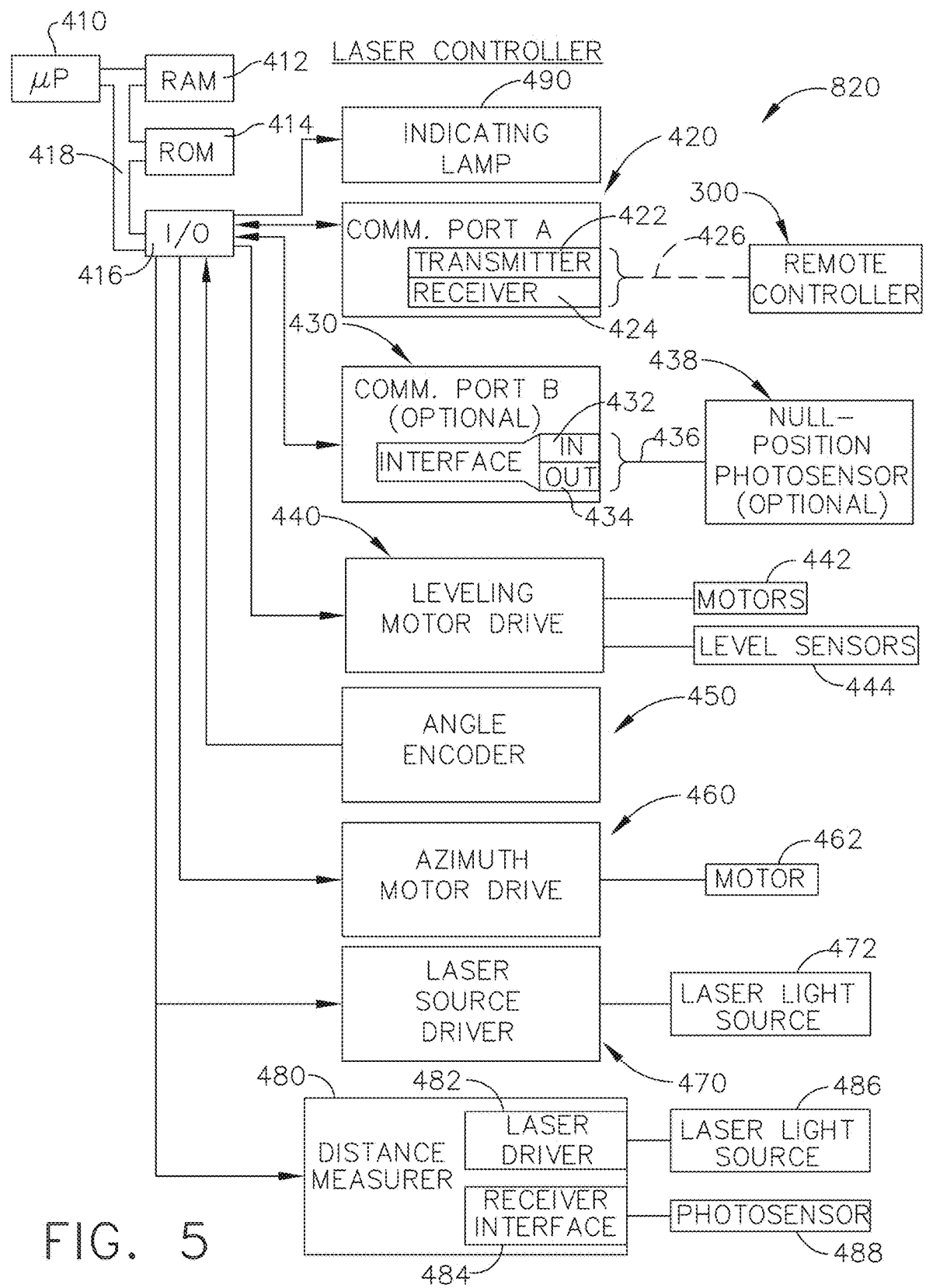
FIG. 5 is a block diagram of the major components of a laser controller that is used in the system of FIG. 1.

Referring now to FIG. 5, a block diagram of a laser controller used in the present system is illustrated, and is generally designated by the reference numeral 820. Laser controller 820 includes a processing circuit 410, which will have associated random access memory (RAM) at 412, associated read only memory (ROM) at 414, and at least one input/output circuit at 416. These memory circuits 412, 414, and I/O circuit 416 communicate with the processing circuit 410 by use of a bus 418, which typically is referred to as an address bus or a data bus, and can also contain other types of signals, such as interrupts and perhaps other types of timing signals.

The input/output circuit 416 will sometimes also be referred to herein as an "I/O" circuit. This I/O circuit 416 is a primary interface between the real world devices and the processing circuit 410. The I/O circuit 416 is in communication with various communications devices and also various types of motor drive circuits and sensor circuits.

The input/output circuit 416 is in communication with a communications port A, which is generally designated by the reference numeral 420. Communications port 420 includes a transmitter circuit 422 and receiver circuit 424. Communications port 420 is provided to exchange data information with the remote controller 300. The communication link between remote controller 300 and communications port 420 is designated by the reference numeral 426. In a preferred mode of this system, the communication link 426 will be wireless, although a cable could be connected between the communications port 420 and the remote controller 300, if desired.

An optional second communications port, referred to as port B, is generally designated by the reference numeral 430 on FIG. 5. This port 430 comprises a data interface with an input circuit at 432 and output circuit at 434. If used, this communications port 430 can transfer data to and from an optional null-position photosensor, generally designated by the reference numeral 438, using a communication path 436. While it would be possible for communication link 436 to be wireless, there is no particular need for that to be so. This optional equipment is found on other laser transmitters sold by Trimble, Inc. (formerly known as Trimble Navigation Limited), but it is not necessary for the primary functions that are described herein. One possible reason to provide this optional equipment would be to use the laser controller 820 as a substitute for other equipment in Trimble QuickMark Layout systems.

Laser controller 820 also includes a self-leveling motor drive circuit, generally designated by the reference numeral 440. This drive circuit provides the voltage and current for a leveling motor 442. In addition, it receives signals from a level sensor 444, and these input signals will determine what types of commands will be sent to the motor 442 from the drive circuit 440. If desired, this can be a self-contained system that may not need to communicate with the processing circuit 410. However, the laser controller 820 will typically desire knowledge of whether or not the laser controller has actually finished its leveling function before the laser controller 820 begins to function in its normal mode of operation. In addition, the processing circuit 410 may well desire to control the leveling motor drive circuit 440, essentially to keep it de-energized at times when it is not critical for the laser controller to actually be attempting to level itself with respect to gravity.

It will be understood that an automatic leveling function is desired, but it is not a requirement for using this technology. If it is not used, then each time the laser controller 820 is moved to a new position on the jobsite surface, the user must manually level that laser controller. In that type of embodiment, the laser controller would likely be provided with leveling screws and at least one bubble vial.

Laser controller 820 also includes an angle encoder 450, in a preferred embodiment of this control system. Angle encoder 450 will provide input signals to the processing circuit 410, so that it knows exactly where the laser transmitter is being pointed with respect to the azimuth direction. Measuring the azimuth could be a wholly manual operation, if desired to reduce system cost by eliminating the encoder. However, for a fully automated system, the angle encoder 450 will be necessary. Certainly the frequent changes in the azimuth direction of the laser transmitter that tend to occur in this point layout control system would make a decision to delete the angle encoder seem later like a horrible idea. An electronic angle encoder will provide an electrical or optical output signal that is related to the angle (or "heading") that has been measured by the encoder subassembly. In the laser controller 20, that angle encoder output signal is directed to the I/O interface circuit 416.

Laser controller 820 preferably will also include an azimuth motor drive, generally designated by the reference numeral 460. Motor drive 460 will provide the proper current and voltage to drive the azimuth motor 462, which is the motive force to aim the laser transmitter. This could be part of a self-contained system, working with the angle encoder 450. However, on FIG. 5, it is illustrated as being controlled by the processing circuit 410, which is necessary to perform the functions that are specified in the logic flow charts that are provided herewith. It will also be understood that, as an option, a manually-adjusted azimuth instrument could be provided on the laser controller, rather than including an azimuth motor drive as described above.

The leveling motor system includes a leveling platform for the azimuth motor 442, which has output shaft and a pinion gear that meshes with a spur gear. The spur gear has an output shaft that is vertical, which runs through an encoder disc subassembly and up to a second wheel or disc that includes a pair of butt cell photosensors. The encoder disc subassembly typically has some type of visible markings that can be detected by an encoder readhead, which is located along the outer perimeter of the encoder disc. The overall angle encoder subassembly 450 includes both the encoder disc subassembly and the encoder readhead. Typical optical encoders have a fixed portion and a rotatable portion.

Laser controller 820 also includes a laser light source driver circuit 470, which provides the current and voltage to drive a laser light source 472. This typically will be a laser diode, although it could be some other type of laser light beam emitter, if desired. As described above, the laser light source will typically be emitting visible wavelength light, although a non-visible wavelength light source could be desirable for certain applications, and a laser light source emitting infrared light could be used in that situation. The laser source driver 470 is controlled by processing circuit 410 in the configuration illustrated on FIG. 5.

The laser controller 820 will typically include a "fan beam" laser transmitter 472. However, it will be understood that other types of laser light sources could be used, including a rotating laser beam (such as a dithering laser beam), if desired. There must be some minimum amount of divergence to create a laser light "plane" so that the laser light will at least intersect the floor surface of a jobsite, and perhaps also intersect a ceiling surface for interior spaces on jobsites. The laser controller 820 will have many uses, even if the laser light source only is pointing at a floor surface. In this description, it will be assumed that the laser light source is a fan beam laser or an equivalent, so that either (i) a continuous plane of laser light is being emitted by laser controller 820, or (ii) a moving beam of laser light (i.e., a stream of photons in a line that moves its aiming angle over time) is emitted by laser controller 820 in a manner so as to create a "plane" of laser light that emulates a fan beam.

An electronic distance measuring instrument, generally designated by the reference numeral 480, is included in the laser controller 820. The distance measurer 480 communicates with the microprocessor 410 through the input/output circuit 416. If the distance measurer 480 uses laser light as its distance sensing means, then it can also be referred to as a "laser distance meter" or "LDM." Other types of distance measuring instruments also could be used, such as a sound-based device. This instrument can also be referred to as a "DMD" or "Distance Measuring Device" 480.

Assuming the distance measurer 480 is an LDM, it will include a laser driver circuit 482 and a laser beam receiver interface circuit 484. The laser driver 482 provides current for a laser light source 486, which emits a laser light beam, such as the laser light beam 730 (as shown on FIG. 8). A photosensor 488 receives the reflected laser light (from light beam 730), and the current signal that is output by the photosensor 488 is directed to the laser receiver interface circuit 484. After appropriate amplification and possible demodulation, that signal is sent through the I/O circuit 416 to the microprocessor 410. In this manner, the DMD 480 can determine an accurate distance between the laser controller 820 and a target that light beam 730 is reflected from, back to the photosensor 488.

An indicating lamp 490 can be included in the laser controller 820 to provide visual signals to a human user. Certain flashing signals could indicate a particular status, such as being TOO LONG, or TOO SHORT, with regard to the distance measurement between the DMD 480 and the target screen being manipulated by the user. Or, as described in greater detail below, the laser light source could be flashed at different rates to provide an indication as to the current distance status, which would provide an easily visible indication to the user on the jobsite floor as to whether that user should hold still, or move toward or away from the laser controller.

To indicate status, an audible output could be used as well, or instead of a visible lamp. Such an audible output could beep at certain rates (instead of flashing, for example), or if the audible output device acts like a speaker, it could change pitches to signal a change in status. (Note that such an audible output could be provided on the Remote Controller instead of, or in addition to, an audible output at the laser controller. See below.)

Laser Controller

The basic system concept is generally illustrated in FIG. 5. There is a single laser controller 820 that uses a laser transmitter 472 (see FIG. 8) which outputs a vertical laser plane 734 that, when incident on the floor, produces a visible laser light line 730 on the work surface 200. After completion of a setup procedure the laser controller 820 is able to rotate a pivotable rotor portion on its pivot axis, so as to direct the vertical laser light plane 734 through a point of interest 240 on the jobsite's work surface 200. This action directly provides a visible heading for the user and allows him to know that the location he is interested in falls somewhere along that laser light line 730 above the jobsite floor 200.

The system also has the capability of measuring the distance between the transmitter and a movable "target screen" located at the user, and handled by the user. In the illustrated embodiment, an electronic distance measuring instrument is provided on the rotating rotor portion of the laser controller such that it will always "aim" in the same azimuth direction (or "heading") as the vertical laser plane is aiming. In a preferred embodiment, the electronic distance measuring instrument comprises a laser distance meter (also known as an "LDM") that emits a narrow laser beam toward an intended target, and receives back some of that emitted laser beam energy—this is a well-known device. Also, in a preferred embodiment, the LDM is mounted on the laser controller 820 such that it emits its laser beam in a substantially horizontal direction, about six inches (152 mm) above the floor level.

Figure 8:
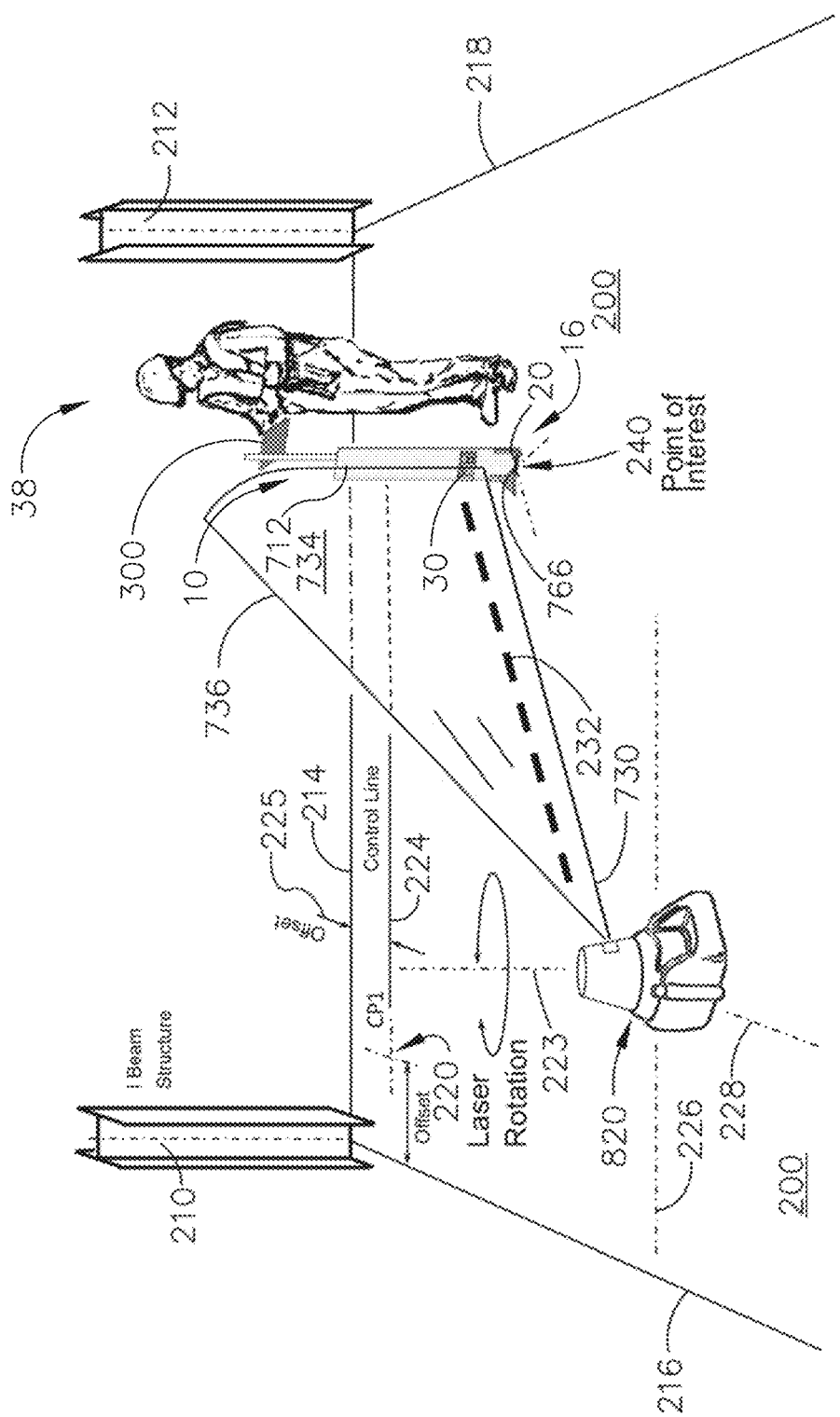
FIG. 8 is a diagrammatic view of how a human user would use the movable target accessory of FIG. 1 as part of a layout and point transfer system, as constructed according the principles of the technology disclosed herein, used for finding the location of a point of interest on a jobsite floor, after a laser controller has been set up (registered) on the floor plan.

In the illustrated embodiment of FIG. 8, the laser distance meter ("LDM") 480 aims its measuring laser beam 232 along the same azimuth as the vertical laser light plane (also referred to as a laser "fan beam") 734. As noted above, both the LDM 480 and the laser plane transmitter 472 are mounted on the same pivotable portion of the laser controller 820, and the distance measuring module is intended to be located within the laser transmitter fan beam, and not only rotates with the vertical laser plane 734, but has the laser 486 used for the distance measurement aligned and coincident with the output laser plane used for the visual heading direction. Therefore, these laser light-producing emitters are always aimed along the same azimuth (or "heading").

To be more precise, the term "heading" can be relative; if the laser controller is placed on a surface without knowing any setup information about how it is oriented to a jobsite floor plan coordinate system, or how it is oriented to the earth, still that laser controller will know the "heading" that its laser plane transmitter 472 is aimed at, because of its angle encoder 450 (see FIG. 8). However, that exact heading may or may not be equivalent to an azimuth; it depends on whether or not the laser controller has yet been leveled. (Note: "azimuth" is an angle in the horizontal plane.) Once leveled, the heading of the laser plane transmitter 472 will be equivalent to an azimuth, but again, that can be a relative quantity that may not match up to the earth, or to a jobsite floor plan. Finally, once the laser controller has been set up with a jobsite floor plan coordinate system, then the heading of the laser plane transmitter should match up to a true azimuth direction. (For example, a "relative" heading of 20 degrees for the laser controller 820—i.e., according to its own angle encoder 450—may end up corresponding to an azimuth direction of 15.5 degrees with respect to the CAD model coordinate system at the jobsite. Once that angular relationship becomes known, during setup, the processing circuit of the laser controller will know how to operate, knowing that information.)

It will be understood that, as used in this description, the phrase "laser fan beam" includes other types of laser light producing products that are capable of creating a "laser plane" output. This specifically includes a transmitter that outputs a rotating laser beam, which effectively creates a laser light "plane" of multiple rotations of a laser beam.

When in use, the LDM 480 has the ability to measure the distance from the transmitter rotor spin axis to a target screen 12, which typically is located near the user 38. The LDM 480 thus can provide an accurate distance measurement in real time to the laser controller 20, which in turn can provide that information to a tablet computer 300, which is the remote controller that is visible to the user. The target screen 12 must be at least partially reflective to the distance-measuring energy, so that a portion of the laser light emitted by the LDM 480 will be returned to the photosensor 488 of the LDM.

It will be understood that a different type of distance measuring device (DMD) could be used, rather than a laser distance meter. For example, a sonic emitter or an ultrasonic emitter could be directed at the target screen, which would reflect a portion of the sonic energy, and a distance could be determined, much like SONAR devices. A certain amount of accuracy would be lost, of course, compared to a light-energy based distance measuring instrument, such as an LDM.

If an indicating lamp 490 is provided on the laser controller 820, then it can provide a flashing indication as to whether the user has moved the target screen 12 to a position that is too short, too long, or just at the correct distance ("on point"). By use of a wireless communications link 426 between the laser controller 820 and the remote controller 300, the measured distance between the LDM 480 and the target screen 12 can be transmitted and then displayed on the monitor screen 342 (see FIG. 4) of the tablet 300. Alternatively, as described in greater detail below, the laser light source could be flashed at different rates to provide an indication as to the current distance status, which would provide an easily visible indication to the user on the jobsite floor as to whether that user should hold still, or move toward or away from the laser controller.

As described above, there are two major components in this system: a laser controller 820 and a remote controller 300. The laser controller includes a laser transmitter 472 that produces a rotatable visible vertical laser plane to indicate heading, and includes an electronic distance measuring instrument 480, which provides a distance measuring capability within the laser controller. As noted above, it is preferred that the electronic distance measuring instrument 480 comprise a laser distance meter (or "LDM"), and that the LDM also be mounted on the same rotatable rotor portion of the laser controller 820 as is the laser transmitter 472.

Flow Chart: Layout Procedure

Figure 9:
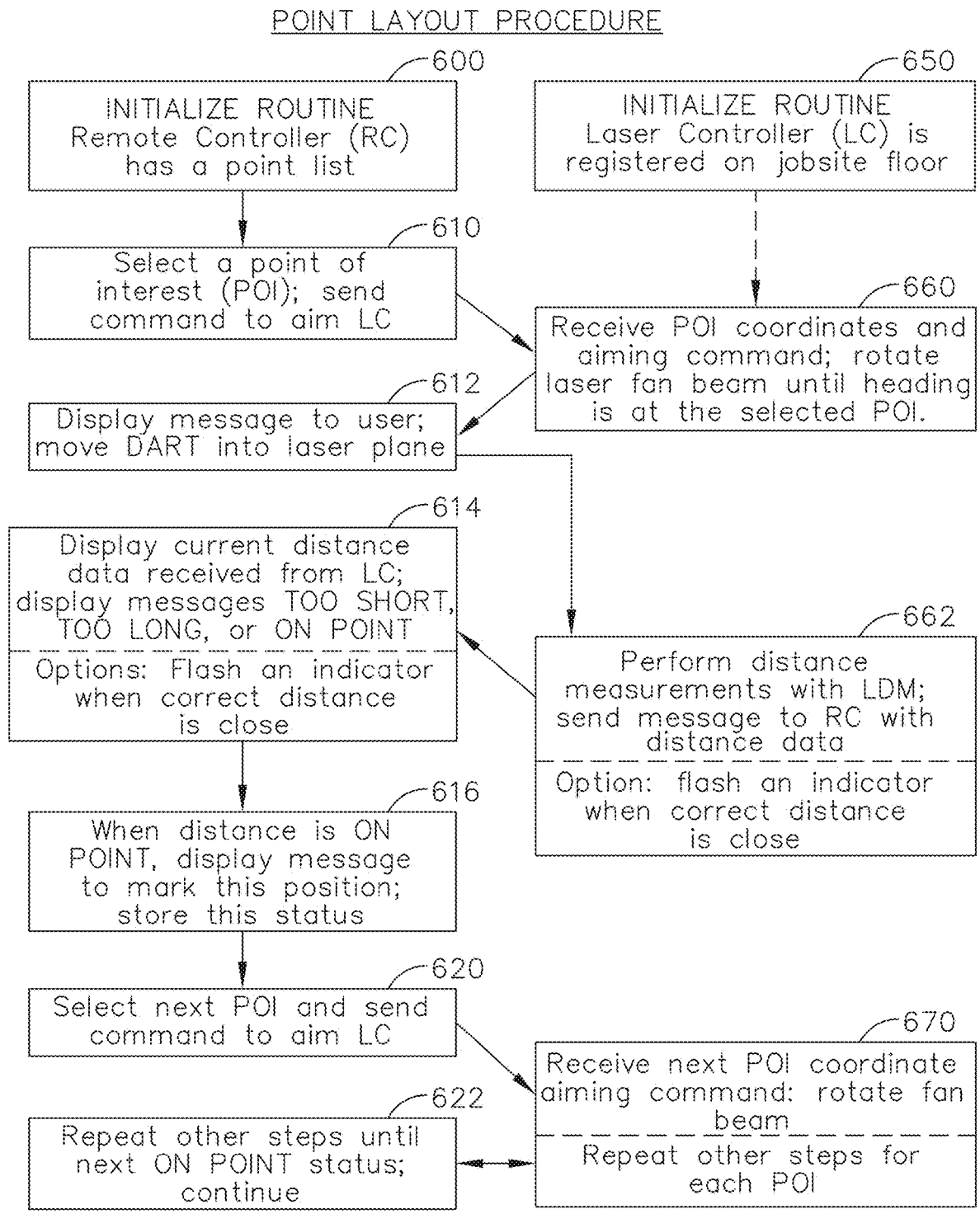
FIG. 9 is a flow chart of certain steps performed during a point layout routine, used in the system depicted in FIG. 8.

Referring now to FIG. 9, a flow chart is provided to show some of the important steps in a point layout procedure using the laser controller, after it has been placed on a physical jobsite floor and setup to the floor plan for that jobsite. The flow chart of FIG. 9 involves some of the layout functions as illustrated in FIG. 8, using the movable target 10.

FIG. 9 involves logic steps to be performed by both the remote controller 300 (or "RC") and the laser controller 820 (or "LC"). Both controllers have an initial condition at the beginning of the flow chart of FIG. 9: the RC has a "point list" already stored in its memory, which is called up when this routine is initialized at a step 600; the LC is already registered on the jobsite floor when this routine is initialized at a step 650.

It will be understood that each controller—i.e., the remote controller 300 and the laser controller 820—has its own operating software that is executed on its own processing circuit. However, it will also be understood that both of these controllers 300 and 820 are designed to work in conjunction with one another. Otherwise, everything probably would have to be built into a single device and placed into the laser controller. While such a unitary device would have the capability to perform its functions without any significant design problems, it would be less user friendly, because the user would have to keep moving back to that unitary laser controller to perform the point layout tasks. Instead, the preferred approach is to separate the functions so the user can carry (or roll on the floor) the remote controller around to each point of interest as it is being laid out on the jobsite floor, and never have to move back to the location of the laser controller, until the entire point list has been laid out. The use of wireless communications between the RC and the LC facilitates these tasks, as noted above.

On FIG. 9, the first task after initializing this routine is for the human user to select a point of interest at a step 610. (Note: as discussed above, the actual choice of which point of interest to select can be automated by the software, if desired.) The RC now sends a command to the LC, still at step 610, to aim the laser fan beam at the correct heading, so that a laser light line will be visually indicated on the jobsite floor surface. Note, however, the laser fan beam does not necessarily have to reach the floor (as in FIG. 8); in that situation, the user can approximate the correct heading by looking at the rotating turret head of the laser controller, and then move the target accessory 10 into that direction until the fan beam impacts the target surface 12, at which time, a vertical laser light 712 will appear on that target surface.

At a step 660, the LC receives the POI coordinates, or it receives a command to aim at a specific azimuth angle—this is a matter of design choice by the system design engineer. Either way, the LC now rotates its laser transmitter 472 to emit a fan beam (such as the laser plane 734, as seen in FIG. 8) along the correct heading. The RC can now display a message to the user, at a step 612, that the user should now move along the laser fan beam with the target screen.

The human user 38 (of FIG. 8) will now move the target to the correct heading, while attempting to place the target screen at the correct distance from the LC. It should be noted that, if the RC actually displays the sought after distance on its display monitor 342, then an experienced user will likely move quickly to a spot along the fan beam 734 of FIG. 8 that is very close to the correct actual distance to the POI. After that, the remaining "back and forth" movements to close in on the exact distance for each point of interest should be accomplished very quickly.

The LC will now perform periodic distance measurements, at a step 662, using its distance measuring instrument 480 (e.g., an LDM). The sample rate should be quite fast, at least in human terms, so the user feels that he is receiving almost continuous updates of the distance reading. The measured distances can be transmitted to the RC; in addition, if the LC was informed by the RC of the sought-after distance for this POI, then the LC can also send messages to the RC of the current distance status. The RC will then translate that data into informational operational (status) instructions, such as TOO LONG, TOO SHORT, or ON POINT. Moreover, the LC and/or the RC, optionally, can have an indicator that visually flashes light or produces an audible beep (or other sound), and the flashing rate (or beeping rate) can change, as the distance status (TOO LONG, TOO SHORT, or ON POINT) changes. An audible tone or beep may not be the best indicator on a busy (and perhaps noisy) jobsite.

Additionally, if there are LEDs of more than one color on the LC, then a different color could be flashed to indicate which distance status is currently operative; for example, "green" could have the meaning of ON POINT, while "yellow" and "red" could have the meanings TOO LONG or TOO SHORT, for example. Furthermore, the yellow and/or red lamps could also flash at different rates, as the user approaches the correct distance to the POI.

As the measured distance data is received by the RC, that distance can be displayed to the user at a step 614. Moreover, the display monitor 342 could noticeably display a bright message (perhaps in color) to the user that indicates the TOO LONG, TOO SHORT, or ON POINT current distance status. As noted above for the LC, the display on the RC could either flash or show different colors as the distance status changes, and/or if the correct (sought after) distance is being approached by the user. Additionally, an audible tone or beep could be output on the tablet (RC) 300, if desired, although a busy jobsite may not be conducive to hearing such audible signals. The audible tone could "beep" at faster or slower rates, to indicate TOO LONG or TOO SHORT, for example; a steady "on-tone" could represent an ON POINT current distance status. Another exemplary way to indicate the current distance status using the display monitor 342 could be to show "arrow" symbols, much like are used on laser receivers that show elevation (as ABOVE GRADE, BELOW GRADE, and ON GRADE). One arrow could be illuminated (or could flash) to show TOO LONG, while a second arrow could be illuminated (or could flash) to show TOO SHORT, status states.

Another helpful way that the system hardware could provide an indication to the user of the current distance status is to flash (or modulate) the laser transmitter output fan beam itself. In greater detail, the laser light transmitter 472 of the laser controller 820 could be commanded to turn its optical output beam on and off, repetitively, as an indication of TOO LONG, TOO SHORT, or ON POINT. For example, if the current distance status is TOO LONG, then the frequency of the light flashing could be relatively fast, such as three flashes (on and off) per second; and if the current distance status is TOO SHORT, then the frequency of the light flashing could be relatively slow, such as only one flash (on and off) per second; finally, if the current distance status is ON POINT, the frequency of the light flashing could be zero, which would be a constant "on" light beam.

Such laser light flashing would be eminently visible by the human user on the jobsite, because the laser light lines that run across the target screen 12 (and any other surfaces that are impacted by the laser light plane) will brightly "shine on", and then "shine off"—either quickly or slowly— as the correct distance is finally reached by the user who is manipulating the target screen. Another refinement could be to vary the duty cycle of the on and off flashing light beams. In other words, if the flash rate is three cycles per second, the duty cycle could be 50%, and the user would have a "good signal" to visibly see the laser light lines being created by the laser light plane. However, if the flash rate is only one cycle per second, or perhaps even slower, then the system designer may wish to increase the duty cycle to 70% or 80%, for example, so the user will still have "good signal" to visibly see those laser light lines, instead of being required to wait for a longer "off time" that would be created by use of a smaller duty cycle.

After the user has discovered the correct location for the current point of interest—i.e., the target screen is now ON POINT—the display monitor 342 at a step 616 can display a message to inform the user that he should now mark this position on the jobsite floor. The RC 300 can store this status, so as to prepare for moving on to the next point of interest. As described below in greater detail, the user only needs to move the target accessory 10 until the laser light line 712 intersects any portion of the laser receiver's photosensor 32. At that moment, at least one LED of the array 20 will turn on, thereby informing the user of the correct point of interest azimuth.

At a step 620, the RC will select the next point of interest, and will send a command to aim the laser fan beam of the LC at that next POI, just like in step 610. The LC receives this command for the next POI at a step 670, and rotates its laser transmitter 472 accordingly, just like in step 660. The LC will now repeat the other functions involving step 662, and at a step 622, the RC will now repeat the functions of steps 614 and 616, and so on, for each POI on the point list.

Once the entire point list has been laid out, this portion of the jobsite floor plan will be completed. The laser controller 820 will now likely be moved to a different portion of the same jobsite, or to a new jobsite altogether.

Figure 6:
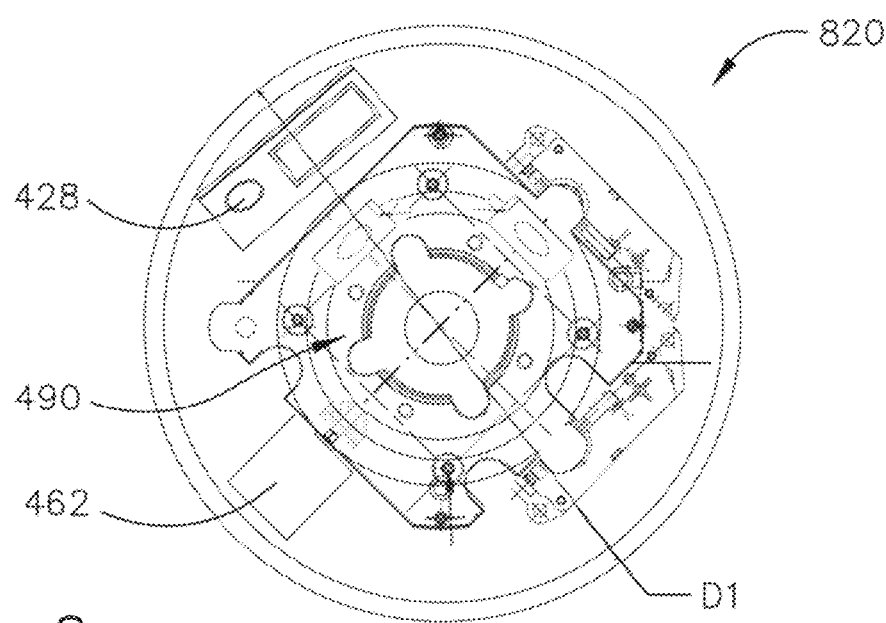
FIG. 6 is a plan view of an exemplary laser controller that is used in the system of FIG. 1.
Figure 7:
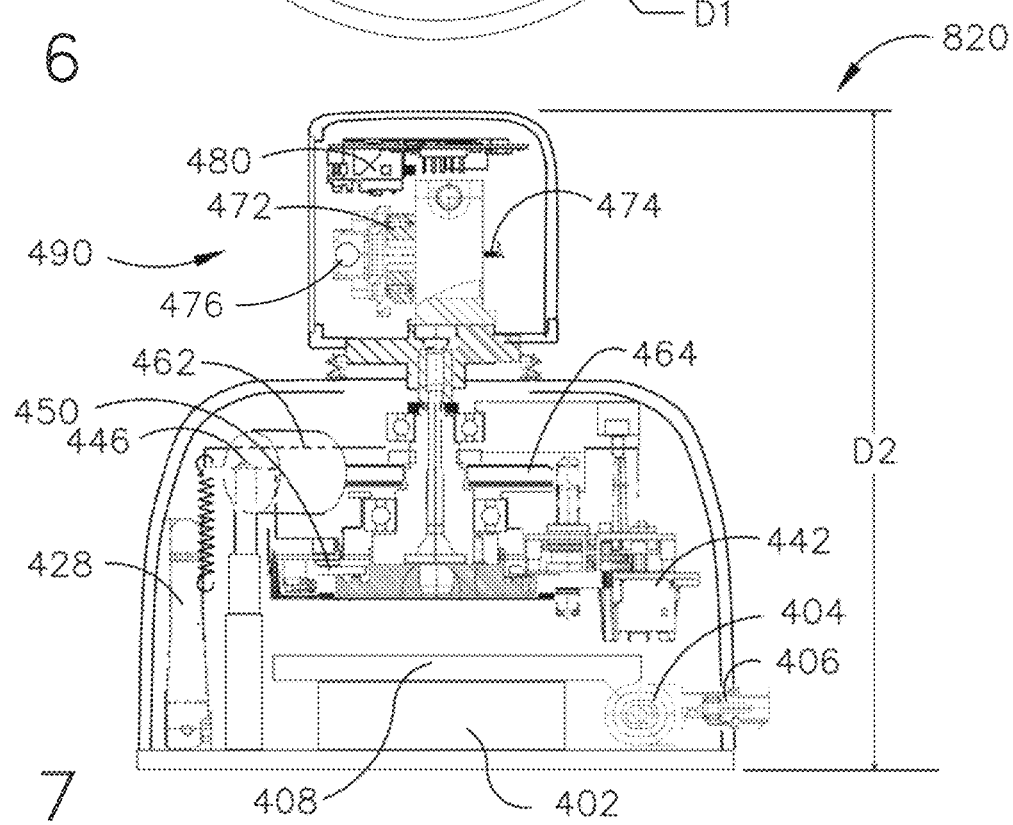
FIG. 7 is an elevational view in cross-section of the exemplary laser controller of FIG. 6.

Referring now to FIGS. 6 and 7, an exemplary laser controller 820 is illustrated in a top, plan view and a side, elevational cross-section view. The electronic distance instrument 480 is placed near the top of the laser controller package, so that its distance measuring laser beam output is directed at an elevation of approximately six inches (152 mm) above floor level, once the laser controller 820 is placed on a jobsite floor surface. The exemplary laser controller 820 has proposed dimensions "D1" and "D2;" the proposed overall outer dimension "D1" is about 6.28 inches (160 mm) in diameter, while the proposed overall outer dimension "D2" is about 6.89 inches (175 mm) in height.

Also placed near the top of the laser controller assembly 820 is the laser transmitter 472, which has an associated circuit board 474 and a laser fan cylinder lens 476. The cylinder lens 476 receives a focused laser beam, and converts that optical energy into a fan beam that is spread into a laser plane by the cylinder lens, as illustrated at 734, for example.

The entire top portion of the laser controller assembly, generally designated by the reference numeral 490, is able to rotate completely around its circumference at a 360 degree angle, so that any desired heading can become the "aiming angle" of interest for the fan beam laser plane, and for the electronic distance instrument directional output of this laser controller 820. An azimuth drive subassembly is provided that controls the heading of the "aiming angle," which includes the azimuth drive motor 462, an azimuth drive disk 464, and an angle encoder 450.

To make the laser controller 820 fully automatic, it is preferred to include a self-leveling platform, which includes the leveling motor 442, a level sensor 444 (not shown on FIGS. 6 and 7), and a leveling platform pivot at 446.

A battery pack 402 is included at the bottom portion of the laser controller 820, so that replacement of the batteries will be easily done, using an access cover on the bottom of the enclosure. A power switch is included at 404, and a charging jack at 406. A main circuit board is located near the bottom of the laser controller, at 408. In addition, an antenna 428 is included inside the enclosure for receiving and transmitting wireless signals.

Use of the Laser Receiver Target Movable Accessory

Referring now to FIG. 8, the user can easily find a point of interest on the jobsite floor 200 by maneuvering the accessory 10 so that the target screen 12 intercepts the distance meter laser line 232 at any distance from the laser controller 820, and along the heading provided by a laser light fan beam 734. It should be noted that the laser fan beam 734 will extend all the way between its uppermost edge 736 and its lowermost edge 730. Therefore, the laser fan beam 734 will produce a visible vertical laser light line 712 on the target screen surface 12. This is a highly visible vertical line that the user will easily see while using the accessory 10, and all that the user needs to do is move the accessory back and forth—while keeping the accessory 10 within the visible laser fan beam 734—until finding the correct distance.

The LDM 480 of the laser controller 820 will measure that distance at 232 between the target screen 12 and the laser transmitter 472, and display the distance on the tablet's display monitor 342. In addition, an indication can be provided as to whether the user should move closer in toward the transmitter, or to move farther out from the transmitter, or to stand still if the user is "on point".

If a distance correction from the laser distance meter 480 to the accessory 10 must be made, the accessory is easily moved forward and back along the heading indicated. As noted above, while correcting the distance, the user only needs to keep the accessory 10 within the correct heading, which is visibly indicated in a manner that is quite difficult to miss. And once the correct distance from the laser controller 820 is attained along the appropriate heading, the point of interest at 240 can then be marked on the floor 200 at the bottom edge of the target screen 12 (see FIG. 8). The point of interest 240 is easily found by looking for the LED that is turned on 766, which indicates the received path of the laser beam 712 at the photosensor(s) of the laser receiver 30.

The accessory 10 offers certain advantages, including a structure that mounts the useful elements of the target screen 12 and tablet-remote controller 300 on one easy-to-maneuver frame. A handle can be folded flat against the frame of the accessory, for easy stowing when not in use. The accessory 10 allows the user to search and find the point of interest while standing, thus saving wear and tear on his knees, hips and back, which otherwise could result with the alternative of crawling around on all fours, or bending low over and over.

Figure 16:
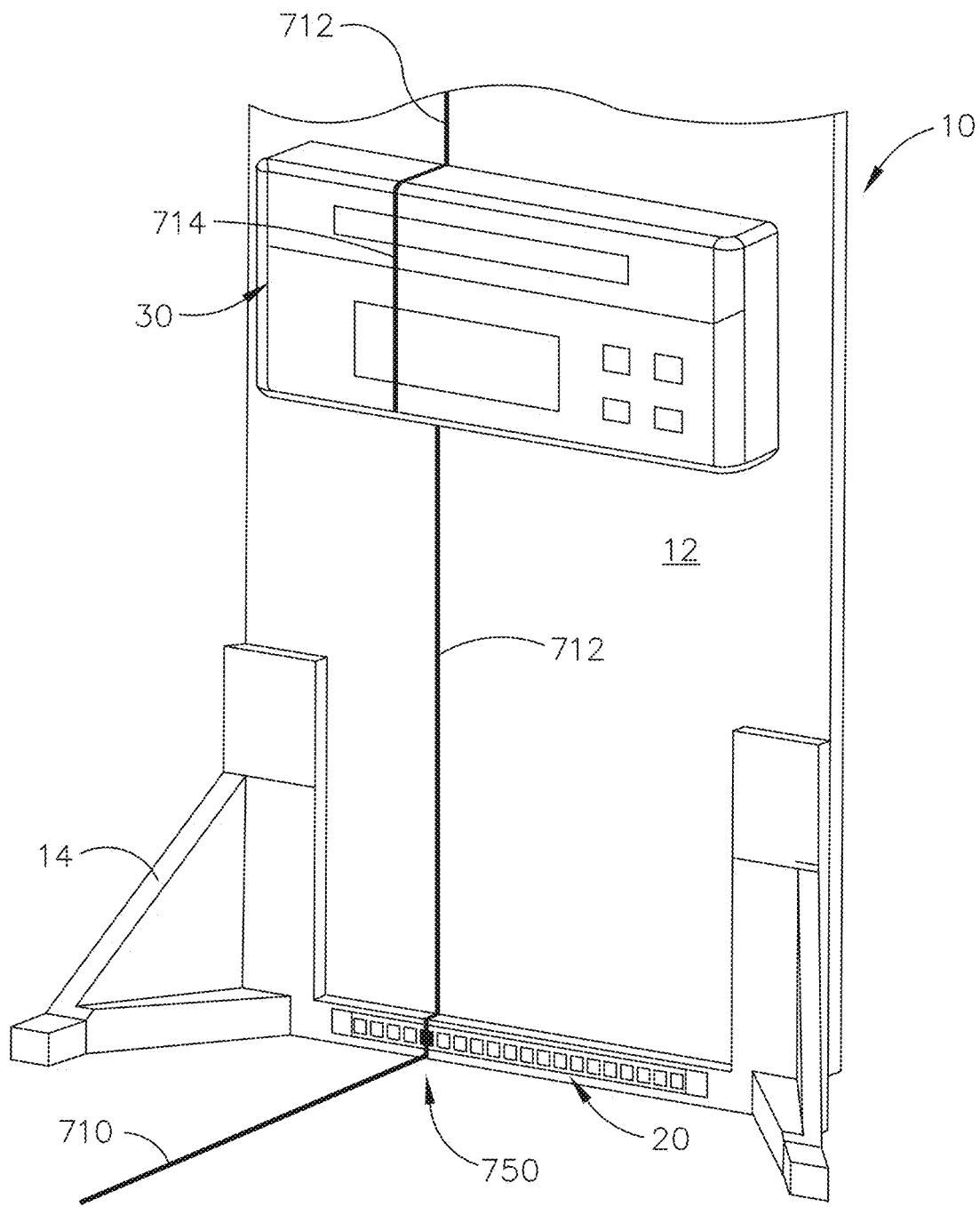
FIG. 16 is a front perspective view of a laser light line crossing the floor and the laser receiver of the movable target accessory of FIG. 1, and illuminating a corresponding LED to indicate where the laser light line intersects the floor.
Figure 17:
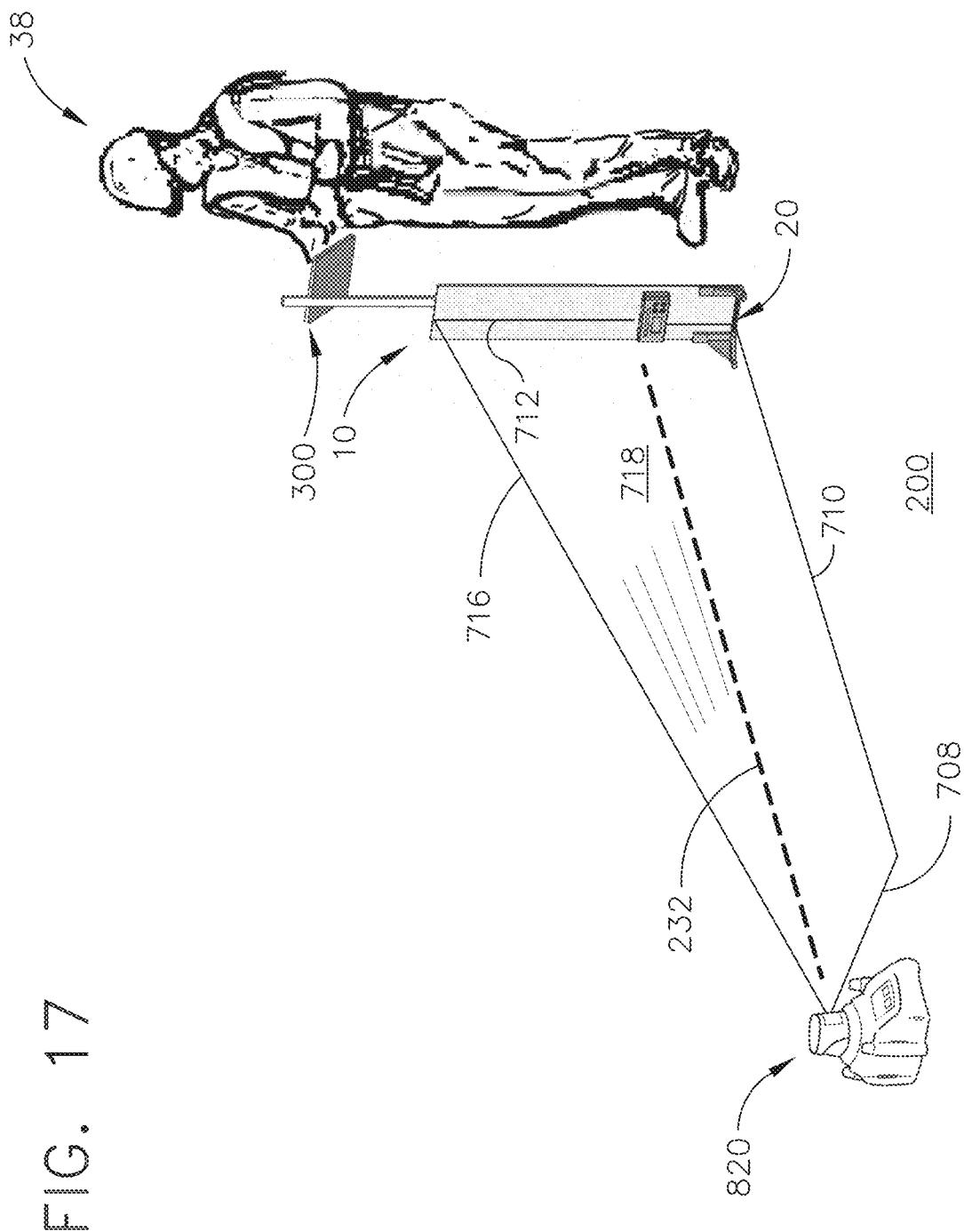
FIG. 17 is a diagrammatic view of a human user operating the movable target accessory of FIG. 1 and interacting with a laser controller and remote controller to constitute a layout and point transfer system.

Once the target screen 12 has been moved to the correct position on the jobsite surface, if the fan beam extends down to the floor surface, as in FIG. 17, the intersection of the horizontal laser light line 710 and the vertical laser light line 712 directly and visually indicates the location of the current point of interest to the user. These two laser light lines provide a type of L-shaped mark (or "L-mark") on the jobsite surface and movable target surface. The elbow point of that lighted "L-mark" (at, or near, the bottom of the visible vertical light line, for example) will be directly at the point of interest. In this new equipment, i.e., the movable accessory 10, one of the LEDs in the array 20 will also be illuminated; see LED 750 on FIG. 16.

It should be noted that the visible horizontal laser light line 730 does not necessarily need to extend all the way down to the floor level at the point of interest 240. For example, if the jobsite floor surface is uneven (a common occurrence), then the laser plane 734 might not reach the floor surface by the time it crosses the point to be marked (i.e., at the point of interest 240). However, the new system will work just fine anyway, because the bottom edge 730 of the vertical laser light plane 734 will continue along the same heading, just at a slightly higher altitude just off the floor surface. So long as the vertical laser light plane impacts laser receiver 30, mounted on the target screen 12, it will impart a highly visible vertical line on that target screen 12. If the target screen 12 is plumb (i.e., vertical), as designed, then the laser light line 712 will "aim" directly down toward the desired point of interest, once the accessory 10 has been placed at the correct distance from the electronic distance measuring instrument 480 of the laser controller 820. In this situation, the user may not literally see an "L-mark" right at the point of interest, but the vertical laser light line 712 on the target screen 12 will nevertheless provide an accurate location for marking the point of interest on the jobsite floor surface. Moreover, one of the LEDs of the array 20 will be illuminated, which provides a close reference for where the POI should be marked on the floor.

In addition to the variation discussed in the previous paragraph, in an alternative embodiment the laser plane could emanate in a manner such that the bottom edge of the laser plane never touches the jobsite floor surface. In this arrangement, there would be no visible laser light line running horizontally across the floor, however, the user could easily find the visible wavelength laser plane merely by walking across the jobsite floor with the target screen in hand, while moving in a non-radial direction with respect to the laser controller. Once the target screen intercepted the laser plane, a vertical line of visible laser light would become very noticeable and the user would know that the desired radial direction had been found. The user could then move in that now-visible radial direction until reaching the correct distance from the laser controller; that circumstance of course would then indicate that the desired point of interest had been found.

On FIG. 8, a control line 224 is depicted as being offset from a centerline 214 between to vertical I-beams 210 and 212. A first control point CP1 is designated at 220, along the offset control line 224, which is offset by a distance dimension at 225. The laser controller 820 is positioned at a pair of X-Y centerlines 226 and 228, which are offset from parallel lines 216 and 218, which themselves intersect the I-beams 210 and 212 along the jobsite floor 200. The correct heading from the laser controller 820 to the point of interest 240 diverges from the parallel line 226 by an angle θ.

The drawings generally depict the laser receiver 30 as being mounted in a horizontal orientation on the panel 12, and this horizontal orientation is the preferred embodiment. However, it will be understood that the orientation of the laser receiver does not necessarily need to be strictly horizontal. In general, the laser receiver must be mounted in a non-vertical orientation, but that is its main limitation. (If it was mounted vertically, then it would be impossible for that laser receiver to determine a "horizontal" position of a change in azimuth angle from the laser transmitter 472.)

For example, if the laser receiver was mounted at an orientation that is 10 degrees from the horizontal, then the math involved would be somewhat more complex, but the trigonometry for calculating the "horizontal" position of a vertical laser plane "hit" on the laser receiver is well known. That extra triangular relationship (i.e., a triangular with one side horizontal, one side vertical where the laser line exists from the laser plane, and the hypotenuse along that 10 degree orientation of the laser receiver) would be used to establish the horizontal position along the array of LEDs 20 where the vertical laser plane would impact one of those LEDs if the laser plane is able to reach that far down on the panel 12.

Furthermore, the vertical position where the laser receiver is mounted on the panel 12 is another important factor. The higher it is positioned, the more "clutter" on the jobsite floor that can be accommodated while using this point layout system. For example, it could be mounted 18 inches above the bottom edge of the panel 12 (where the LEDs are located); in that instance, the laser plane from the laser transmitter would still reach the laser receiver 30, even if a floor obstruction of just under 18 inches in height was resting on the floor at a position that was directly between the laser controller 820 and the movable accessory 10. Such a configuration could also overcome a situation where the floor level stepped down by just under 18 inches where the movable accessory 10 was positioned during measurements. (Strictly speaking, it is the photosensor 32 that must be positioned high enough to receive the laser plane 734 emitted by the laser transmitter 820.)

In the above description, it was noted that the laser distance meter's (LDM) laser beam output 232 could be arranged so that it was about six (6) inches above floor level. If that dimension is indeed designed into a particular laser controller 820, then it would be recommended that the laser receiver 30 that is mounted on the panel 12 should not be mounted at that same six-inch vertical dimension from the bottom edge of the panel. It is preferred that the LDM have a smooth, non-obstructed target to "aim" at on the panel 12. And, it should be noted that this six-inch height of the LDM laser beam becomes the true limitation of just how much "clutter" can be overcome by this system. If one knows that a jobsite floor will have 12-inch obstructions that need to be overcome during layout measurements, then one either needs to design a laser controller 820 that is at least twelve (12) inches tall (for the LDM beam 232, and for the laser plane output 734), or one must mount the laser controller 820 on a pedestal.

The drawings also generally depict the array of LEDs 20 as being mounted in a horizontal orientation on the panel 12, and this horizontal orientation is again the preferred embodiment. However, it will be understood that the orientation of the array of LEDs does not necessarily need to be horizontal, nor does it even need to be linear. The LEDs should be mounted in relatively close proximity to the bottom edge of the panel 12, and the closer the LEDs are to that bottom edge, the easier it will be for the user on the jobsite floor to see exactly where to mark the point of interest (POI) on that jobsite floor. But a linear, and horizontal orientation of the LED array is not strictly required.

The true requirement is that the LEDs 20 be arranged so as to have the ability to indicate a plurality of different azimuth positions along the bottom edge of the panel 12. Of course, those different azimuth positions are perceived as being at different horizontal positions, in terms of the Earth's surface and how the user will view things on the jobsite. The general requirement is that there be a plurality of indicating lights that are located at different horizontal positions, and that those indicated lights be mounted proximal to the bottom edge portion of the movable accessory 10.

It will also be understood that the "array of LEDs" 20 can comprise other types of light-emitted devices other than LEDs, and that the so-called "array" need not be an actual array of electronic devices. As a minimum requirement, there does need to be a plurality of light-emitting devices that are spaced-apart from one another, and they need to cover at least a modicum of horizontal distance (to make the overall accessory useful to the user on the jobsite). This plurality of light-emitting devices (or "photoemitters") should be placed proximal to the bottom portion of the movable accessory 10, for ease of use in visually showing the user where to literally mark the floor surface, to indicate that point of interest. But again, the plurality of photoemitters does not need to be in a straight line, or strictly horizontally-oriented.

Finally: the photoemitters could comprise a set of fiber optic cables that terminate proximal to the bottom portion of the movable accessory 10. The other end of the fiber optic cables could connect to one or more LEDs (or other type of light source) that is/are located much higher on the panel 12, if desired. The light signals themselves could be multiplexed, if desired. Other arrangements of light sources and optic cables could further be used that have not yet been invented, without departing from the principles of this present technology.

Alternative Versions of the Movable Accessory

FIGS. 18-23 illustrate various versions of how the LEDs may turn on when the accessory is in a fan beam (or in multiple fan beams). This is not an exhaustive set of versions, and it should be noted that other combinations not illustrated herein are still included in the technology disclosed herein.

Figure 18:
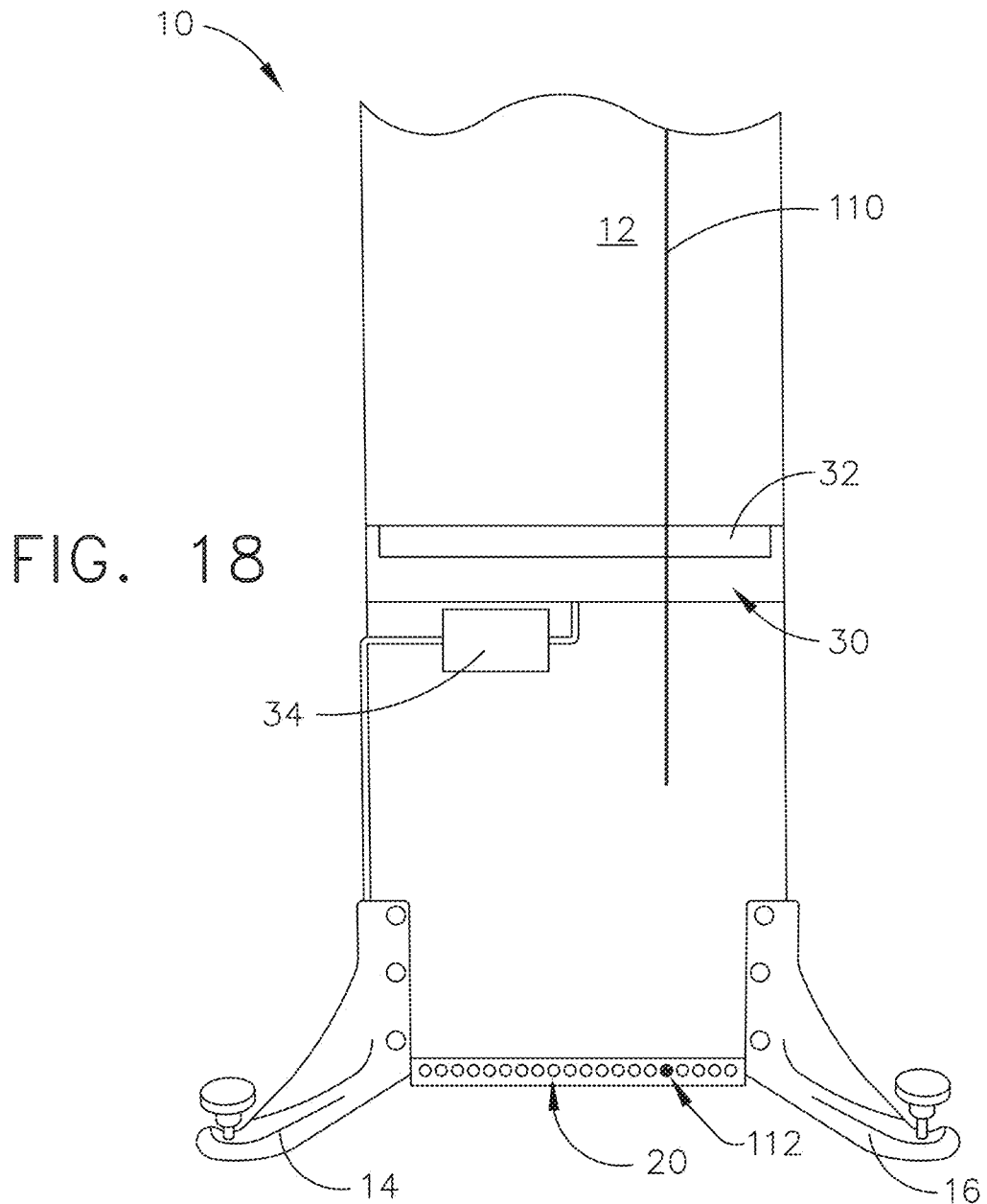
FIG. 18 is a front view of a laser light line crossing the laser receiver of the movable target accessory of FIG. 1, and illuminating a corresponding LED to indicate where the laser light line intersects the floor.

Referring now to FIG. 18, a first version of a first embodiment of the movable accessory 10 is depicted. A vertical laser light line 110 is illustrated crossing the laser receiver 30, and its photosensor 32. This laser light 110 does not extend all the way down to the bottom of panel 12 in this example, because that portion is either blocked by an object or the fan beam did not extend all the way to the floor surface (as seen in FIG. 8). A corresponding LED is turned on at 112, indicating to a user where to mark the point of interest on the jobsite floor.

Figure 19:
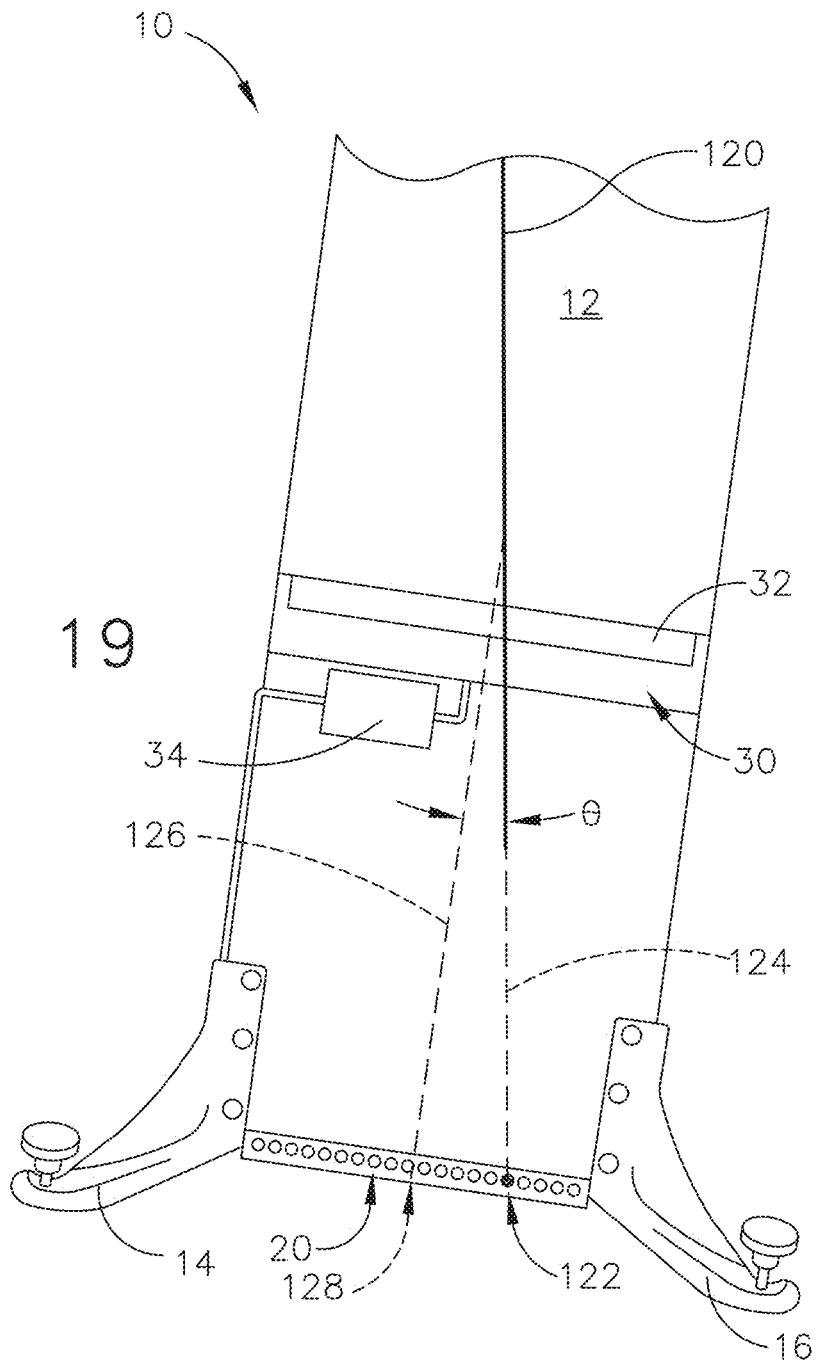
FIG. 19 is a front view of a laser light line crossing the laser receiver of the movable target accessory of FIG. 1, while the movable target accessory is tilted somewhat askew, and illuminating a corresponding LED to indicated where the laser light line intersects the floor at a position that is corrected for the tilt angle.

Referring now to FIG. 19, the movable accessory 10 is depicted in a tilted orientation. A vertical laser light line 120 is illustrated which does not extend all the way down to the bottom of panel 12. The laser light line 120 would continue as a dashed line 124, to illustrate the effect the tilted accessory 10 has on the true location of where the POI exists on the floor. Dashed laser line 126 depicts the direction of where the laser light line intersects the photosensors 32. The laser light line 120 intersects the LED array 20 at an LED located at 128. However, the tilt compensator adjusts for this "slanted laser line", and the compensated LED located at 122 will instead be turned on.

Figure 20:
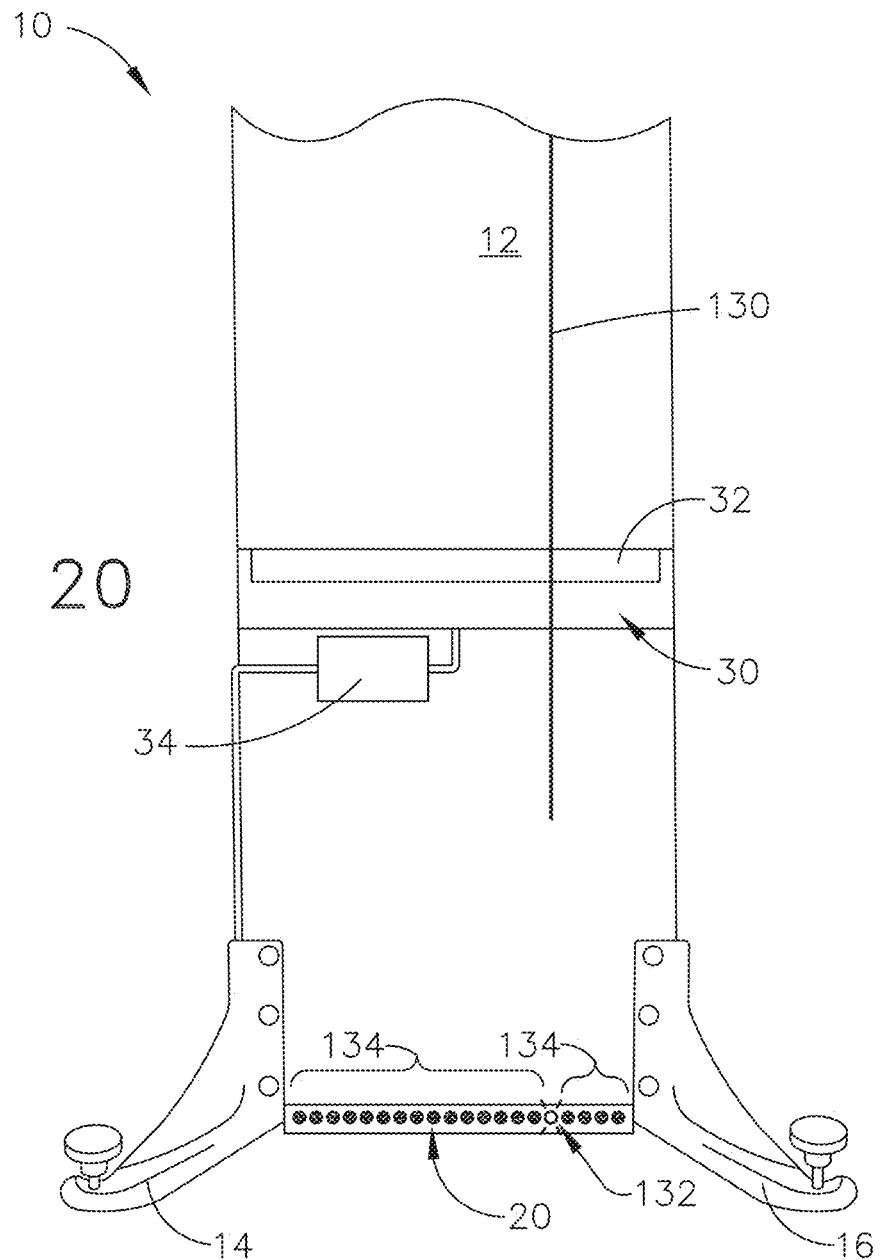
FIG. 20 is a front view of a laser light line crossing the laser receiver of the movable target accessory of FIG. 1, depicting all the LEDs being illuminated in one color, but the corresponding LED that indicates where the laser light line intersects the floor is illuminated in a different color.

Referring now to FIG. 20, a second version of the first embodiment of the movable accessory 10 is depicted. A vertical laser light line 130 is depicted crossing the laser receiver 30 of the photosensors 32, but does not extend down to the bottom of panel 12. In this version, the entire bank of LEDs is turned on in a first color at 134, except a single LED at 132 is turned on in a second, different color. This single LED at 132 is indicating the compensated laser light line position where the user should mark the jobsite floor as the desired point of interest.

Figure 21:
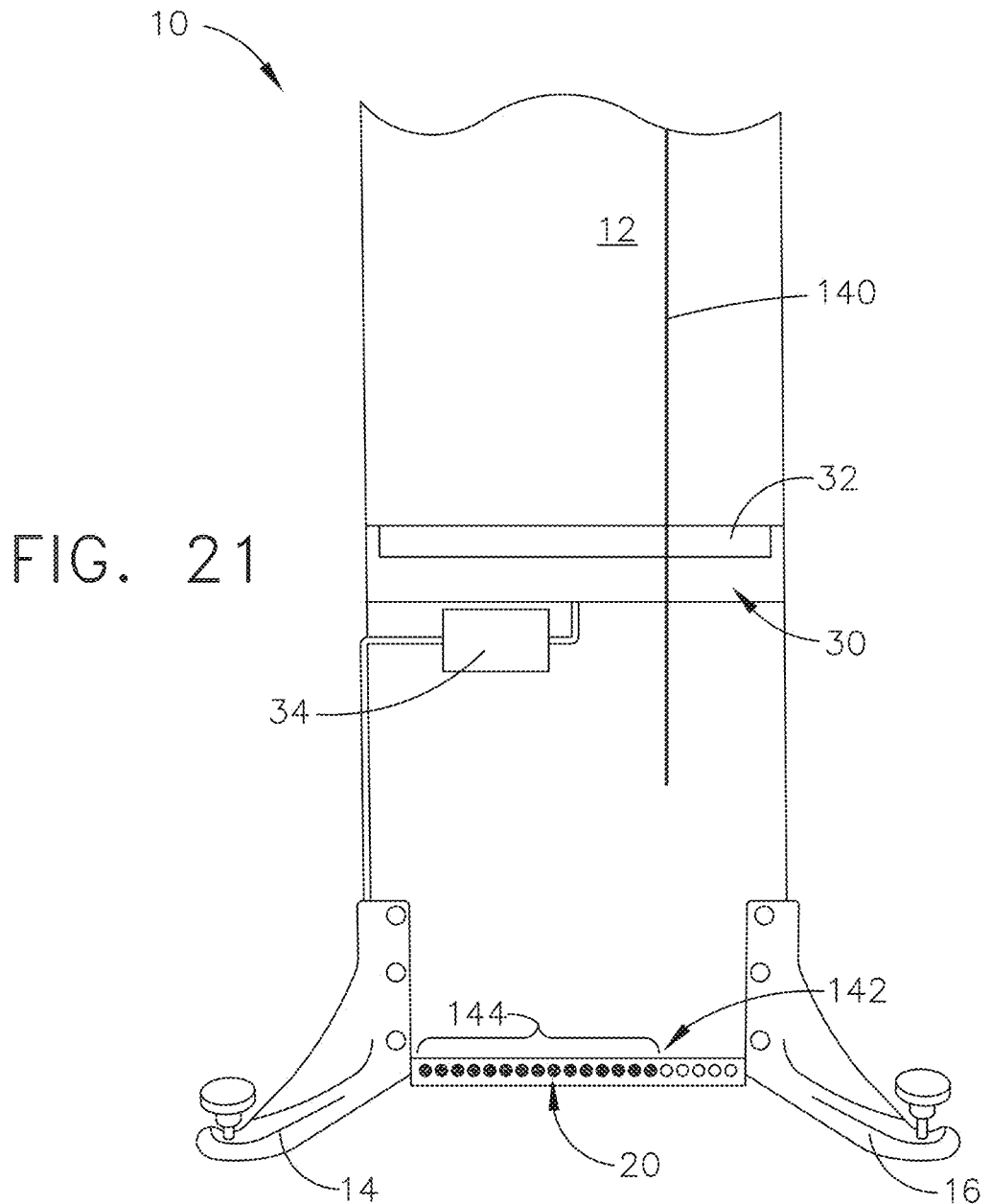
FIG. 21 is a front view of a laser light line crossing the laser receiver of the movable target accessory of FIG. 1, depicting all the LEDs being illuminated in one color from one side of the accessory to the position where the laser light line crosses, and the other LEDs are not lighted.

Referring now to FIG. 21, a third version of the first embodiment of the movable accessory 10 is depicted. A vertical laser light line 140 is depicted crossing the photosensors 32 of the laser receiver 30, but does not extend down to the bottom of panel 12. Several of the LEDs are turned on at 144, indicating that the laser fan beam has impacted on panel 12, indicating which side of panel 12 the laser line 140 first crossed the front surface 12 of the accessory 10. The last LED to turn on, at 142, indicates the compensated laser light line position, thus indicating where the user should mark the jobsite floor as the desired point of interest. Note, that the LEDs will turn on if the laser light line first crosses from the left side of the accessory 10 (as in this view), or if it first crosses from the right side of the accessory, the right portion of the LED array 20 would be illuminated.

Figure 22:
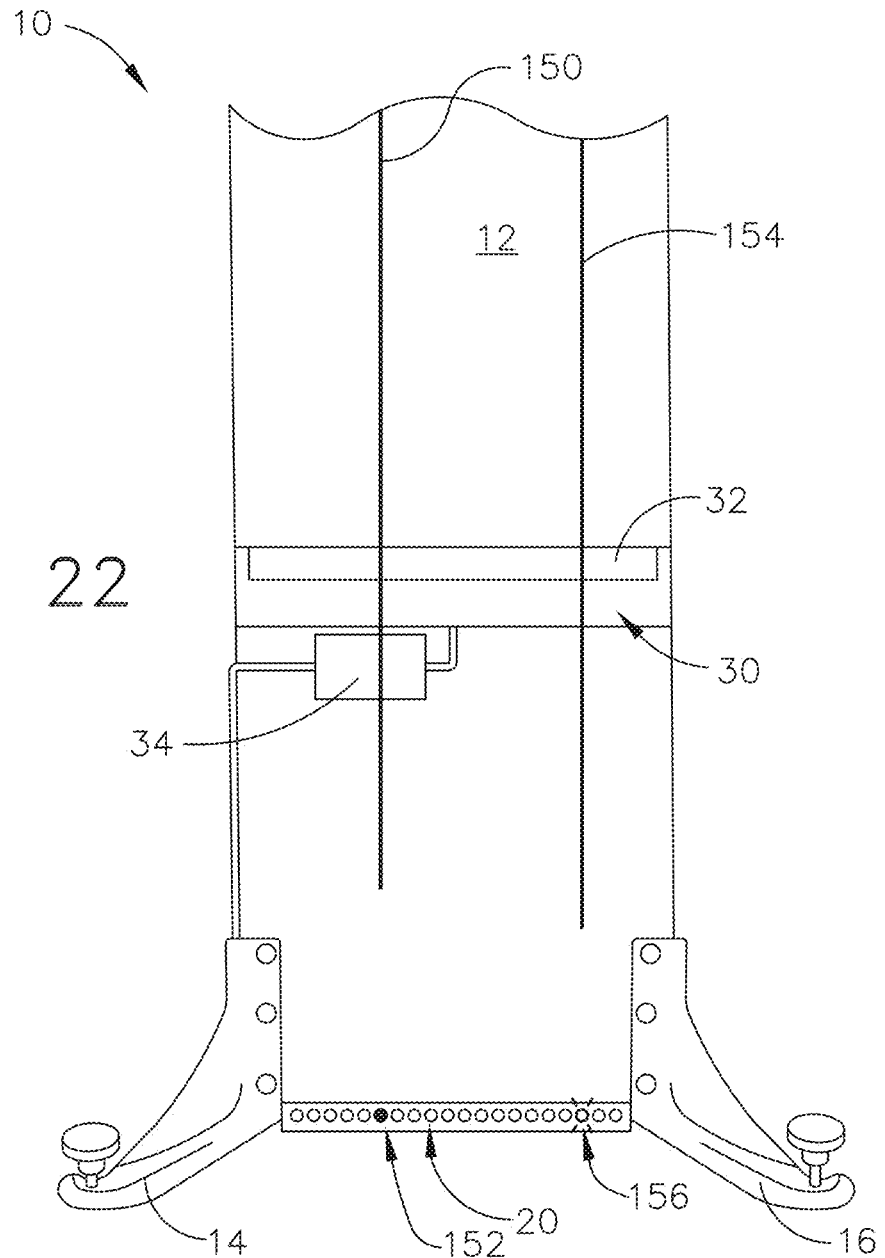
FIG. 22 is a front view of two laser light lines crossing the laser receiver of the movable target accessory of FIG. 1, in which one LED is illuminated in one color to indicate the position of a first laser light line, and a second LED is illuminated in a second color to indicate the position of a second laser light line.

Referring now to FIG. 22, a fourth version of the first embodiment of the movable accessory 10 is depicted. A first vertical laser light line 150 is depicted, as is a second vertical laser light line 154. Both laser light lines 150 and 154 cross the photosensor 32 of the laser receiver 30, but do not extend down to the bottom of the panel 12. In this version, each of the LEDs 20 are able to display multiple colors. The first compensated laser light line is indicated on the LEDs at 152, illuminated in a first color. The second compensated laser light line is indicated on the LEDs at 156, illuminated in a second, different color. Note, that the entire bank of LEDs is capable of displaying both colors, to indicate either, or both, laser lines.

Figure 23:
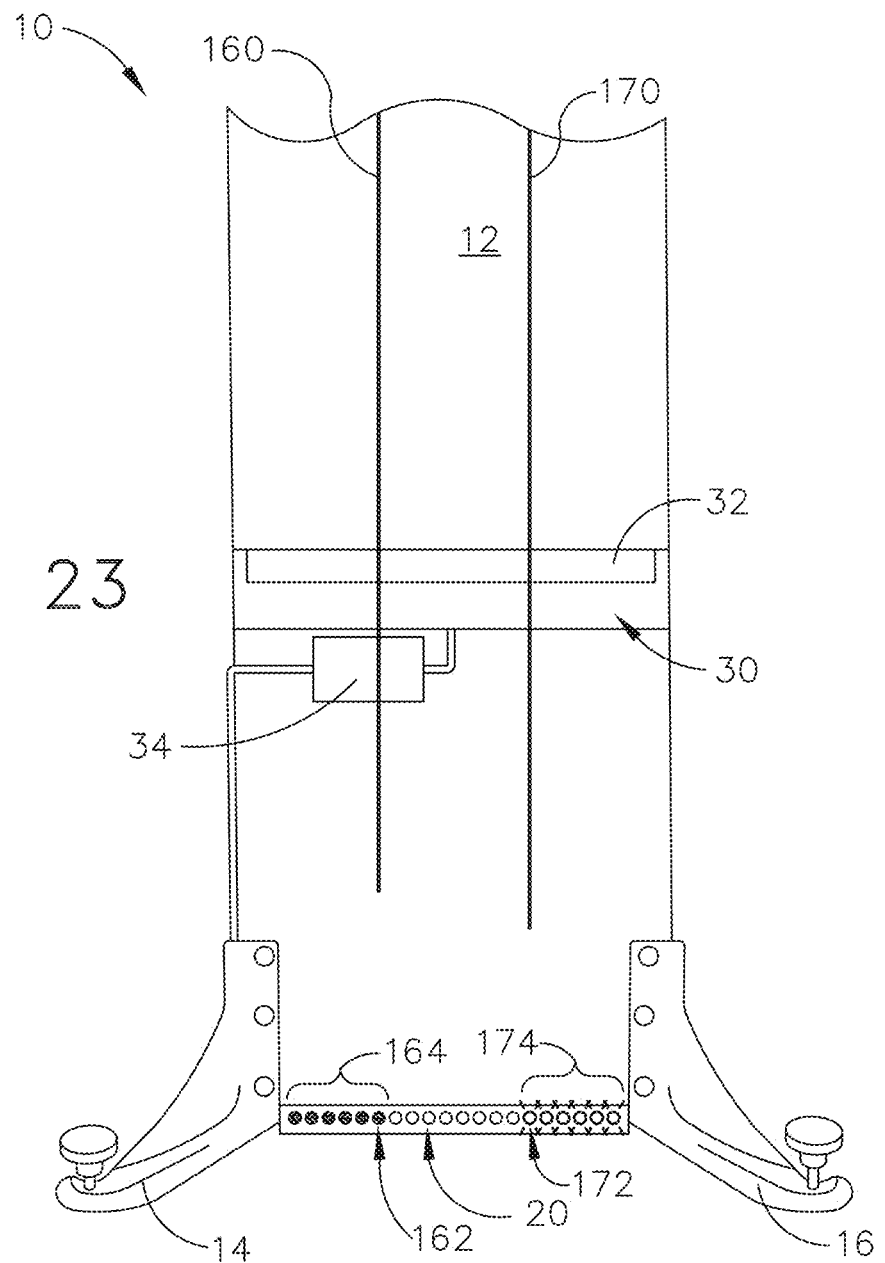
FIG. 23 is a front view of two laser light lines crossing the laser receiver of the movable target accessory of FIG. 1, in which all the LEDs are illuminated in one color from the left side of the accessory to the position where the first laser light line crosses, and all the LEDs are illuminated in a second color from the right side of the accessory to the position where the second laser light line crosses.

Referring now to FIG. 23, a fifth version of the first embodiment of the movable accessory 10 is depicted. A first vertical laser light line 160 is depicted, as is a second vertical laser light line 170. Both laser light lines 160 and 170 cross the photosensor 32 of the laser receiver 30, but do not extend down to the bottom of the panel 12. Similar to FIG. 22, each of the LEDs 20 are capable of displaying multiple colors. However, multiple LEDs are set to turn on when a laser line crosses the accessory, similar to the version of FIG. 21. Accordingly, the LEDs at 164 are turned on in one color to indicate where the first laser light line 160 initially crossed the front surface 12 of the accessory 10. The final LED 162 is turned on in the same color as the LEDs of 164, which indicates the compensated "bottom" position of the first laser light line 160. The same steps occur for the second laser light line 170. The LEDs at 174 are turned on in a second, different color to indicate where the second laser light line 170 first crossed the front surface 12 of the accessory 10. The final LED 172 is turned on in the same second, different color as the LEDs at 174, which indicates the compensated "bottom" position of the second laser light line 170.

Flow Charts: Movable Accessory Procedure

FIGS. 10-14 are flow charts illustrating various alternative versions of how the movable accessory 10 functions in operation. In general, these flow charts will correspond to the alternative versions that were described above, in connection with FIGS. 18-23.

Figure 10:
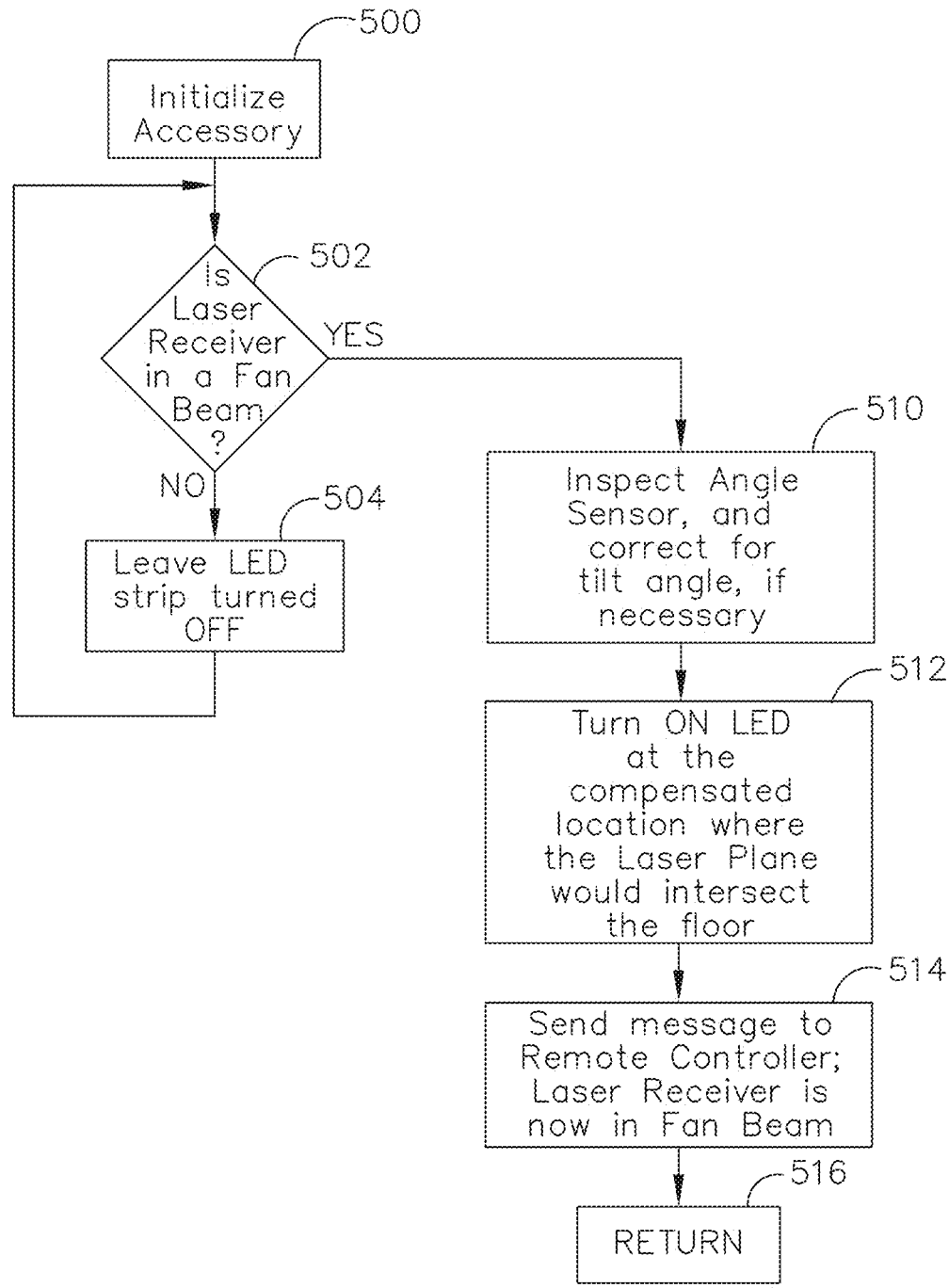
FIG. 10 is a flow chart of certain steps performed by the laser receiver sensing a single laser light line of a first version of a first embodiment of the movable target accessory of FIG. 1.

Referring now to FIG. 10, a flow chart is provided to show some of the important steps for using the accessory 10 with a laser controller 820. The flow chart of FIG. 10 involves the accessory functions for the accessory illustrated in FIGS. 18 and 19.

FIG. 10 involves logic steps to be performed by the movable accessory 10. The first step at the beginning of this flow chart is an initialization step 500. Next, the laser receiver checks if it is presently in a fan beam, at a decision step 502. If it is not, then the LED strip (the array of LEDs) is left turned off at a step 504. However, if it is in a fan beam, then the laser receiver inspects the angle sensor, and corrects for tilt angle, if necessary, at a step 510.

Next, at a step 512, an LED is turned on at the compensated (or corresponding) location where the laser plane would intersect the floor. Then, at a step 514, the laser receiver sends a message to the remote controller that it is now in a fan beam. Lastly, the system returns to other functions at a step 516.

It will be understood that the tilt angle of the accessory 10 that is depicted in FIG. 18 was zero degrees from the vertical. In that situation, the "compensated" location of the laser fan beam's projected intersection at the bottom of the panel 12 would be exactly the same as the "non-compensated" location of that projected intersection. On FIG. 18, that single location is indicated at the LED 112. However, on FIG. 19, the illustrated tilt angle of the accessory 10 is not zero.

If the tilt angle is other than zero (as depicted in FIG. 19), then the operation of the logical steps in the flow chart of FIG. 10 remain the same, except the math will work out to have a different result. As seen on FIG. 19, the LED to be illuminated is not at the same location as where the photosensor 32, if uncompensated for tilt angle, would indicate. Instead of the LED at 128 being illuminated, the correct LED at 122 would be illuminated. The flow chart of FIG. 10 would correctly calculate that result at the step 510, and would command the LED at 122 to turn on (instead of LED at 128), at the next logic step 512.

The remaining flow charts of FIGS. 11-14 will operate in the same manner, with respect to tilt angle compensation. However, the example diagrams of the versions in FIGS. 20-23 all show a zero tilt angle, for ease of discussion herein.

Figure 11:
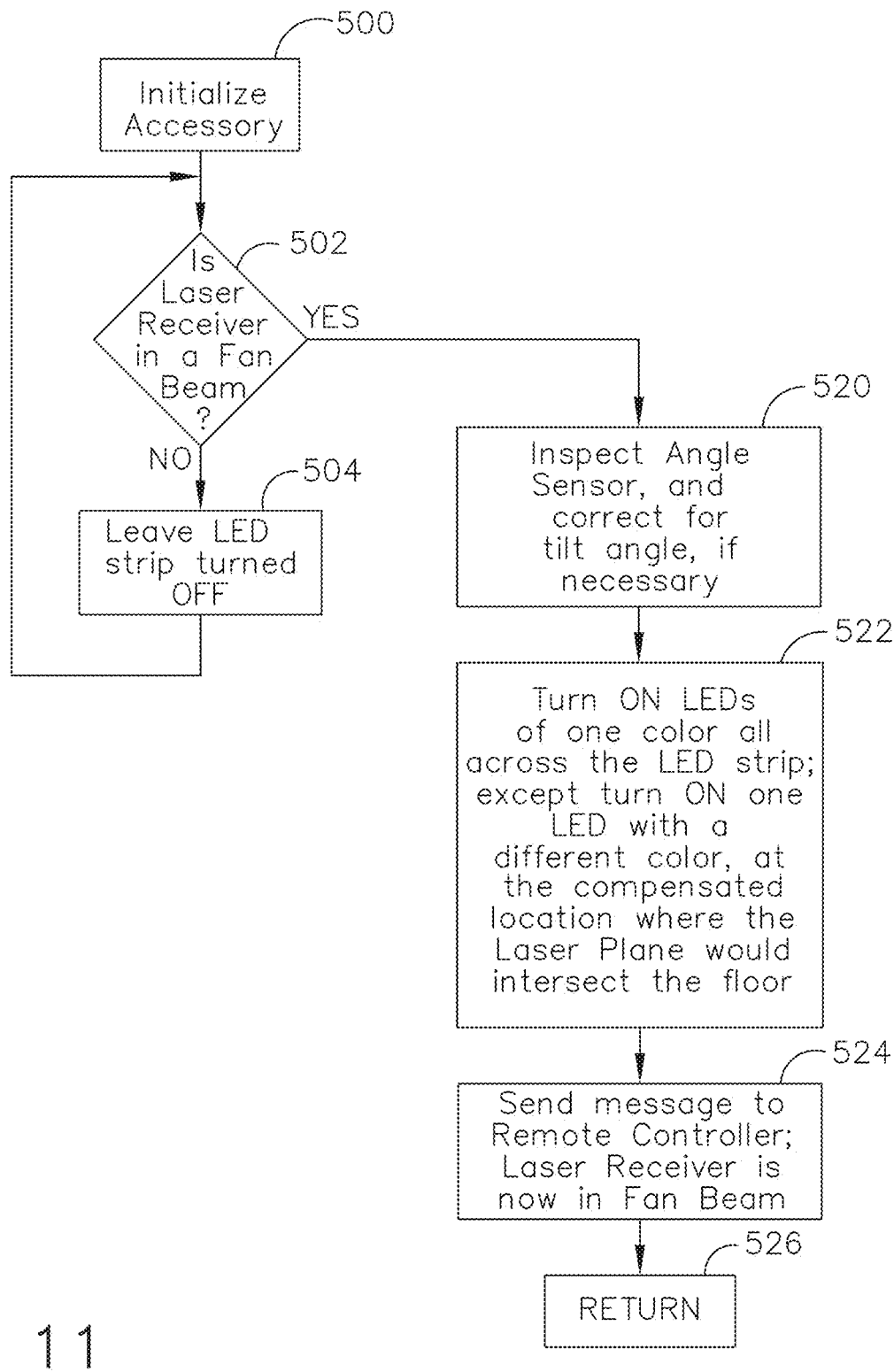
FIG. 11 is a flow chart of certain steps performed by the laser receiver sensing a single laser light line of a second version of a first embodiment of the movable target accessory of FIG. 1.

Referring now to FIG. 11, a flow chart is provided that involves the accessory functions for the accessory illustrated in FIG. 20. First, the accessory must be initialized at a step 500. Next, the laser receiver determines if it is presently in a fan beam at a decision step 502. If not, then the LED strip is left turned off at a step 504. However, if it is in a fan beam, then the angle sensor inspects the tilt angle, and corrects if necessary, at a step 520.

At a step 522, all the LEDs are turned on one color, except for the compensated location where the laser plane would intersect the floor. That LED is turned on using a second, different color. Then a message is sent to the remote controller that the laser receiver is in a fan beam at a step 524. Last, the system returns to other functions at a step 526.

Figure 12:
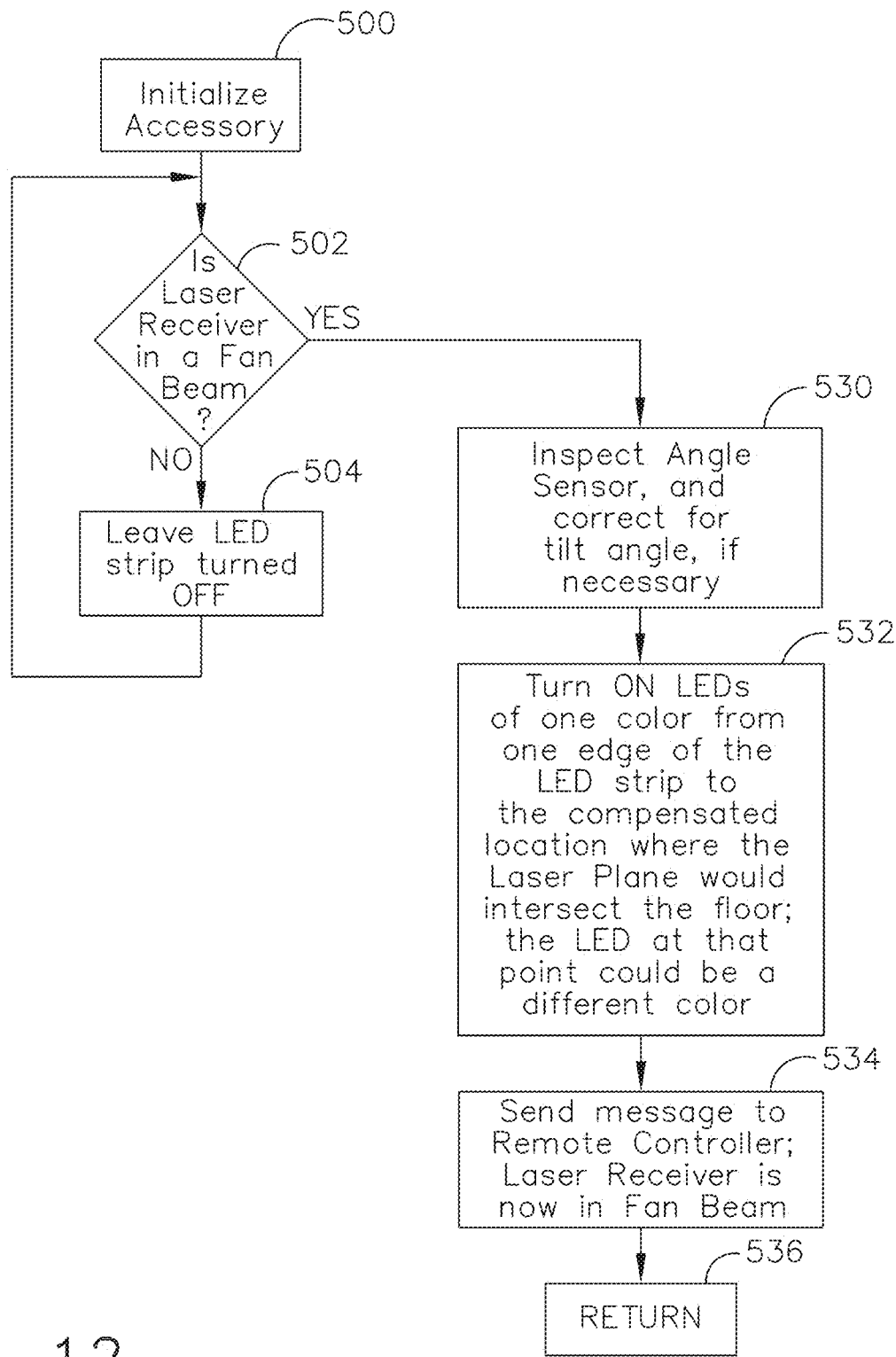
FIG. 12 is a flow chart of certain steps performed by the laser receiver sensing a single laser light line of a third version of a first embodiment of the movable target accessory of FIG. 1.

Referring now to FIG. 12, a flow chart is provided that involves the accessory functions for the accessory illustrated in FIG. 21. Similar to FIGS. 10 and 11, the first step is to initialize the accessory at a step 500. Next, the laser receiver determines if it is presently in a fan beam at a decision step 502. If it is not, then the LED strip is left turned off at a step 504. However, if it is in a fan beam, then the system inspects the angle sensor, and corrects for tilt angle, if necessary, at a step 530.

At a step 532, LEDs are turned on in one color from one edge of the LED strip to the compensated location where the laser plane would intersect the floor. At that compensated point, the LED could be illuminated in a second, different color. At a step 534, a message is sent to the remote controller that the laser receiver is in a fan beam. Last, at a step 536, the system returns to executing other functions.

FIGS. 10-12 illustrate flow charts of versions involving a single laser beam. However, FIGS. 13 and 14, discussed below, illustrate versions involving up to two laser beams that are being emitted by two different laser controllers on the same jobsite floor.

Figure 13:
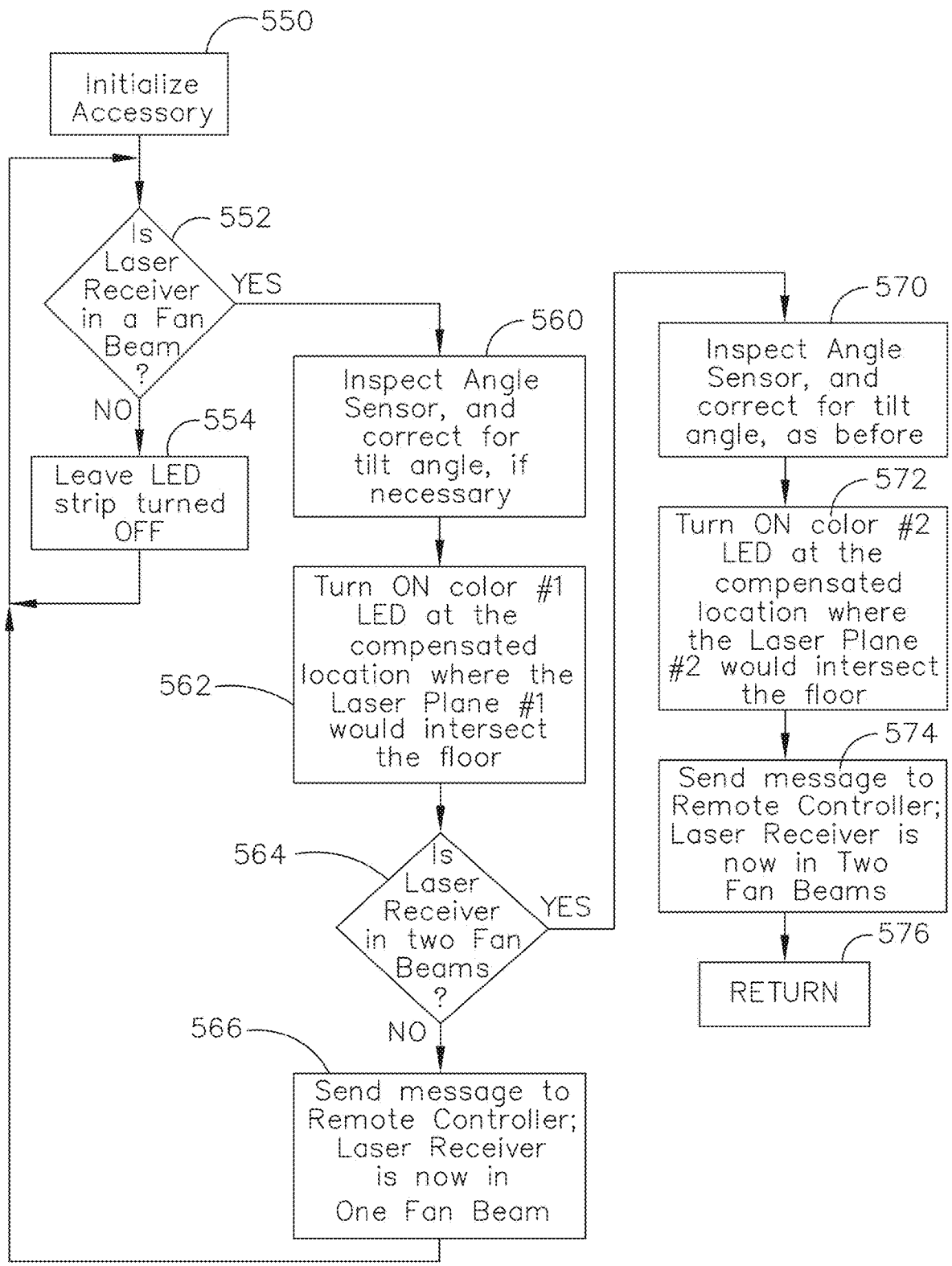
FIG. 13 is a flow chart of certain steps performed by the laser receiver sensing two laser light lines of a fourth version of a first embodiment of the movable target accessory of FIG. 1.

Referring now to FIG. 13, a flow chart is provided that involves the accessory functions for the accessory illustrated in FIG. 22. First, the accessory is initialized at a step 550. Then the laser receiver determines if it is presently in a fan beam at a decision step 552. If it is not, then the LED strip is left turned off at a step 554. However, if it is in a fan beam, then the system inspects the angle sensor, and corrects for tilt angle, if necessary, at a step 560. Then, at a step 562, one LED is turned in on one color at the compensated location where the first laser plane would intersect the floor.

Next, the laser receiver checks if it is in two fan beams at a decision step 564. If it is not, then at step 566, a message is sent to the remote controller that the laser receiver is now in one fan beam. However, if the laser receiver is presently in two fan beams, then, at a step 570, the system inspects the angle sensor, and corrects for tilt angle, if necessary. (This is with respect to the second laser fan beam.) Next, at a step 572, a second LED is turned on in a second, different color, where the compensated location of the second laser plane would intersect the floor. Then, at a step 574, a message is sent to the remote controller that the laser receiver is now in two fan beams. Last, at a step 576, the system returns to executing other functions.

Figure 14:
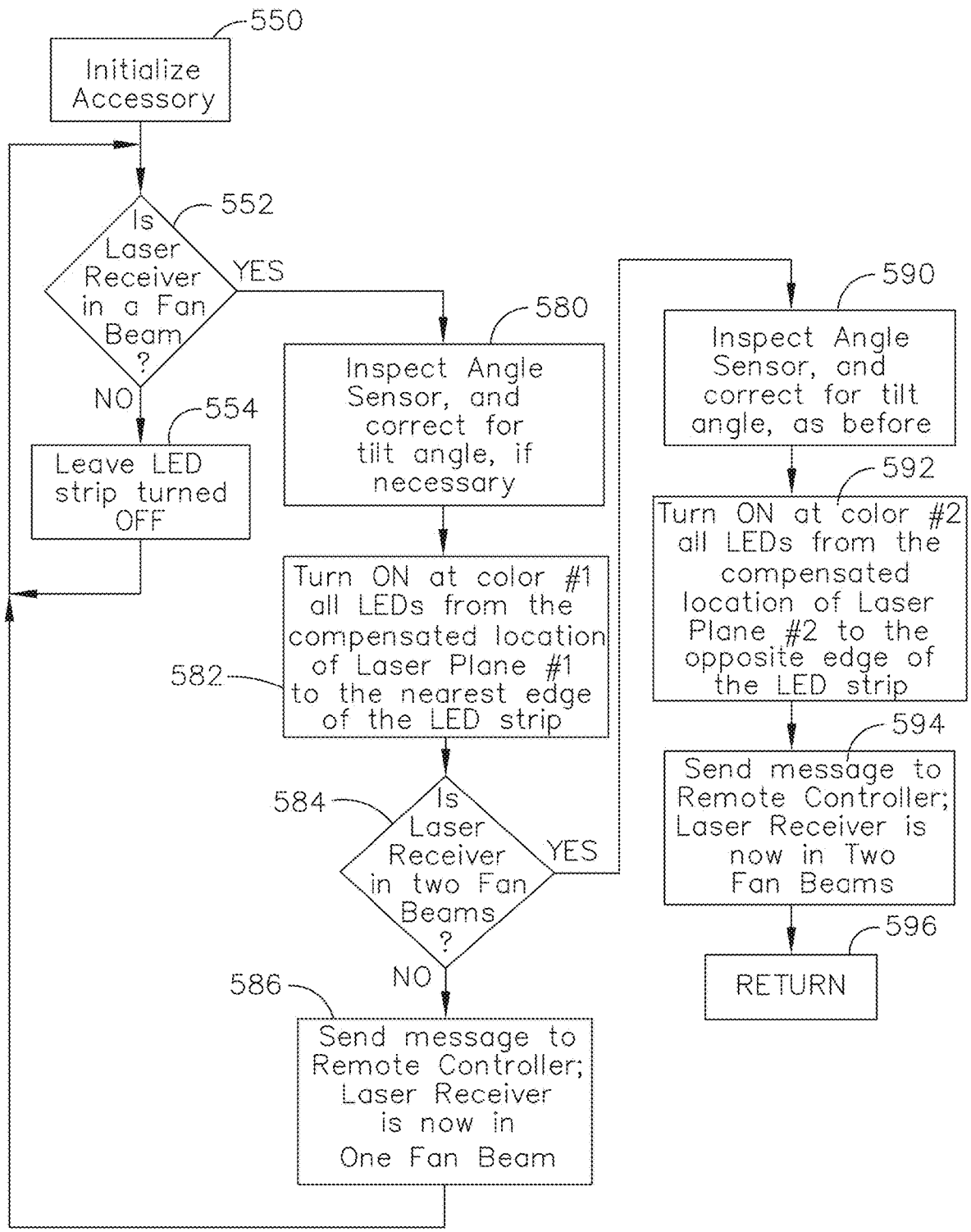
FIG. 14 is a flow chart of certain steps performed by the laser receiver sensing two laser light lines of a fifth version of a first embodiment of the movable target accessory of FIG. 1.

Referring now to FIG. 14, a flow chart is provided that involves the accessory functions for the accessory illustrated in FIG. 23. First, the accessory is initialized at a step 550. Then the laser receiver determines if it is presently in a fan beam at a decision step 552. If it is not, then the LED strip is left turned off at a step 554. However, if it is in a fan beam, then the system inspects the angle sensor, and corrects for tilt angle, if necessary, at a step 580. Then, at a step 582, all LEDs from the compensated location of the first laser plane to the nearest edge of the LED strip are turned on, at a first color.

Next, the laser receiver checks if it is in two fan beams at a decision step 584. If it is not, then at a step 586, a message is sent to the remote controller that the laser receiver is now in one fan beam. However, if the laser receiver is presently in two fan beams, then, at a step 590, the system inspects the angle sensor, and corrects for tilt angle, if necessary. (This is with respect to the second laser fan beam.) Next, at a step 592, all LEDs from the compensated location of the second laser plane to the nearest edge of the LED strip are turned on at a second, different, color. Then, at a step 594, a message is sent to the remote controller that the laser receiver is now in two fan beams. Last, at a step 596, the system returns to executing other functions.

First Embodiment: LEDs Mounted at Bottom on a Stand

Referring now to FIG. 16, this view illustrates the accessory 10 sitting on a jobsite floor (also depicted in FIG. 17). In FIG. 16, one can see the laser light line 712 on the target surface 12. This laser light line 712 vertically crosses the photosensors (at laser line segment 714), the horizontally mounted laser receiver 30, and the bank of LEDs 20. Since this is a fan beam (see FIG. 17), the laser light line 712 not only crosses the target surface 12, but in this example, also reflects on the floor as a laser light line 710. An LED is illuminated at 750, indicating the tilt-angle compensated location of the laser plane, with respect to the laser receiver 30.

Referring now to FIG. 17, the same view of the movable accessory 10 shown in FIG. 16 is presented, but in a "zoomed out" viewpoint of the jobsite 200, illustrating both the accessory 10, the human user 38, and the laser controller 820. The laser controller 820 is depicted emitting a laser plane (or fan beam) 718. Proximal to the laser controller 820 is a laser light line 708, which is the lower edge of the fan beam before striking the floor. The laser plane 718 includes an upper edge of the fan beam 716, and the lower edge of the fan beam running across the floor, at 710. Where the fan beam 718 impacts the accessory 10 is depicted as the laser light line 712. The remote controller 300 is mounted at a height comfortable for the user 38 (this is adjustable by the user). It should be noted that the remote controller 300 can also be detached from the accessory 10, if desired.

Figure 24:
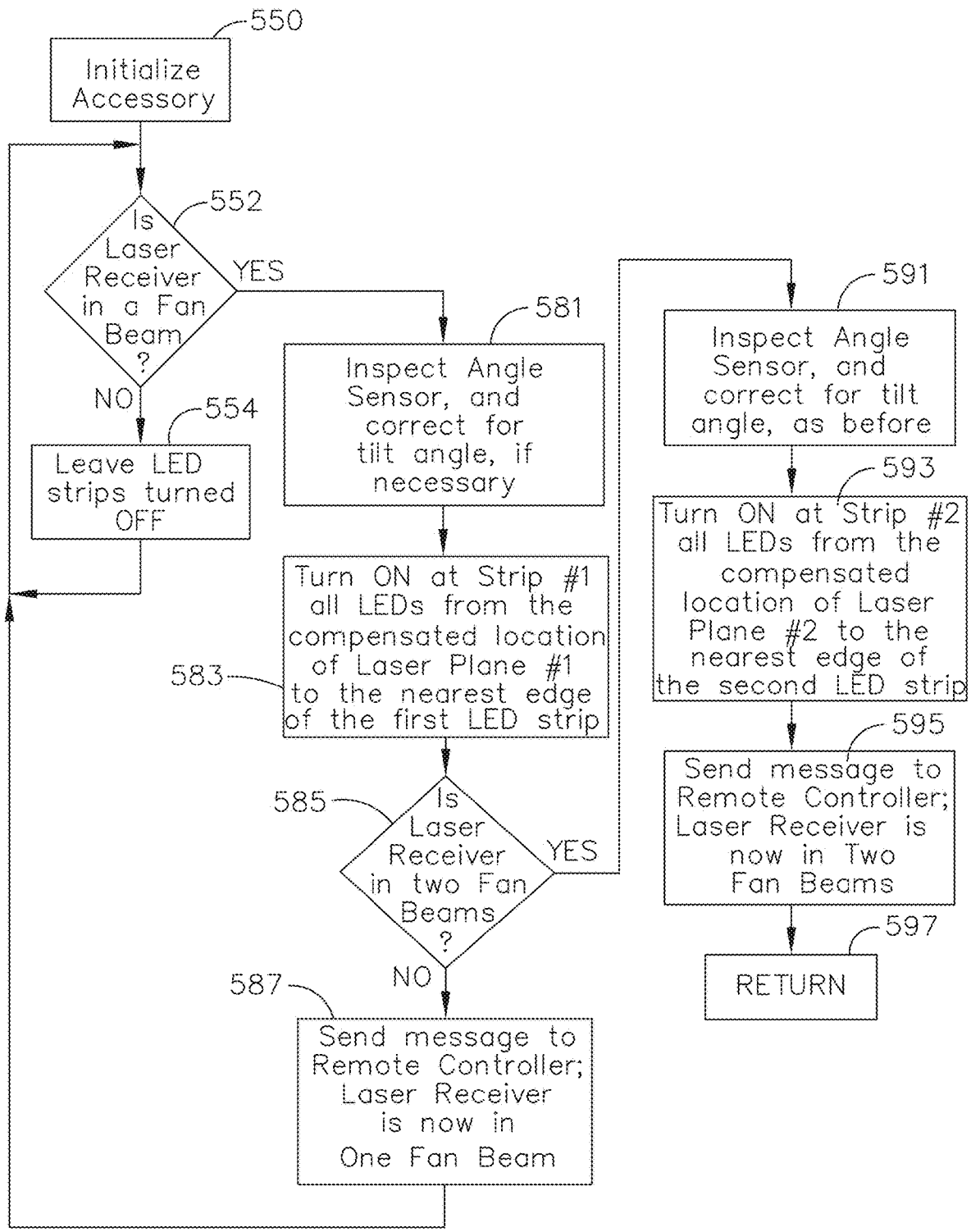
FIG. 24 is a flow chart of certain steps performed by the laser receiver sensing two laser light lines of a sixth version of a first embodiment of the movable target accessory of FIG. 1.

Referring now to FIG. 24, a flow chart is illustrated for a sixth version of the first embodiment of the movable target accessory 10. First, at a step 550, the accessory is initialized. Then, at a decision step 552, the accessory checks if the laser receiver is in a fan beam. If the laser receiver is not in a fan beam, then the logic flow is directed to a step 554 in which the LED strips are left turned off, and then the system returns to step 552 again. If the laser receiver is in a fan beam, then the logic flow is directed to a step 581 in which the angle sensor is checked, which corrects for any tilt angle (from the vertical), if necessary. Next, at a step 583, all the LEDs of the first LED strip are turned on from the compensated location of the first laser plane to the nearest edge of the first LED strip. (See FIG. 25.)

Then, at a decision step 585, the accessory checks if the laser receiver is in a second fan beam. If not, then at a step 587 a message is sent to the remote controller that the laser receiver is in a single fan beam, and the system returns to step 552. On the other hand, if the laser receiver is in two fan beams at decision step 585, then at a step 591 the angle sensor is checked, which corrects for any tilt angle (from the vertical), if necessary. Next, at a step 593, all the LEDs of the second LED strip are turned on from the compensated location of the second laser plane to the nearest edge of the second LED strip. Then at a step 595, a message is sent to the laser controller that the laser receiver is in two fan beams and then, at a step 597, the system returns to performing other functions.

Figure 25:
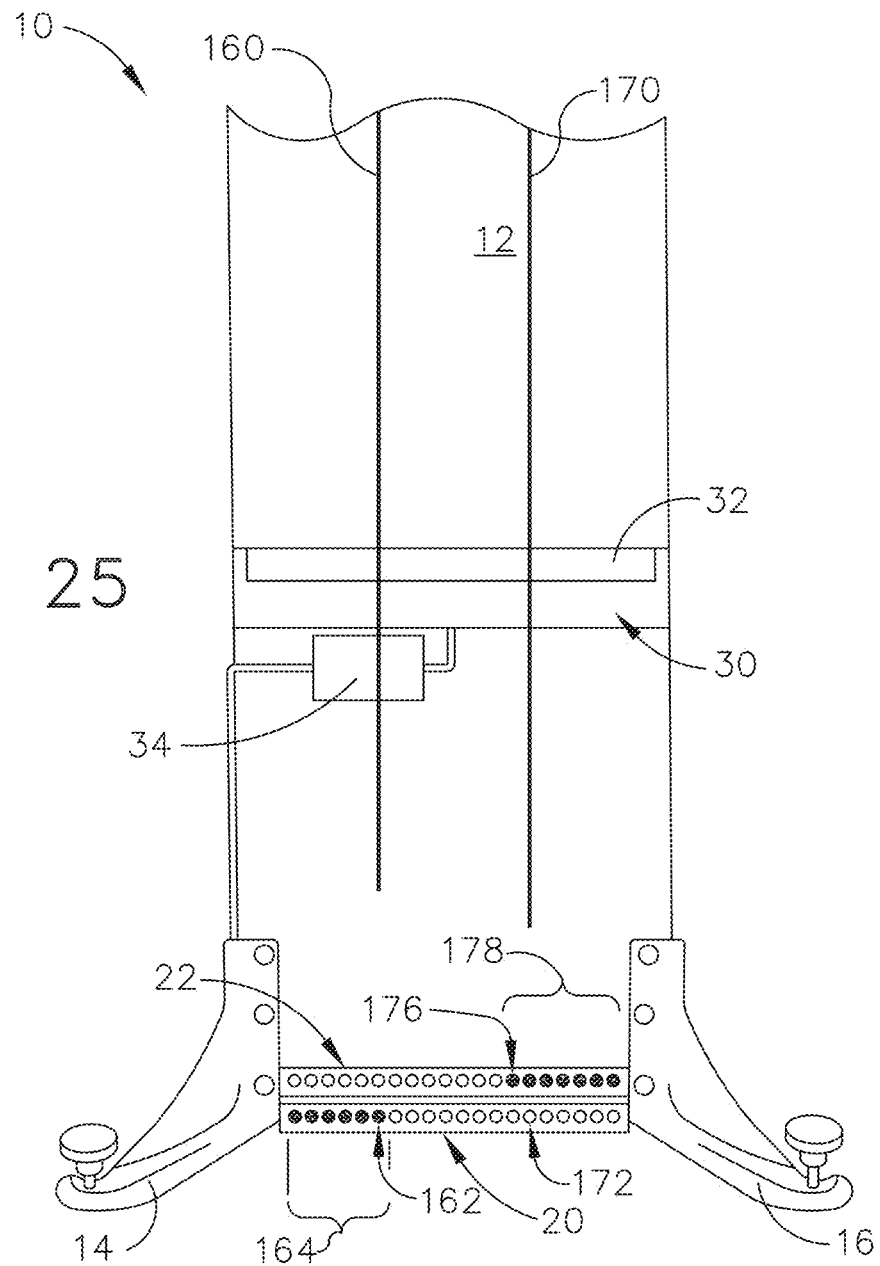
FIG. 25 is a front view of two last light lines crossing the laser receiver of a sixth version of a first embodiment of the movable target accessory of FIG. 1, in which all the LEDs are illuminated on a first LED strip in one color from the left side of the accessory to the position where the first laser light line crosses, and all the LEDs are illuminated on a second LED strip in a second color from the right side of the accessory to the position where the second laser light line crosses.

Referring now to FIG. 25, the sixth version of the first embodiment of the movable target accessory 10 is depicted. Two laser light lines 160 and 170 are shown crossing the laser receiver 30. Note that in this version, two LED strips are mounted at the base of the accessory: the first LED strip 20, and a second LED strip 22. The first LED strip 20 has several LEDs illuminated, visually depicting the compensated location of the first laser light line 160 by illuminating all LEDs from that location (at 162) to the nearest edge. The second LED strip 22 also has several LEDs illuminated, visually depicting the compensated location of the second laser light line 170 by illuminating all LEDs from that location (at 176) to the nearest edge. In this configuration, LED strips 20 and 22 may illuminate in the same colors, or different colors, depending on the configuration of the LEDs and user or designer preference. In order to find a point of interest, a user would move the accessory forwards or backwards until LEDs on both strips were illuminated to indicate the same horizontal position. (One indication would be directly above the other.) This vertical illumination would signal the user that the laser light lines are crossing right at the position of the target screen 12, thereby visually depicting the point of interest.

It will be understood that any combination of LED colors could be utilized to provide indications to the user. Moreover, a single LED could not be illuminated to indicate where the laser plane is striking the laser receiver on one, or both, LED strips 20 and 22, as desired by the system designer.

Figure 26:
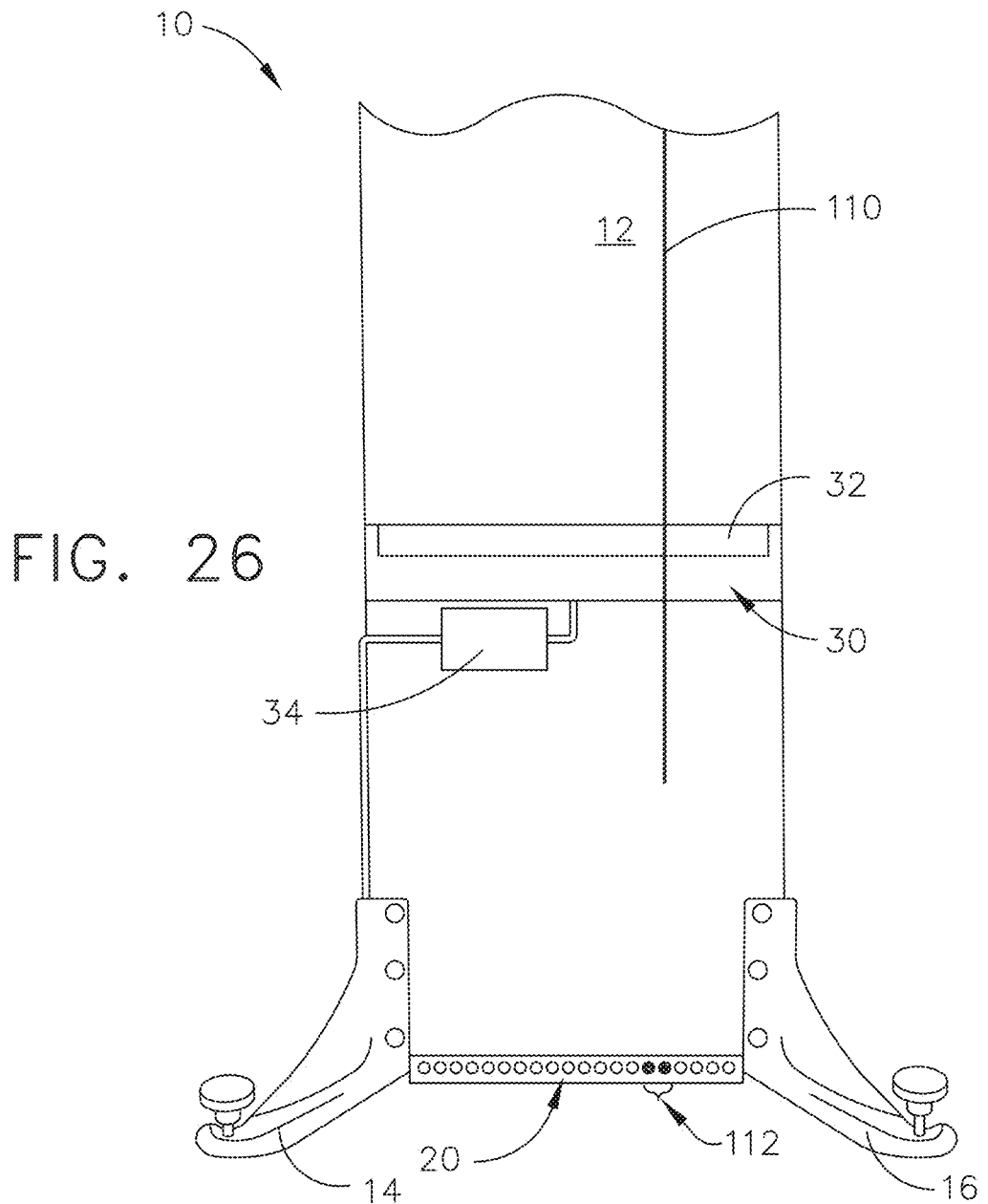
FIG. 26 is a front view of a single laser light line crossing the laser receiver of the movable target accessory of FIG. 1, in which two LEDs are illuminated immediately next to one another, signifying that the point of interest is exactly between the two illuminated LEDs.

Referring now to FIG. 26, the movable target accessory 10 is depicted in which two LEDs are illuminated directly next to one another. This condition would indicate to a user that the point of interest is exactly in the middle of the two illuminated LEDs. This would provide a very precise positioned indication of that point of interest.

Second Embodiment: LEDs Mounted at Bottom on a Pole

Figure 27:
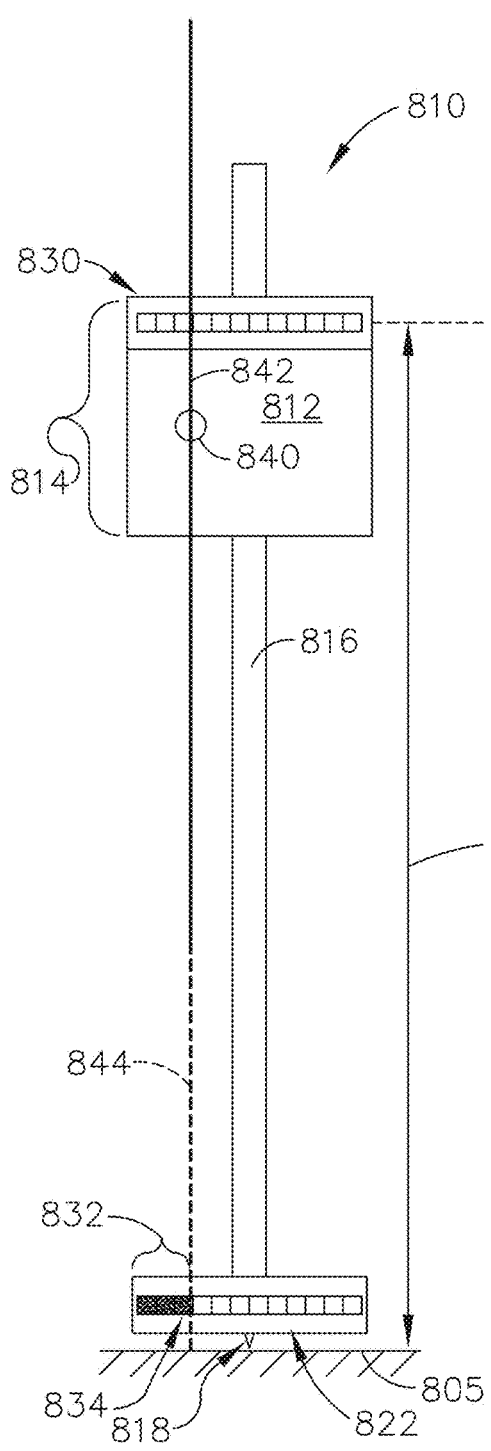
FIG. 27 is a front view of a single laser light line crossing the laser receiver of a second embodiment of a movable target accessory similar to that of FIG. 1, in which the photosensors and laser light receiver are mounted higher on the pole, and the LED strip is mounted near the job surface, i.e., at the bottom portion of the accessory.

Referring now to FIG. 27, a second embodiment of a movable target accessory 810 is depicted. The accessory 810 has a pole 816 in which an LED strip 822 is mounted near the bottom point 818. A slideable target subassembly 814, which includes a reflective surface 812 and a laser receiver 830, is mounted near the top of the pole 816. Note that the surface 812 extends along a longitudinal axis that is parallel to the length of the pole. When a laser light line 842 projected by a fan beam from a laser controller 820 (not shown in this view) crosses the reflective surface at an area 840, yet is partially blocked by an object on the job floor (as depicted by the dashed line 844) the accessory 810 will still be able to determine a location for that laser light line 842. Because the slideable target subassembly 814 is mounted above the floor obstruction, the laser light line 842 still crosses the laser receiver 830. The location of the laser line impact will translate to the LED strip 822, in which either a single LED 834 will illuminate, or several LEDs 832 will turn on; in either instance the point of interest will be easily visible to a user. Note that in this view the pole 816 is vertical compared to a ground level 805. Note also that a distance L1 from the laser receiver 830 to the ground level 805 is a known constant value.

Figure 28:
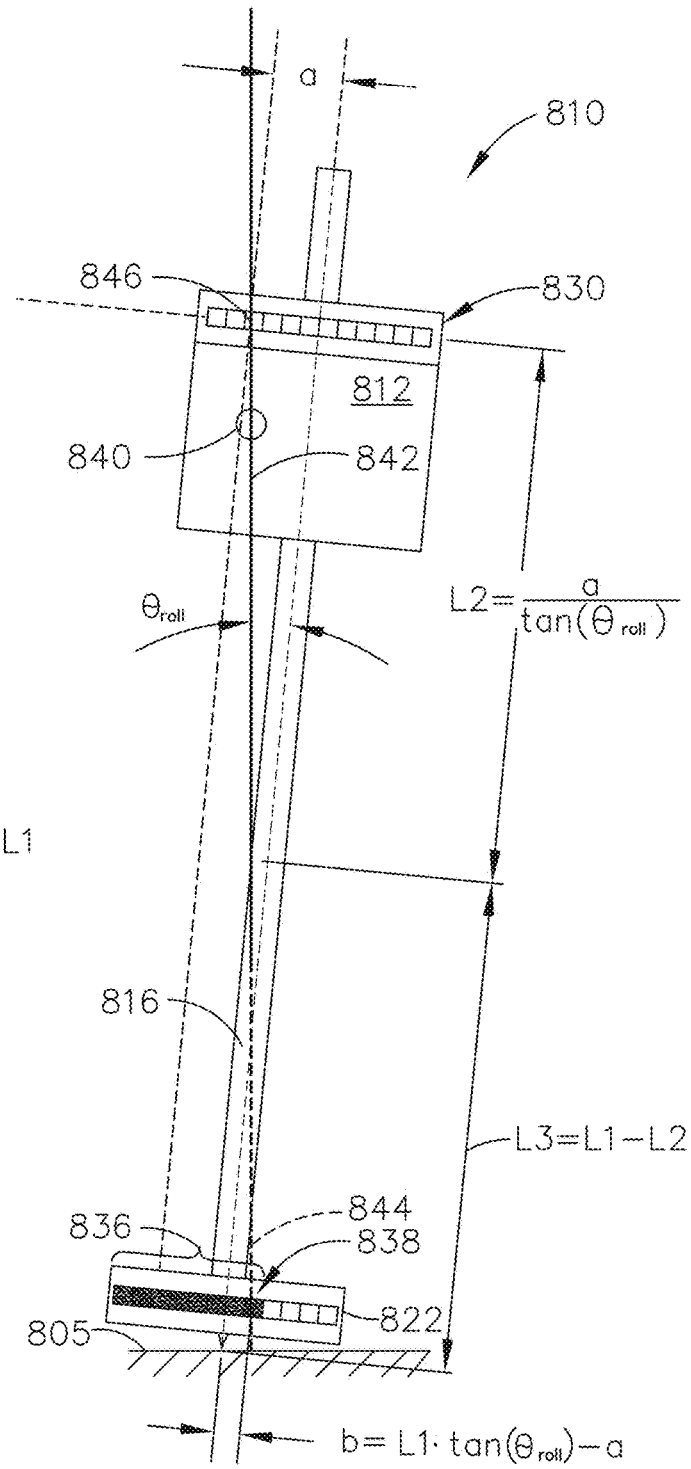
FIG. 28 is a front view of a single laser light line crossing the laser receiver of the second embodiment of the movable target accessory of FIG. 27, in which the accessory is at an angle with the job surface, and the LED strip is illuminated at a compensated position based on that angle.

Referring now to FIG. 28, the movable target accessory 810 is depicted again, but the pole 816 is not vertical compared to the ground level 805. In this view, the laser light line 842 crosses the laser receiver 830 at a non-zero angle compared to the vertical. This is depicted as a "roll angle" $\theta_{roll}$. A distance between the pole centerline and a laser strike on the laser receiver 830 is depicted as "a," along a "centerline" of the strip of LEDs, which is perpendicular to the angle $\theta_{roll}$. A distance between the pole centerline and the projected laser strike on the ground is depicted as "b" (again, along that same angle, but near the floor). Note that at this roll angle, the accessory 810 must compensate for the tilt angle in order to illuminate the correct LED. This compensation is depicted as a single illuminated LED 838, or several illuminated LEDs 836; in either case, the last illuminated LED or only sole LED indicates the point of interest on the job surface. Note also that the LEDs may be provided, or configured, in a single color, or in multiple colors.

In order to calculate the roll angle to illuminate the correct LED, the distance between the laser receiver 830 and the ground level 805 must be calculated. Note that in FIG. 27, this distance was L1, a known value. However, here the accessory must calculate distances L2 and L3:

$$L2 = a/\tan \theta_{roll}$$

$$L3 = L1 - L2$$

Note also that the distance b must be calculated:

$$b = L1 \cdot \tan \theta_{roll} - a$$

Figure 29:
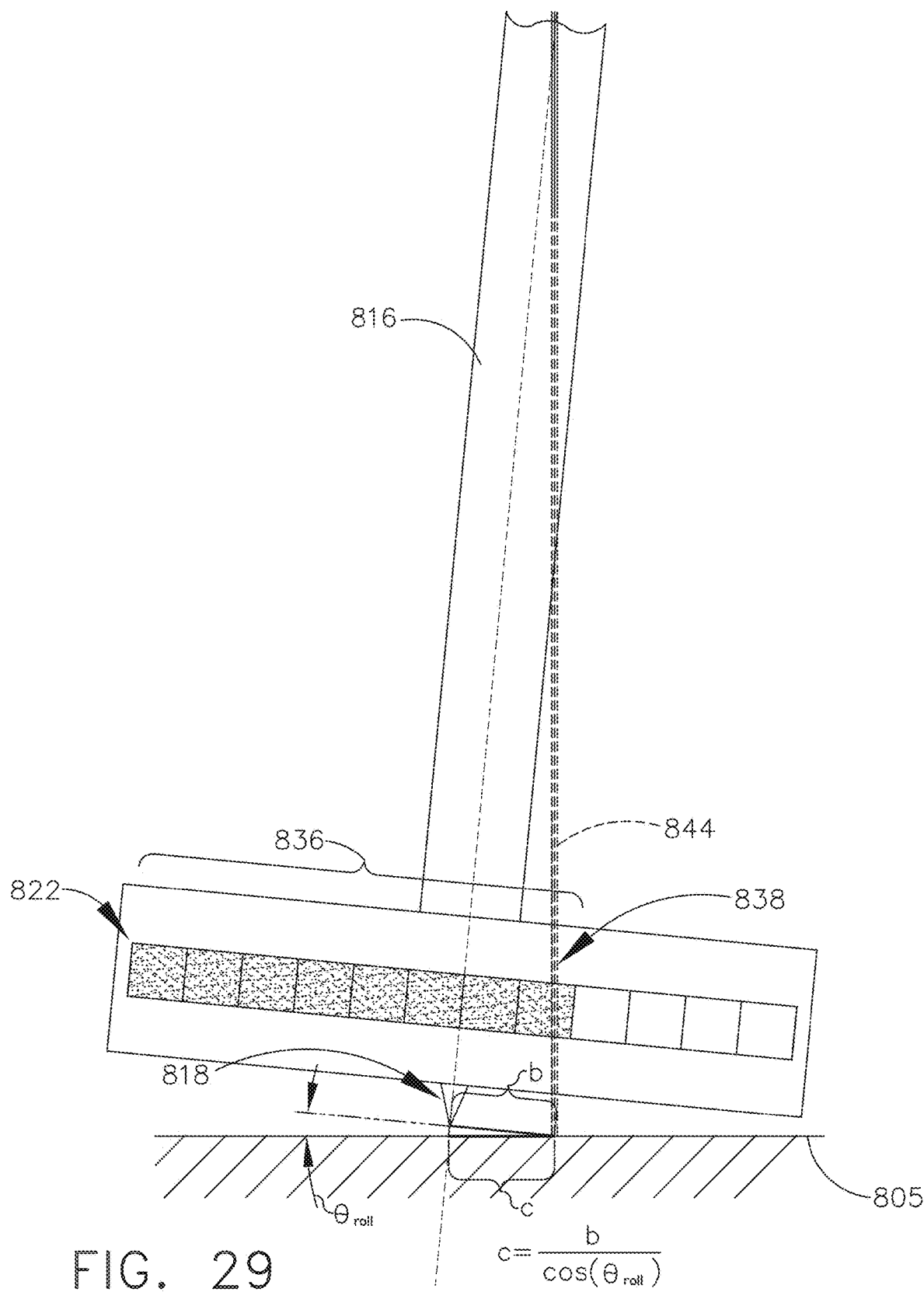
FIG. 29 is a front view of the LED strip of the second embodiment of the movable target accessory of FIG. 27, depicting the angle between the job surface and the accessory, and the compensated illuminated LED.

Referring now to FIG. 29, the angle between the pole 816 and the ground level 805 is more clearly depicted. The tilted distance b corresponds to a horizontal distance along the ground of tilt correction "c." In this view, c may be calculated as:

$$c = b/\cos \theta_{roll}$$

Once "c" is calculated, the laser receiver system can then determine which of the LEDs in the LED array 822 should be illuminated, which of course, is the LED directly above that distance "c" from the bottom spiked point 818 of the pole.

Third Embodiment: LEDs Mounted at Top

Figure 30:
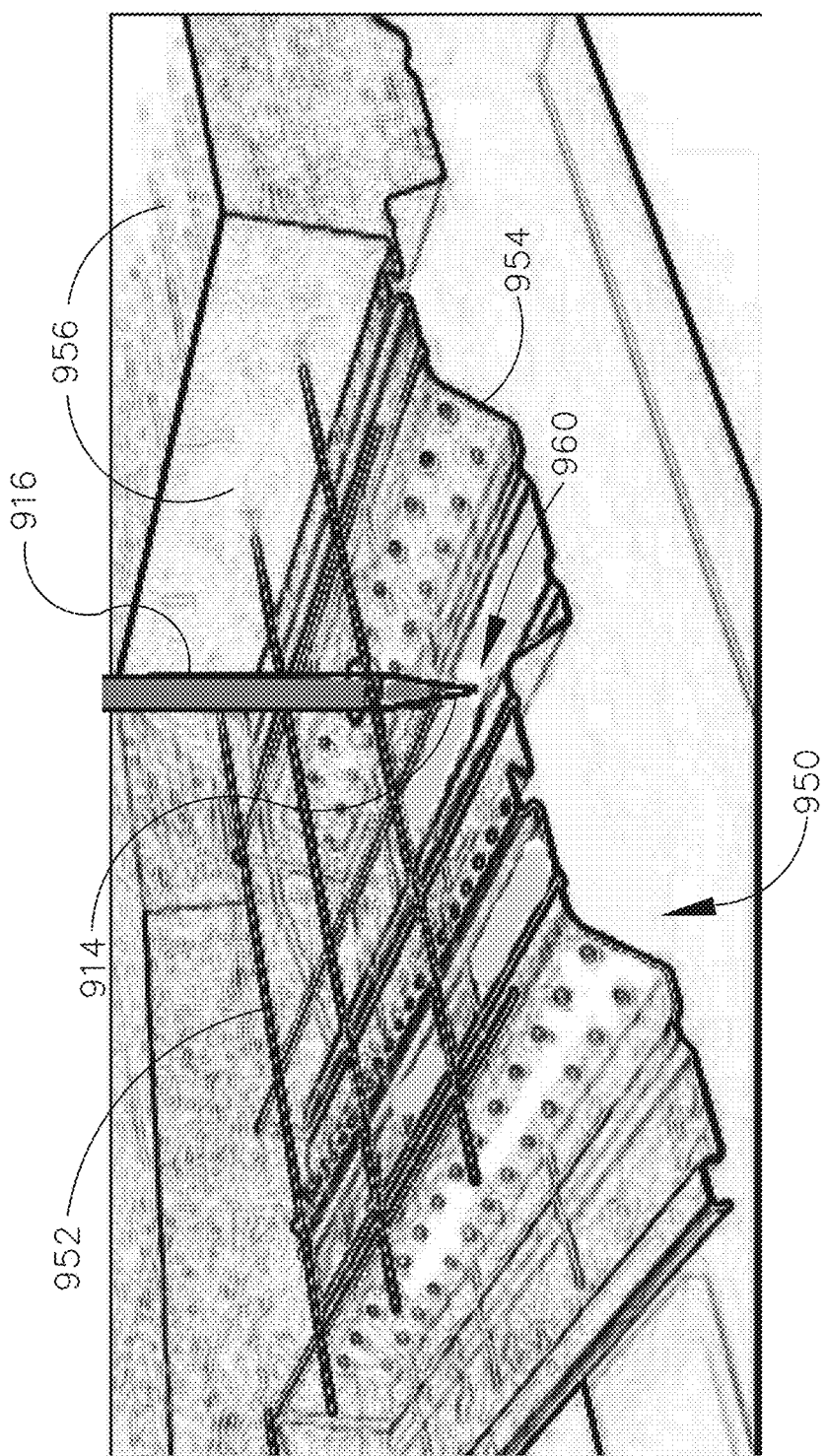
FIG. 30 is a perspective view of the mounting pole used in a third embodiment of the movable target accessory of FIG. 32, depicting the accessory's pole below the surface of a floor, in which the accessory (not shown in this figure) is mounted higher than the floor's surface.
Figure 31:
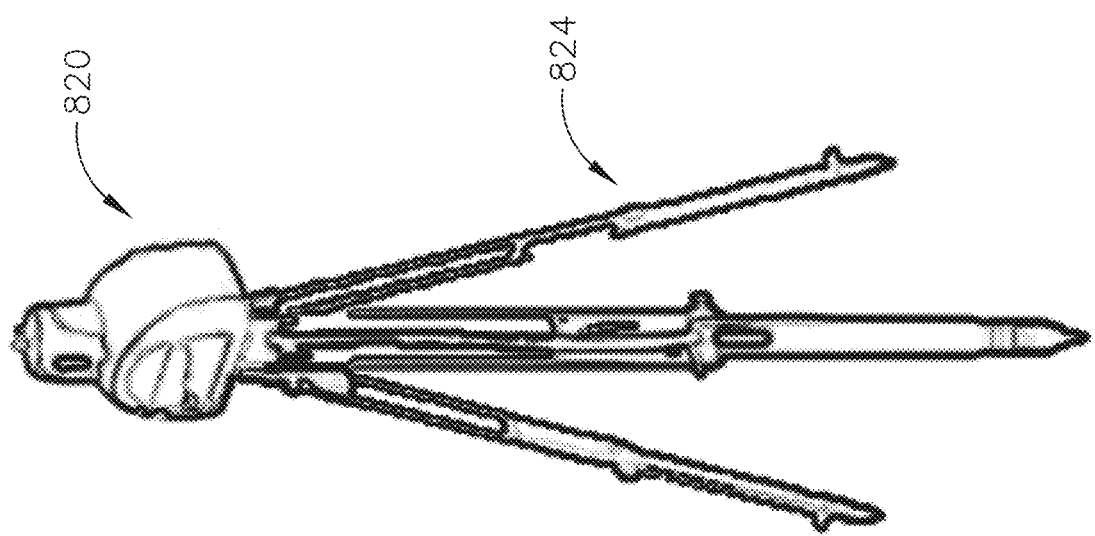
FIG. 31 is a perspective view of a laser controller mounted on a tripod in order to project a laser light plane above a floor surface so that the movable target accessory of FIG. 30 may receive a laser light line on the accessory's laser receiver.

Referring now to FIG. 30, a third embodiment of a movable target accessory 910 is partially depicted. A pole 916 of the accessory 910 is shown marking a point of interest 960 on the surface of a pan decking 950. The pole 916 must be able to mark between reinforcement bars ("rebar") 952, a corrugated sheet 954, and potentially concrete 956. Note that the corrugated sheet 954 has peaks and valleys, making it difficult if not impossible for any part of the accessory 910, other than the bottom point of the pole 916, to be placed directly at the point of interest 960. Note also that the laser transmitter 820 must also be placed a sufficient distance above the floor in order to project a laser fan beam high enough for a laser receiver 930 to detect a laser light line 942 (see FIGS. 31-34). In order to accomplish this, the laser receiver 820 is mounted to a tripod 824, as illustrated in FIG. 31.

Figure 32:
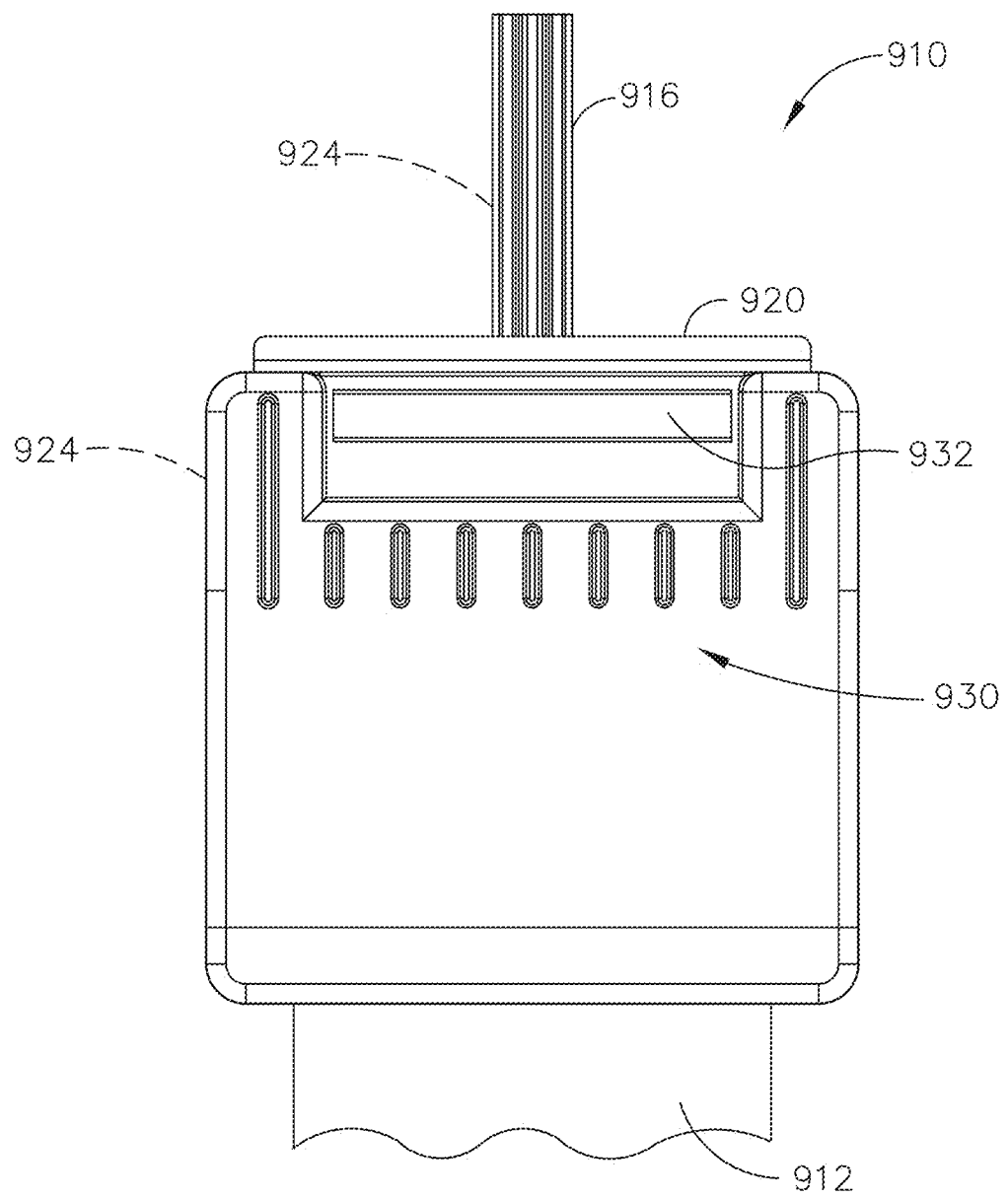
FIG. 32 is a front view of a laser receiver used in a third embodiment of a movable target accessory similar to that of FIG. 1, in which the photosensors and laser light receiver are mounted higher on the pole, and the LED strip is mounted near the top portion of the laser receiver's enclosure.

Referring now to FIG. 32, an upper portion of the third embodiment of the movable target accessory 910 is depicted. The accessory 910 includes a spike portion 914 at the bottom of the pole 916 (see FIG. 33), a bipod attachment 922 (see FIG. 34), and a target screen 912. Mounted near the top of the target screen 912 is a laser light receiver 930, and above that is an array of LEDs 920. The laser light receiver 930 includes a photosensor subassembly 932. Note that the photosensor subassembly 932 of the laser receiver 930 is mounted in a non-vertical orientation.

The operation of the accessory 910 is described as follows: the user moves the accessory 910 into a vertical laser light plane that creates a laser light line 942 when the laser plane (typically a fan beam) impacts against the reflective surface 912. As the laser line 942 crosses the screen 912 (see FIG. 33), the laser will impact a photosensor 932 of the laser receiver 930. The electronic controller will translate the position of that impact on the photosensor 932 and illuminate a corresponding LED 920. This visual indication represents where the laser line 942 is crossing the accessory 910.

As the user moves within the laser plane 942, an ON POINT indicator will signal the user once the correct distance is reached for the point of interest. An ON POINT signal means that the LDM (laser distance meter) 480 of the laser controller 820 is impacting the target screen 912, and that the accessory 910 is at the correct distance for indicating the point of interest on the jobsite floor. Once ON POINT, the user stakes the pole 916 using the position of the spike portion 914, while plumbing the accessory 910 by using the bipod 922. In a preferred embodiment, the accessory 910 includes a set of level vials 924 on the rear side, so that the user can see them when manipulating the bipod. The level vials may alternatively be mounted to the pole, as an alternate example. (Both example locations are depicted on FIG. 32.) The user will also need to manipulate the pole 916 so that the illuminated LED is centered over the pole 916 (which is considered the ON AZIMUTH position). Note that a level vial may be a mechanical device (such as a bubble indicator), or it could be an electrical device—perhaps including a MEMS sensor—that provides a virtual indication of level for the users (essentially in real time).

Once the accessory 910 is staked and plumbed, the user then marks the point of interest (i.e., where the spike portion 914 touches the jobsite floor). Note that any of the previously mentioned LED illumination techniques may be also used with this third embodiment, as examples illustrated in FIGS. 10-12.

Figure 33:
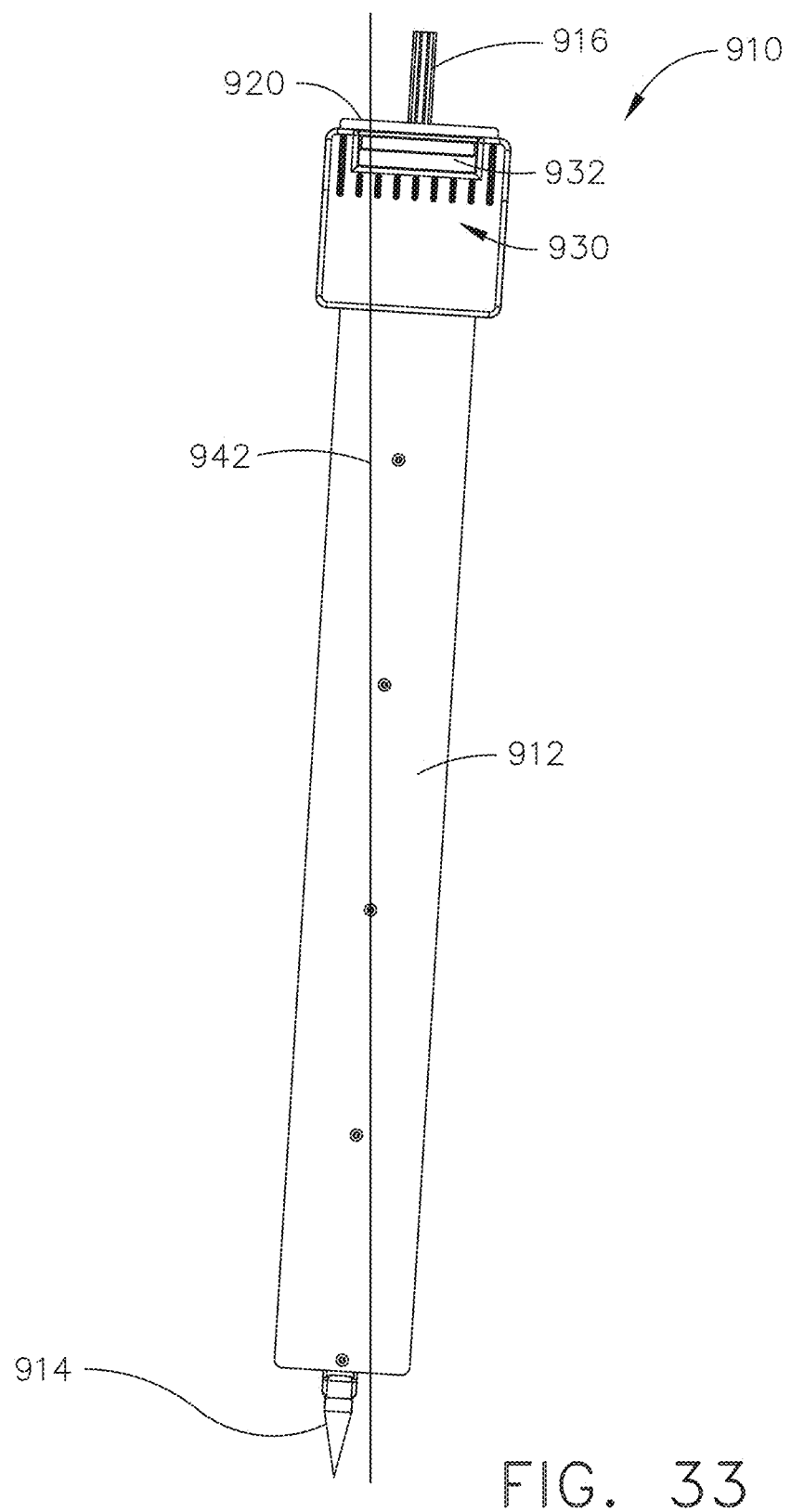
FIG. 33 is a front elevational view of the movable target accessory of FIG. 30 (tilted).

Referring now to FIG. 33, the movable accessory 910 is depicted with a laser light line 942 impacting the target screen 912. Note that the spike portion 914 sticks out slightly toward the plane of the target screen 912—see the side view of FIG. 35. This is to allow the user to accurately mark a point of interest using the exact position of the spike portion 914. Note also that the screen 912 extends along a longitudinal axis that is parallel to the length of the pole 916.

The accessory and the target screen may have magnetized strips on their rear sides, and alternatively the pole may have a magnetized strip on its front, for example. In this manner, the accessory and the screen may be attached magnetically, for example. In another example, the target screen and the accessory may be attached with mechanical fasteners. In this manner, the laser receiver portion and/or the target screen can be moved up or down, relative to the pole. This would allow for a smaller target screen, if that is desired.

Figure 34:
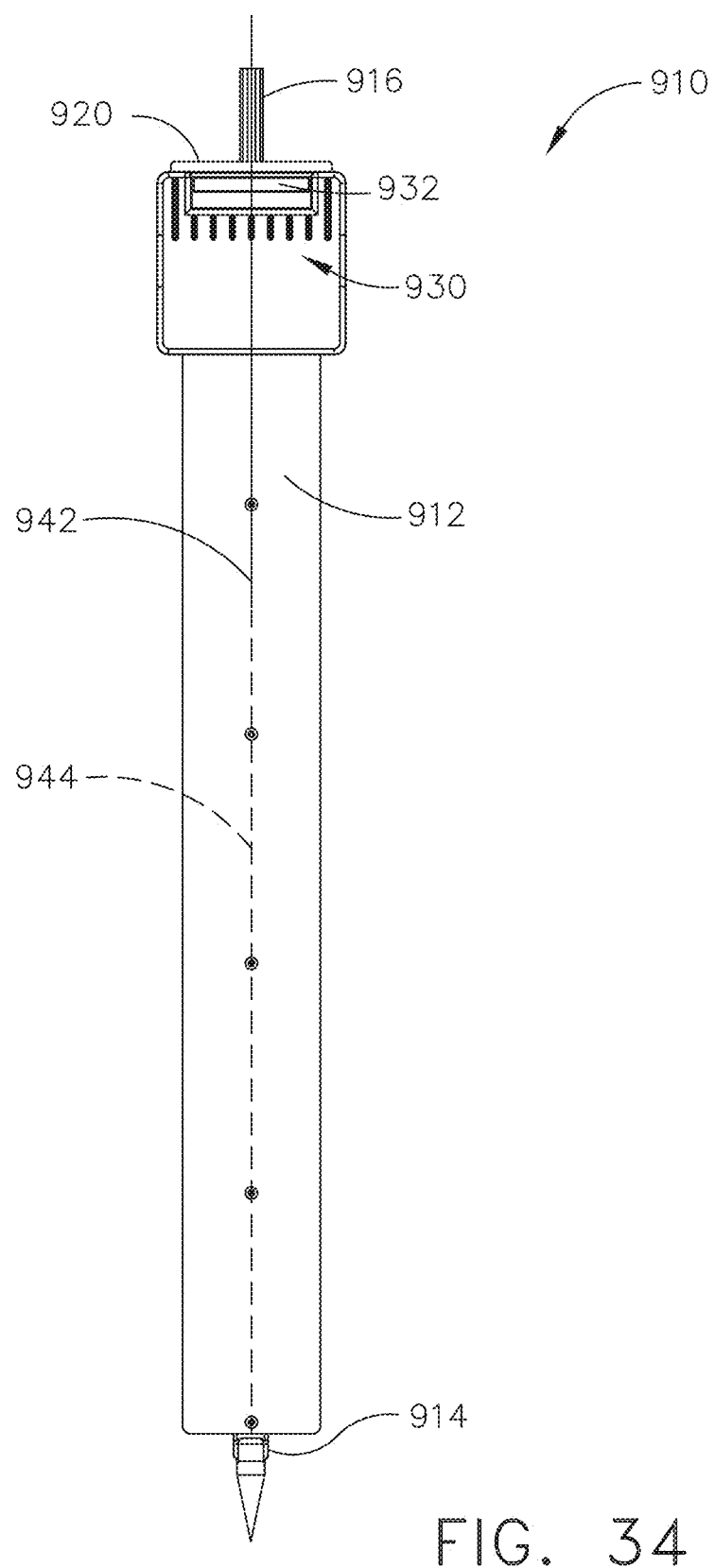
FIG. 34 is a front elevational view of the movable target accessory of FIG. 30 (plumbed).

Referring now to FIG. 34, the movable accessory 910 is depicted again with a laser light line 942 impacting the target screen 912. In this view, the entire accessory 910 has been plumbed so that the pole and target screen are substantially vertical (within the appropriate tolerance for such jobsite point layout procedures). In addition, the accessory has been moved into a position in which the laser fan beam is producing a laser light line 942 that is directly crossing the null (center) position of the photosensor of the laser receiver 930, which means that the pole and its bottom spike 914 are directly at the appropriate ON AZIMUTH angle, with respect to the laser transmitter that is producing the fan beam. In this configuration, once the user on the jobsite moves the accessory 910 so that its target screen 912 becomes positioned at the ON POINT distance, then the spike 914 will physically be directly at the point of interest. It should be noted that, as seen on FIG. 34, the entire laser fan beam does not need to reach the accessory 910 to be useful; if jobsite "clutter" blocks the lower portion of the fan beam, then the laser light line at the dashed positions indicated by the reference numeral 944 will not truly exist, but that portion of the laser light line 942 is not required.

The appropriate tolerance for the measuring accuracy of point layout procedures can vary, but when such equipment is provided by Trimble, Inc., the desired recommended tolerance is about 30 arc-seconds. However, for short range measurements, a larger error in position measurements can be tolerated, but it will be understood that about 10-11 arc-minutes is the maximum useful value.

Figure 35:
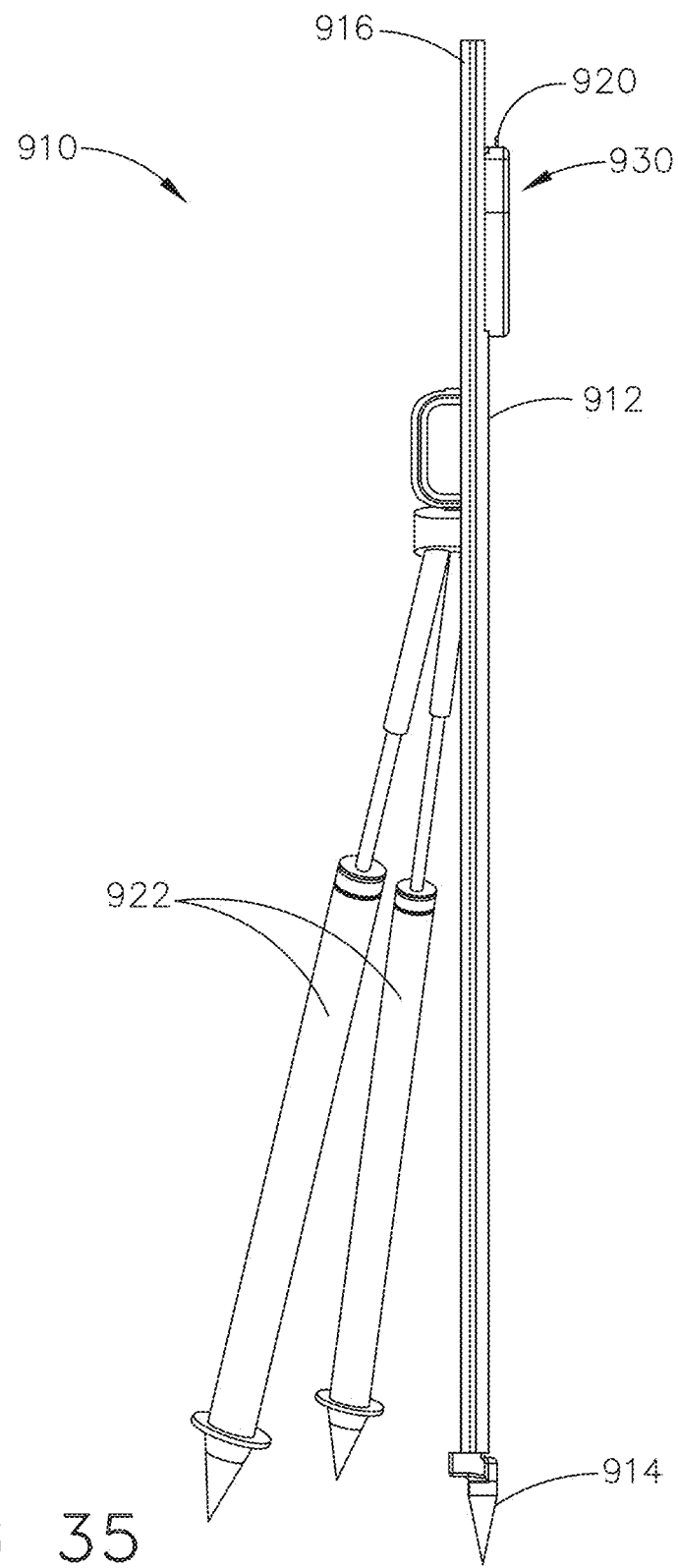
FIG. 35 is a side view of the movable target accessory of FIG. 30.

Referring now to FIG. 35, the movable accessory 910 is depicted with a bipod 912 attached, which will allow the pole to be free standing. As described above, the bipod 912 may also be used to plumb the accessory 910 in combination with a set of level vials. Note again that the spike portion 914 sticks outward toward the plane of the target screen 912, as seen in this view.

Figure 36:
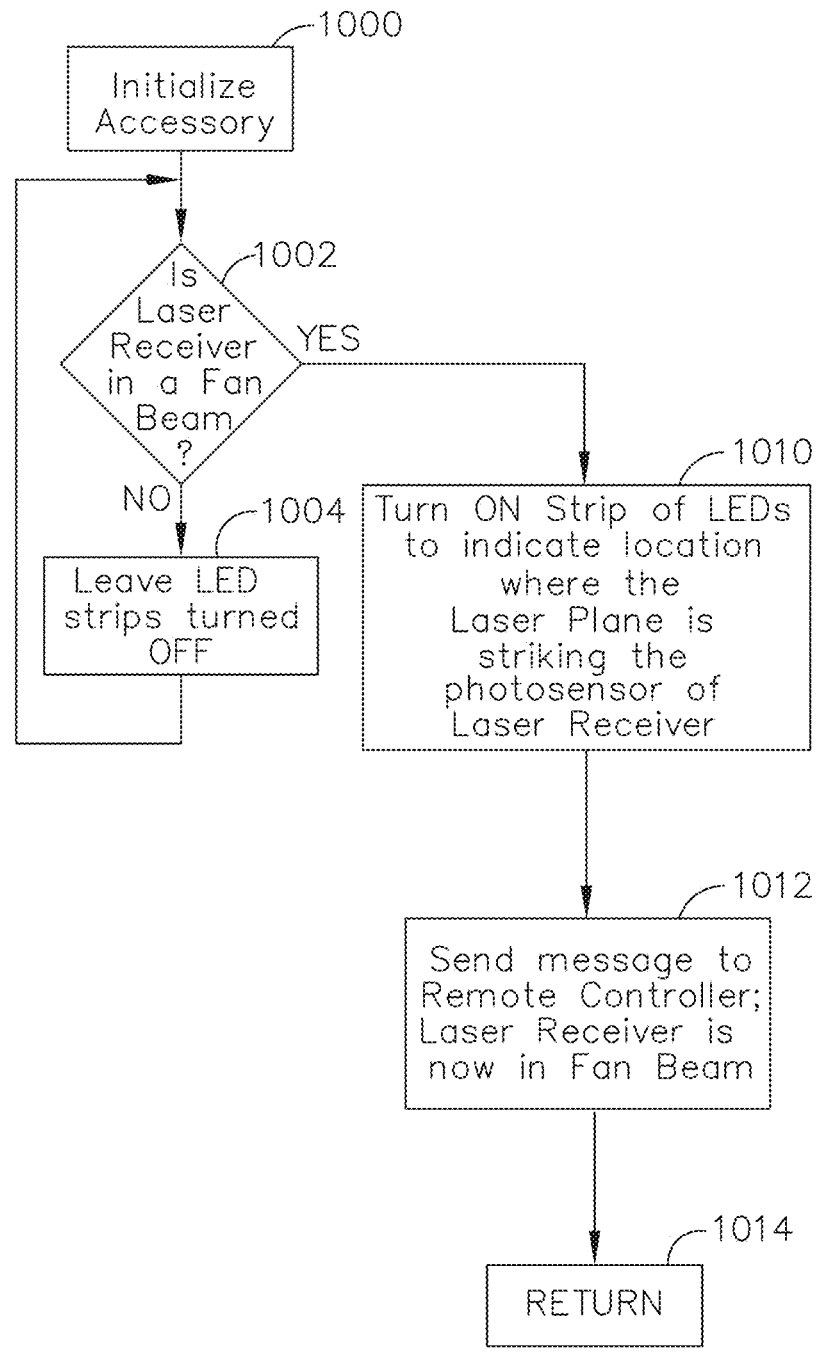
FIG. 36 is a flow chart of certain steps performed by the laser receiver sensing a laser light line for a third embodiment of the movable target accessory of FIG. 32.

Referring now to FIG. 36, a flow chart is provided that involves the accessory functions for the accessory illustrated in FIG. 33. The first step is to initialize the accessory at a step 1000. Next, the laser receiver determines if it is presently in a fan beam at a decision step 1002. If it is not, then the LED strip is left turned off at a step 1004.

However, if it is in a fan beam, then at a step 1010 the LEDs are turned on in one color from one edge of the LED strip to the location where the laser plane strikes the photosensor. At that position, the LED could be illuminated in a second, different color. At a step 1012, a message is sent to the remote controller that the laser receiver is now in a fan beam. Last, at a step 1014, the system returns to executing other functions. Note that, as the user on the jobsite moves the accessory 910 around on the jobsite surface, the specific position of where the laser fan beam is striking the laser receiver 930 will change in real time, and the appropriate LED that indicates this laser light striking position will also change in near-real time (as quickly as the electronic controller can make the calculations).

Figure 37:
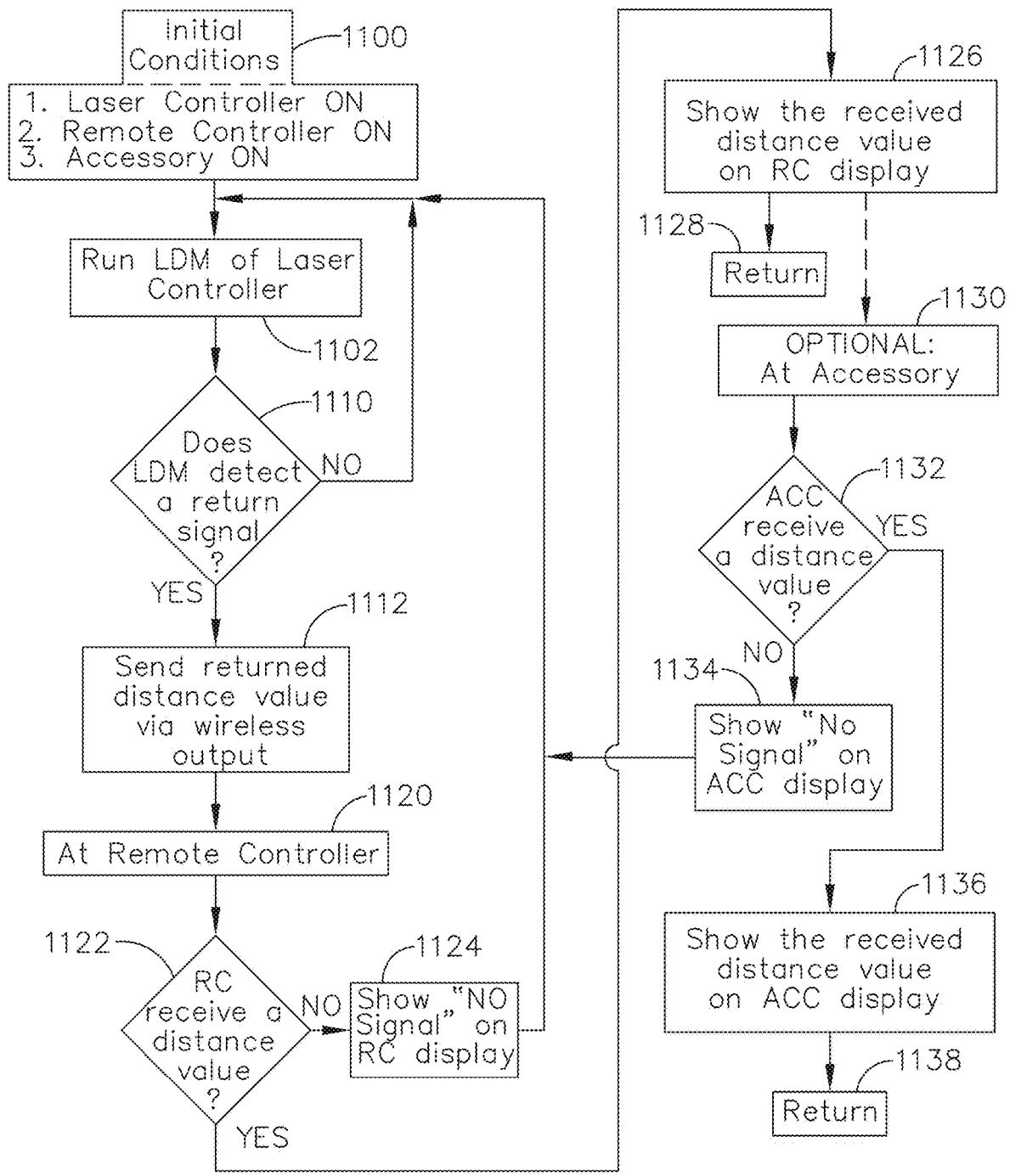
FIG. 37 is a flow chart of certain steps performed by the various hardware components in all embodiments of the layout and point transfer system using the plurality of movable target accessories described hereinbelow, specifically for functions involving the laser distance meter operations at the various controllers and operator visible displays.

Referring now to FIG. 37, a flow chart is provided that involves the electronic distance measuring instrument (an "EDM") which, in this description, will be referred to more specifically as a laser distance meter (an "LDM"), which is a preferred embodiment of an EDM. Starting at an "initial condition" step 1100, all three devices must be turned on and ready to work on the jobsite. The laser controller 820 must be setup on the jobsite floor, and must have its laser fan beam aimed at the correct azimuth for the point of interest to be laid out and staked. (The LDM will also automatically be aimed along the same vertical laser plane azimuth.) The remote controller 300 must be "talking" to the laser controller by the wireless link (as described above); it is the remote controller that typically will be commanding the laser controller where to aim its laser transmitter fan beam. (The remote controller contains the jobsite floor plan in its memory.) Finally, the accessory 10 must be turned on, ready to receive the laser fan beam at its laser receiver 30 (or 31), so that when its photosensor(s) detects the fan beam, the laser receiver can illuminate one or more of its photoemitters (e.g., the LEDs 20).

The LDM emits its distance measuring laser beam along the correct azimuth, at a step 1102. The LDM then determines whether or not it has received a return signal, at a decision step 1110. If not, the logic flow is directed back to step 1102. If so, the detected distance value measured from the return signal is sent wirelessly to other system devices, at a step 1112.

The system control logic now concentrates on the remote controller 300, beginning at a step 1120. A decision step 1122 determines whether or not the remote controller has received a distance valve (measured by the LDM), at a step 1122. If not, then the remote controller should indicate a "No Signal" symbol on the display 342 of the remote controller, at a step 1124. The system logic flow is then directed back to the beginning of this flow chart, at step 1102. On the other hand, if a distance value has been received, as determined at step 1122, then a step 1126 will cause the received distance value to be displayed on the remote controller's display 342. Such an indication could be a numerical value in distance units, or perhaps it could be symbolically indicated in other ways, such as using concentric circles or a "hockey puck" symbol when the correct distance is just about achieved by the user's actions. The logic flow now returns to other functions at a step 1128.

The system control logic now concentrates on an optional feature that involves the accessory 10, beginning at a step 1130. Note that, if the user is paying attention only to the remote controller (which likely is a smart phone, or a portable tablet computer), then this optional mode would probably never be used. However, there could be a second person working on the jobsite who is handling the accessory 10, while the first person on the jobsite is handling the remote controller 300. This second person could directly "find" the correct distance by himself, without any instructions from the first person, if the accessory 10 included a display indicates the LDM-measured distance, and the second person could view that displayed distance value.

At step 1130, it is assumed that a person is viewing a display on the accessory 10 that indicates the LDM-indicated distance. Similarly to the description above, a decision step 1132 determines whether or not the remote controller has received a distance valve (measured by the LDM), at a step 1132. If not, then the remote controller should indicate a "No Signal" symbol on the display 342 of the remote controller, at a step 1134. The system logic flow is then directed back to the beginning of this flow chart, at step 1102. On the other hand, if distance value has been received, as determined at step 1132, then a step 1136 will cause the received distance value to be displayed on the remote controller's display 342. Again, such indication could be a numerical value in distance units, or perhaps it could be symbolically indicated in other ways, such as using concentric circles or a "hockey puck" symbol when the correct distance is just about achieved by the user's actions. The logic flow now returns to other functions at a step 1138.

It will be understood that the LDM distance readings by themselves are not sufficient information to make this third embodiment work accurately, for the flow chart of FIG. 37. The accessory's pole 916 must also be held in a plumb orientation while these distance measurements are being taken by the LDM. To that end, it is desired that a set of level vials be provided on either (or both) the accessory pole and/or the laser receiver enclosure, as noted above. In that manner, the user on the jobsite floor can quickly plumb the pole while the azimuth and distance readings are being observed by that user. This user could be that "second person" discussed above, in relation to the flow chart steps 1130-1138, or if only one person is working that jobsite, then of course that single person would be performing all the human functions required. This movable (portable) accessory system is designed so that only a single person is required for all of these operations for laying out and staking points of interest.

It will be understood that the operations in this flow chart of FIG. 37 are required for all embodiments described herein. Each of the movable accessory embodiments includes a target screen that must be partially reflective so that the LDM output laser beam will be at least partially reflected back to the LDM's laser sensor, so as to determine the distance measurement. These operations regarding the LDM's functions can be self-controlled by the LDM itself, so far as how the LDM shoots a laser beams and "sees" its return signal to determine a distance. However, the laser controller's executable software must command the LDM "when" to operate (and when to shut oft), and that software must also inspect the LDM's current distance readings at the appropriate times, so that the laser controller can send that data (wirelessly) to the remote controller while that measurement is relevant. Then the remote controller's executable software must periodically inspect its input data registers to discover the current distance reading numeric value (from the LDM), and then post that information on the remote controller's display (in the engineering units of distance that was selected by the human user). Finally, if the accessory is to also display that distance measurement information, then its executable software must periodically inspect its input data and perform the same types of functions for displaying that data that the remote controller performs. Finally, all three devices (the laser controller, remote controller, and optionally the accessory) must perform these functions in real time (or near-real time), and thus, these executable functions will probably be performed in a multi-tasking computer operating system, such that all the other important functions being performed by those very devices can also occur in real time (or near-real time), so that the human user is not literally "waiting" for the hardware to proceed to the next "other" function. This type of operating system is well known in today's computer programming environment.

Two earlier patent documents are related to the technology disclosed herein, and are hereby incorporated by reference. These patent documents are: U.S. Pat. No. 8,087,176, titled "TWO DIMENSION LAYOUT AND POINT TRANSFER SYSTEM;" and U.S. Pat. No. 8,943,701, titled "AUTOMATED LAYOUT AND POINT TRANSFER SYSTEM." Both of these patent documents are assigned to Trimble Navigation Limited of Sunnyvale, Calif. (now known as Trimble, Inc.), and are incorporated herein by reference in their entirety. These patent documents disclose in detail the types of laser controllers and remote controllers that can be used to implement the technology disclosed herein, including a fan-beam laser controller for laser controller 820 and a hand-held wireless tablet computer for the remote controller 300.

Other earlier patent documents disclose yet more advanced features that can be used with the technology disclosed herein, including U.S. Pat. No. 9,880,022, titled "POINT LAYOUT SYSTEM WITH THIRD LASER TRANSMITTER;" and patent application Ser. No. 15/869, 255, filed on Jan. 12, 2018, titled "POINT LAYOUT SYSTEM USING SINGLE LASER TRANSMITTER." These patent documents are assigned to Trimble Navigation Limited of Sunnyvale, Calif. (now known as Trimble, Inc.), and are incorporated herein by reference in their entirety.

Still another patent document discloses more advanced features that can be used with the technology disclosed herein, including patent application Ser. No. 15/591,213, filed on May 10, 2017, titled "AUTOMATIC POINT LAYOUT AND STAKING SYSTEM." This patent document is assigned to Trimble, Inc. and is incorporated herein by reference in their entirety.

Yet more patent documents disclose Total Stations and Total Tracking Stations, including U.S. Pat. Nos. 5,313,409 and 6,175,328. These patent documents are owned by Trimble Navigation Limited of Sunnyvale, Calif. (now known as Trimble, Inc.), and are incorporated herein by reference in their entirety. (They are assigned to Spectra Precision AB or its predecessor company name, Geotronics. Spectra Precision AB is now owned by Trimble.)

It will be understood that the logical operations described in relation to the flow charts of FIGS. 9-14, 24, and 36-37 can be implemented using sequential logic (such as by using microprocessor technology), or using a logic state machine, or perhaps by discrete logic; it even could be implemented using parallel processors. One embodiment may use a microprocessor or microcontroller (e.g., microprocessor 50) to execute software instructions that are stored in memory cells within an ASIC. In fact, the entire microprocessor 50 (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented. In general, the memory circuit of a particular electronic product will contain instructions that are executable by the processing circuit of that same particular electronic product.

It will also be understood that the precise logical operations depicted in the flow charts of FIGS. 9-14, 24, and 36-37 and discussed above, could be somewhat modified to perform similar, although perhaps not exact, functions without departing from the principles of the technology disclosed herein. The exact nature of some of the decision steps and other commands in these flow charts are directed toward specific future models of sensing and control system devices used with earthmoving equipment (those involving laser receivers sold by Trimble Navigation Limited, for example) and certainly similar, but somewhat different, steps would be taken for use with other models or brands of sensing or control systems in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A movable accessory for a layout and point transfer system, the accessory comprising:
   (a) a target screen having a surface that is at least partially reflective to emissions from an electronic distance measuring instrument, said surface having a longitudinal axis;
   (b) a laser light receiver comprising: a processing circuit, a memory circuit including instructions executable by said processing circuit, a communications circuit, an input/output interface circuit, and at least one photosensor that detects a wavelength emitted by a laser light transmitter;
   (c) a plurality of photoemitters that are controlled by at least one output signal that is generated by said input/output interface circuit;
   wherein:
   (d) said plurality of photoemitters is mounted proximal to a bottom portion of said movable accessory, at least two of the individual photoemitters of said plurality being mounted at different horizontal positions;

(e) said at least one photosensor of the laser light receiver is oriented in a non-vertical orientation;
(f) said processing circuit is configured:
(i) to monitor a position of where a vertical plane of laser light strikes said at least one photosensor of the laser light receiver, as said accessory is moved by a user; and
(ii) to provide a predetermined visual indication produced by said plurality of photoemitters to indicate a position of where said laser light receiver has received the vertical plane of laser light.

2. The movable accessory of claim 1, further comprising: a tilt angle sensor that determines a roll angle of said longitudinal axis with respect to a vertical direction, said tilt angle sensor generating an output signal that is directed to said input/output interface circuit;
wherein: said tilt angle sensor output signal is used by said processing circuit to compensate for a value of said roll angle that is not zero degrees, by determining a corrected position as to which of said plurality of photoemitters should be illuminated to provide a roll angle-compensated visual indication.

3. The movable accessory of claim 1, wherein: said plurality of photoemitters comprise light emitting diodes (LEDs), and emit visible light.

4. The movable accessory of claim 3, wherein: if a vertical plane of laser light strikes said at least one photosensor of the laser light receiver, one corresponding LED is illuminated, thereby providing said visual indication of where said laser light receiver has received the vertical plane of laser light.

5. The movable accessory of claim 3, wherein: if a vertical plane of laser light strikes said at least one photosensor of the laser light receiver, multiple corresponding LEDs are illuminated, thereby providing said visual indication of where said laser light receiver has received the vertical plane of laser light.

6. The movable accessory of claim 1, wherein: said plurality of photoemitters comprise multi-color light emitting diodes (LEDs), and emit visible light.

7. The movable accessory of claim 6, wherein: if a vertical plane of laser light strikes said at least one photosensor of the laser light receiver, one corresponding LED is illuminated in a first color, thereby providing said visual indication of where said laser light receiver has received the vertical plane of laser light.

8. The movable accessory of claim 6, wherein:
(a) if a vertical plane of laser light strikes said at least one photosensor of the laser light receiver;
(b) a plurality of said LEDs are illuminated in a first color; and
(c) one corresponding LED is illuminated in a second, different color, thereby providing said visual indication of where said laser light receiver has received the vertical plane of laser light.

9. The movable accessory of claim 6, wherein:
(a) if a first vertical plane of laser light strikes said at least one photosensor of the laser light receiver;
(b) a plurality of said LEDs are illuminated in a first color; and
(c) if a second vertical plane of laser light strikes said at least one photosensor of the laser light receiver;
(d) a plurality of said LEDs are illuminated in a second color.

10. The movable accessory of claim 1, wherein:
said plurality of photoemitters comprise multi-color light emitting diodes (LEDs), and emit visible light; and
a first strip of LEDs is mounted below a second strip of LEDs.

11. The movable accessory of claim 10, wherein:
(a) if a first vertical plane of laser light strikes said at least one photosensor of the laser light receiver;
(b) a plurality of said LEDs from said first strip of LEDs are illuminated in a first color; and
(c) if a second vertical plane of laser light strikes said at least one photosensor of the laser light receiver;
(d) a plurality of said LEDs from said second strip of LEDs are illuminated in a second, different, color.

12. The movable accessory of claim 1, further comprising:
(a) at least one leg that is attached to said movable accessory;
(b) wherein: said at least one leg making said movable accessory free-standing when resting on a floor surface.

13. The movable accessory of claim 1, further comprising:
(a) an elongated pole that extends in a direction that is parallel to said longitudinal axis of the movable accessory, said target screen, said laser light receiver, and said plurality of photoemitters all being mounted to said pole;
(b) wherein: said pole must be held in place when the movable accessory is in use.

14. The movable accessory of claim 13, further comprising:
(a) at least one level vial mounted to said pole;
(b) wherein: said pole must be held plumb in order to accurately determine a point of interest for a jobsite surface.

15. The movable accessory of claim 13, further comprising:
(a) a tilt angle sensor that determines a roll angle of said longitudinal axis with respect to a vertical direction, said tilt angle sensor generating an output signal that is directed to said input/output interface circuit;
(b) wherein: said tilt angle sensor output signal is used by said processing circuit to compensate for a value of said roll angle that is not zero degrees, by determining a corrected position as to which of said plurality of photoemitters should be illuminated to provide a roll angle-compensated visual indication.

16. A movable accessory for a layout and point transfer system, the accessory comprising:
(a) a target screen having a surface that is at least partially reflective to emissions from an electronic distance measuring instrument, said surface having a longitudinal axis;
(b) a laser light receiver comprising: a processing circuit, a memory circuit including instructions executable by said processing circuit, a communications circuit, an input/output interface circuit, and at least one photosensor that detects a wavelength emitted by a laser light transmitter;
(c) a plurality of photoemitters that are controlled by at least one output signal that is generated by said input/output interface circuit;
wherein:
(d) said plurality of photoemitters is mounted proximal to a top portion of said movable accessory, at least two of the individual photoemitters of said plurality being mounted at different horizontal positions;

(e) said at least one photosensor of the laser light receiver is oriented in a non-vertical orientation;
(f) said processing circuit is configured:
(i) to monitor a position of where a vertical plane of laser light strikes said at least one photosensor of the laser light receiver, as said accessory is moved by a user; and
(ii) to provide a predetermined visual indication produced by said plurality of photoemitters to indicate a position of where said laser light receiver has received the vertical plane of laser light.

17. The movable accessory of claim 16, further comprising:
(a) an elongated pole to which said accessory is attached, said elongated pole extending in a direction that is parallel to said longitudinal axis of the movable accessory; and
(b) at least one level vial mounted to at least one of said pole and said movable accessory.

18. The movable accessory of claim 17, wherein:
(a) said pole must be held plumb in order to accurately determine a point of interest for a jobsite surface;
(b) said accessory must be moved to a position where the laser light receiver is indicating an ON POINT state for receiving the vertical plane of laser light, in order to accurately determine a point of interest for a jobsite surface; and
(c) said accessory provides a visual indicator of where the point of interest is located.

19. The movable accessory of claim 16, wherein: said plurality of photoemitters comprise light emitting diodes (LEDs), and emit visible light.

20. The movable accessory of claim 19, wherein: if a vertical plane of laser light strikes said at least one photosensor of the laser light receiver, one corresponding LED is illuminated, thereby providing said visual indication of where said laser light receiver has received the vertical plane of laser light.

21. The movable accessory of claim 19, wherein: if a vertical plane of laser light strikes said at least one photosensor of the laser light receiver, multiple corresponding LEDs are illuminated, thereby providing said visual indication of where said laser light receiver has received the vertical plane of laser light.

22. The movable accessory of claim 16, wherein: said plurality of photoemitters comprise multi-color light emitting diodes (LEDs), and emit visible light.

23. The movable accessory of claim 22, wherein: if a vertical plane of laser light strikes said at least one photosensor of the laser light receiver, one corresponding LED is illuminated in a first color, thereby providing said visual indication of where said laser light receiver has received the vertical plane of laser light.

24. A layout and point transfer system, comprising:
(a) a laser controller, including:
(i) a laser light transmitter that emits a substantially vertical plane of visible wavelength laser light, said laser light transmitter being rotatable about a substantially vertical axis;
(ii) an electronic distance measuring instrument that is rotatable about said substantially vertical axis;
(iii) an electronic angle measuring instrument; and
(iv) a first processing circuit, a first memory circuit including instructions executable by said first processing circuit, a first communications circuit, and a first input/output interface circuit;
(b) a movable accessory, comprising:
(i) a target screen having a surface that is at least partially reflective to emissions from an electronic distance measuring instrument, said surface having a longitudinal axis;
(ii) a laser light receiver comprising: a second processing circuit, a second memory circuit including instructions executable by said second processing circuit, a second communications circuit, a second input/output interface circuit, and at least one photosensor that detects a wavelength emitted by a laser light transmitter, said at least one photosensor of the laser light receiver being mounted in a non-vertical orientation; and
(iii) a plurality of photoemitters that are controlled by at least one output signal that is generated by said input/output interface circuit, at least two of the individual photoemitters of said plurality of photoemitters being mounted at different horizontal positions; and
(c) a remote controller, including:
a third processing circuit, a third memory circuit including instructions executable by said third processing circuit, a third communications circuit, a display monitor, a user-operated input circuit, and a third input/output interface circuit, wherein said laser controller and said remote controller communicate with one another by use of said first and third communications circuits;
wherein:
(d) said first processing circuit is configured:
(i) using said laser light transmitter, to emit said substantially vertical plane of visible wavelength laser light;
(ii) using said electronic distance measuring instrument, to monitor a physical distance between said electronic distance measuring instrument and said movable target screen, as said movable target screen is moved along said substantially vertical plane of visible wavelength laser light; and
(iii) if said movable target screen is moved to a predetermined distance along said substantially vertical plane of visible wavelength laser light, then for at least one of (A) said laser controller and (B) said remote controller to provide a predetermined indication to show an ON POINT status, which corresponds to a physical location of said predetermined point of interest on the jobsite surface; and
(e) said second processing circuit is configured:
(i) to monitor a position of where a vertical plane of laser light strikes said at least one photosensor of the laser light receiver, as said accessory is moved by a user; and
(ii) to provide a predetermined visual indication produced by said plurality of photoemitters to indicate a position of where said laser light receiver has received the vertical plane of laser light.

25. The movable accessory of claim 24, wherein said plurality of photoemitters are mounted proximal to a bottom portion of the movable accessory.

26. The movable accessory of claim 25, further comprising: a tilt angle sensor that determines a roll angle of said longitudinal axis with respect to a vertical direction, said tilt angle sensor generating an output signal that is directed to said second input/output interface circuit;
wherein: said tilt angle sensor output signal is used by said second processing circuit to compensate for a value of said roll angle that is not zero degrees, by determining a corrected position as to which of said plurality of photoemitters should be illuminated to provide a roll angle-compensated visual indication.

27. The movable accessory of claim 25, wherein: said plurality of photoemitters comprise at least one strip of light emitting diodes (LEDs), and emit visible light.

28. The movable accessory of claim 27, wherein a point of interest is visually indicated directly by at least one of the LEDs, which are proximal to a jobsite floor surface.

29. The movable accessory of claim 28, wherein any one of the LEDs can be illuminated to indicate that said substantially vertical plane of visible wavelength laser light is striking said laser light receiver at any corresponding physical position along said at least one photosensor.

30. The movable accessory of claim 24, wherein said plurality of photoemitters are mounted proximal to a top portion of the movable accessory.

31. The movable accessory of claim 30, further comprising:
(a) an elongated pole that extends in a direction that is parallel to said longitudinal axis of the movable accessory, said target screen, said laser light receiver, and said plurality of photoemitters all being mounted to said pole;
(b) wherein: said pole must be held in place when the movable accessory is in use.

32. The movable accessory of claim 31, further comprising:
(a) at least one level vial mounted to at least one of said pole and said movable accessory;
(b) wherein: said pole must be held plumb in order to accurately determine a point of interest for a jobsite surface.

33. The movable accessory of claim 32, wherein:
(a) if said movable accessory is moved to a point that is both ON AZIMUTH with respect to the laser light receiver, and is at a correct distance with respect to the surface of said movable target screen and the electronic distance measuring instrument of the laser controller, then:
(b) the movable accessory will be ON POINT, and a point of interest will be visually indicated at a bottom portion of said pole.

34. The movable accessory of claim 33, wherein:
if the pole is plumb, then said surface of the movable target screen is directly above the bottom portion of said pole, in the vertical direction.

* * * * *